United States Patent [19]

Moyroud et al.

[11] Patent Number: 4,482,225

[45] Date of Patent: Nov. 13, 1984

[54] PHOTOCOMPOSING MACHINE AND METHOD

[75] Inventors: Louis M. Moyroud, Delray Beach, Fla.; Michel Bongard, Saint Sulpice, Switzerland; Paul A. Vernez, Chavannes, Switzerland; Michel Moulin, Lausanne, Switzerland

[73] Assignee: Autologic, S.A., Bussigny-pres-Lausanne, Switzerland

[21] Appl. No.: 579,817

[22] Filed: Feb. 13, 1984

Related U.S. Application Data

[62] Division of Ser. No. 374,172, May 3, 1982, Pat. No. 4,431,295, which is a division of Ser. No. 198,284, Oct. 17, 1980, Pat. No. 4,329,027.

[51] Int. Cl.[3] .................. B41B 21/16; G03B 27/60

[52] U.S. Cl. .................. 354/5; 355/73

[58] Field of Search .................. 355/3 TE, 3 P, 73; 354/5, 3

[56] References Cited

U.S. PATENT DOCUMENTS

| | | | |
|---|---|---|---|
| 2,836,099 | 5/1958 | Weishaupt | 355/73 X |
| 3,015,304 | 1/1962 | Carlson et al. | 355/3 TE X |
| 3,507,594 | 4/1970 | Rucinski et al. | 355/73 X |
| 3,536,401 | 10/1970 | Mason et al. | 355/73 X |
| 3,687,025 | 8/1972 | Rosin | 354/5 |

*Primary Examiner*—Donald A. Griffin
*Attorney, Agent, or Firm*—Curtis, Morris & Safford

[57] ABSTRACT

Character matrices are stored in and retrieved from a magazine automatically. The matrices can be complete discs or pie-shaped "petals" which are assembled to form a disc. A single pivotably-mounted support arm is used to support the spinning disc, and to move it for selection of concentric arrays on the disc, as well as for storage and retrieval of matrices. A reversed zoom lens is used to magnify the characters.

The character spacing carriage can move continuously in order to increase the speed of operation. Proper location of the characters can be done by simply altering the carriage speed between projections, or by using a shuttling lens for character spacing compensation, together with flash delay and carriage deceleration.

A system for inputting images from any one of three separate discs also is provided.

A double-dove prism and optical wedges are used for altering the shapes of characters.

Rules are formed by operating a flash-lamp very rapidly to shine light through an appropriately-shaped opening and moving the image along the photosensitive surface in a linear path.

The matrix can be moved in a varying speed mode in which the matrix is moving slowly or stationary when the character is flashed. This allows the light intensity of the flash lamp to be raised significantly without significant degradation of the quality of the output.

Controls are provided for automatically adjusting the base-line of the characters, the margins, the degree of enlargement, the flash intensity, and the focus.

A simple attachment is provided for doubling or halving the size of the characters.

The machine can produce output on photograhic film or paper or electrophotographic material.

Means are provided for automatically inserting graphic matter (pictures) into text matter for composing full pages, and for making half-tones.

9 Claims, 93 Drawing Figures

FIG. 7
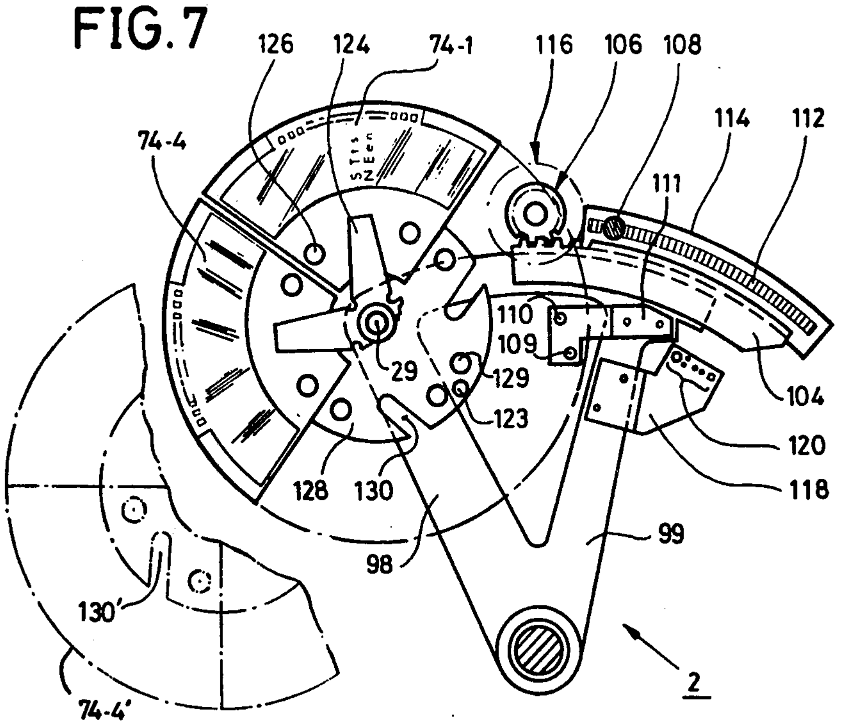
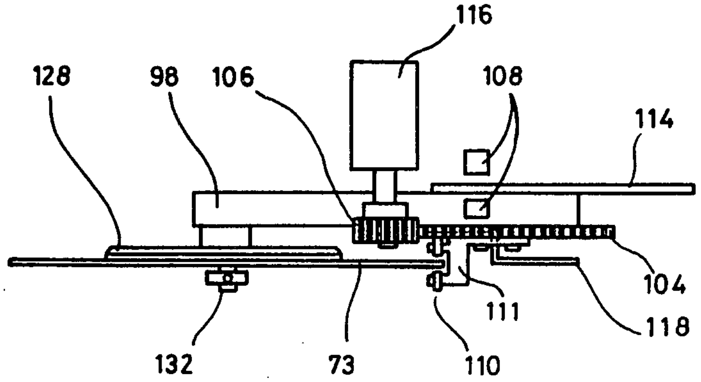
FIG. 8

FIG.13A
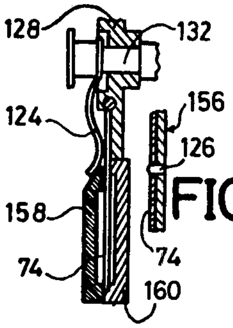
FIG.13A'
FIG.13D
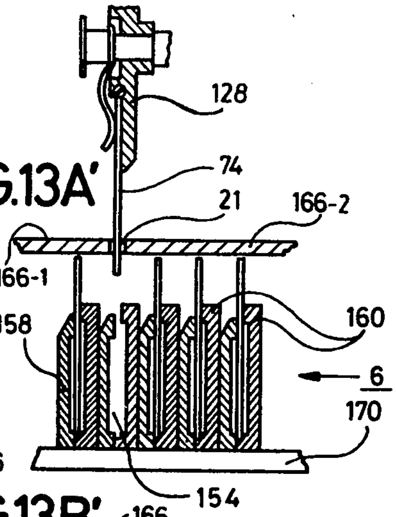
FIG.13B
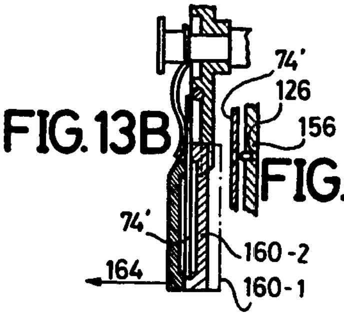
FIG.13B'
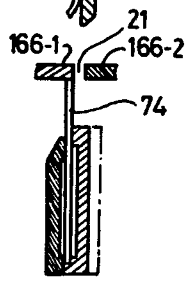
FIG. 13C
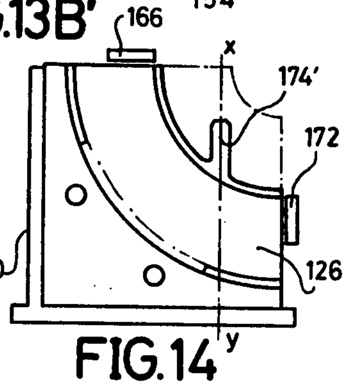
FIG.14
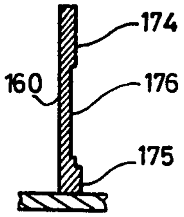
FIG.14A
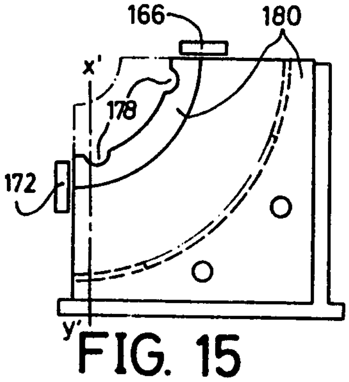
FIG. 15
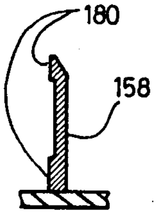
FIG.15A FIG. 16
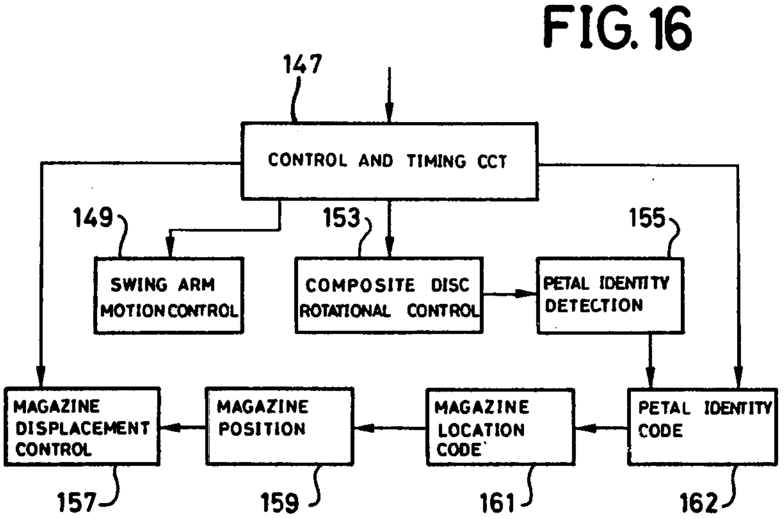
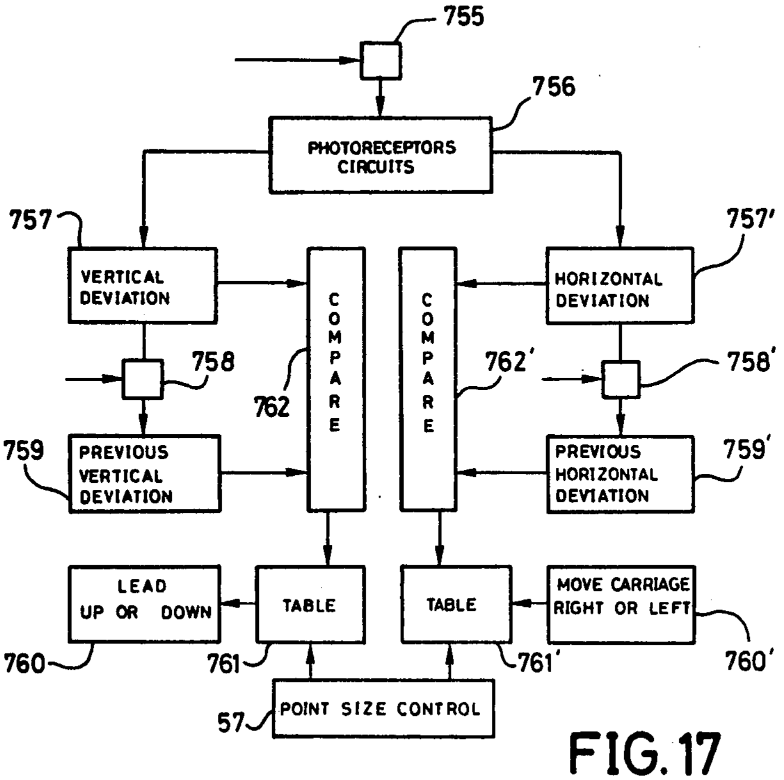
FIG. 17

FIG. 28
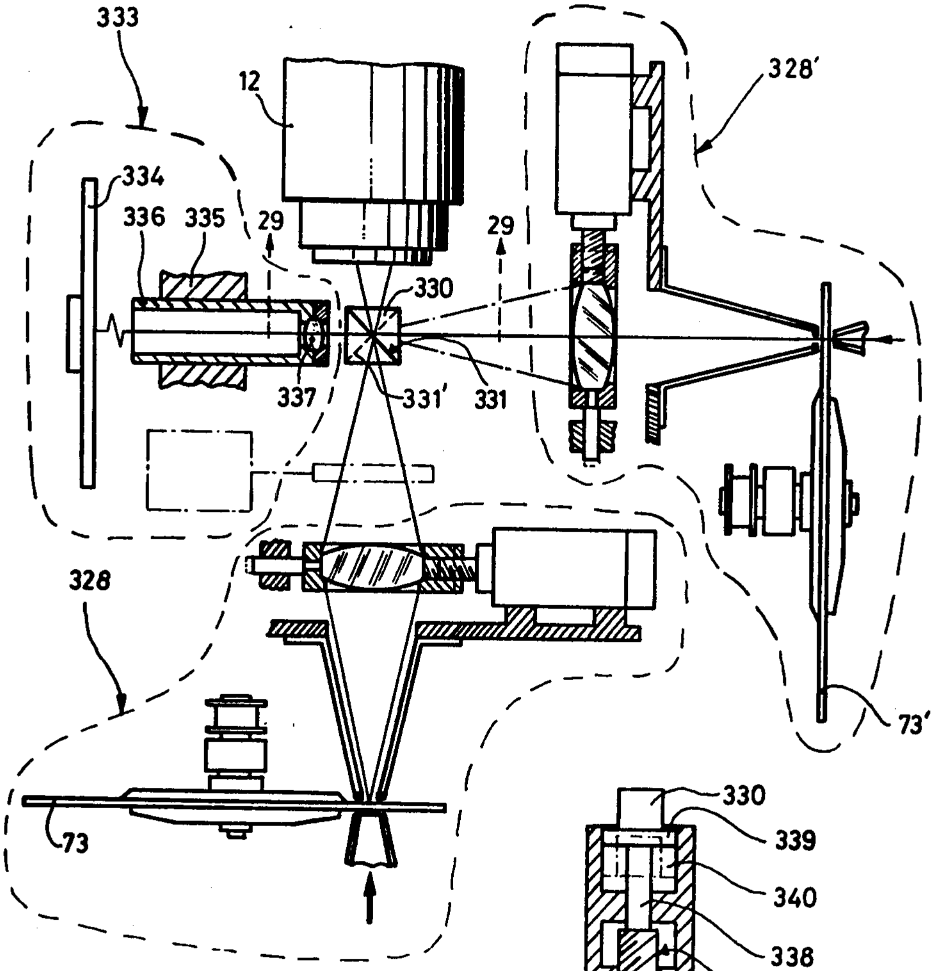
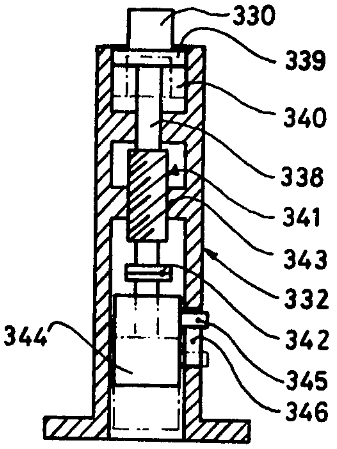
FIG. 29

BOBST
BOBST BOBST BOBST
BOBST BOBST

TYPE MODIFICATION MODE COMMAND
CHAR. SLANT CONTROL
SQUEEZE EXPAND
CHARACTER ROTATION CONTROL
POSTER MODE COMMAND
360
296
12
59
63
73
271
362
364
366
367
368
369
370
372
373
374
375
376
377
378
379
380
381
381'
382
383
384
384'
385
386
386'
388
389
390
392
361

FIG.36
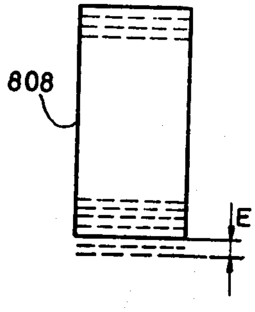
FIG.36A
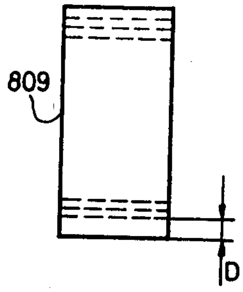
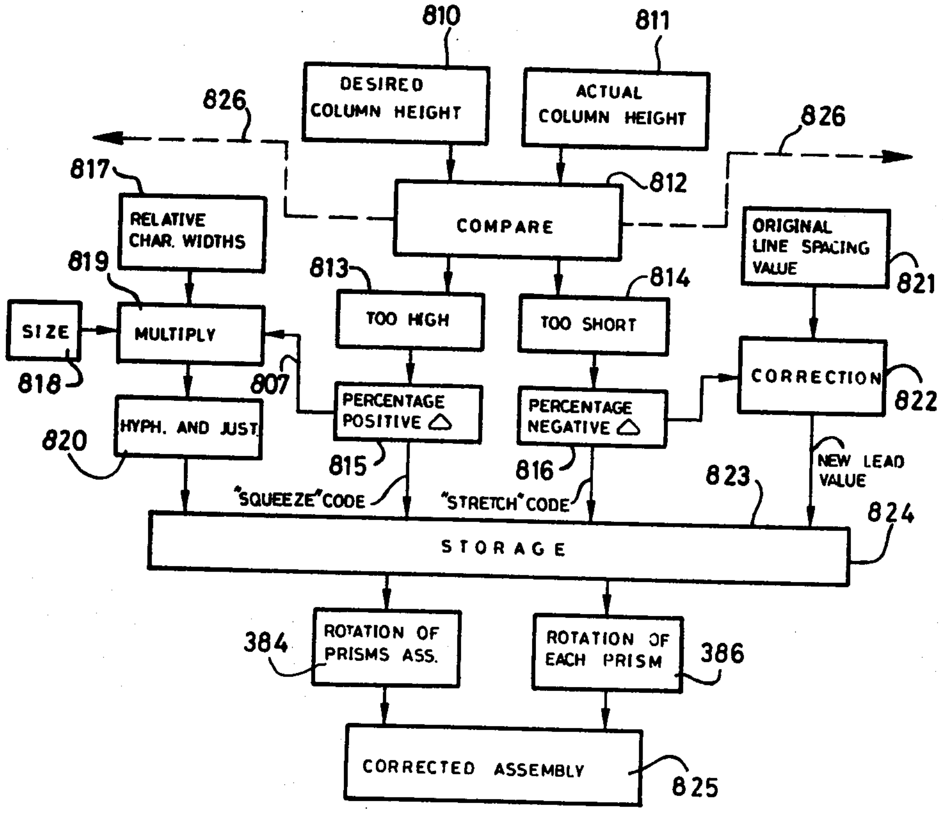
FIG. 36B

FIG. 42

| 424 | 425 | 426 | 427 |
|---|---|---|---|
| f | 6 | -2 | -2 |
| o | 9 | +1 | -1 |
| r | 7 | -1 | -2 |
| g | 9 | +1 | -1 |
| e | 8 | 0 | -1 |
| t | 7 | -1 | -2 |
| t | 7 | -1 | -3 |
| i | 5 | -3 | -6 |
| n | 10 | +2 | -4 |
| g | 9 | +1 | -3 |
| | | 0 | -3 |
| t | 7 | -1 | -4 |
| h | 10 | +2 | -2 |
| o | 9 | +1 | -1 |
| s | 7 | -1 | -2 |
| e | 8 | 0 | -2 |
| | | 0 | -2 |
| t | 7 | -1 | -3 |
| h | 10 | +2 | -1 |
| i | 5 | -3 | -4 |
| n | 10 | +2 | -2 |
| g | 9 | +1 | -1 |
| s | 7 | -1 | -2 |
| | | 0 | -2 |
| w | 13 | +5 | +3 |
| h | 10 | +2 | +5 |
| i | 5 | -3 | +2 |
| c | 8 | 0 | +2 |
| h | 10 | +2 | +4 |
| | | 0 | +4 |

| 424 | 425 | 426 | 427 |
|---|---|---|---|
| a | 9 | +1 | +5 |
| r | 7 | -1 | +4 |
| e | 8 | 0 | +4 |
| | | 0 | +4 |
| b | 10 | +2 | +6 |
| e | 8 | 0 | +6 |
| h | 10 | +2 | +8 |
| i | 5 | -3 | +5 |
| n | 10 | +2 | +7 |
| d | 10 | +2 | +9 |
| , | 5 | -3 | +6 |
| | | 0 | +6 |
| a | 9 | +1 | +7 |
| n | 10 | +2 | +9 |
| d | 10 | +2 | +11 |
| | | 0 | +11 |
| r | 7 | -1 | +10 |
| e | 8 | 0 | +10 |
| a | 9 | +1 | +11 |
| c | 8 | 0 | +11 |
| h | 10 | +2 | +13 |
| i | 5 | -3 | +10 |
| n | 10 | +2 | +12 |
| g | 9 | +1 | +13 |
| | | | |
| f | 6 | -2 | +11 |
| o | 9 | +1 | +12 |
| r | 7 | -1 | +11 |
| t | 7 | -1 | +10 |
| h | 10 | +2 | +12 |

| 424 | 425 | 426 | 427 |
|---|---|---|---|
| p | 10 | +2 | +2 |
| e | 8 | 0 | +2 |
| t | 7 | -1 | +1 |
| i | 5 | -3 | -2 |
| t | 7 | -1 | -3 |
| | | | |
| p | 10 | +2 | -1 |
| a | 9 | +1 | 0 |
| y | 10 | +2 | +2 |
| s | 7 | -1 | +1 |
| , | 5 | -3 | -2 |
| | | | |
| é | 8 | 0 | -2 |
| d | 10 | +2 | 0 |
| i | 5 | -3 | -3 |
| f | 6 | -2 | -5 |
| i | 5 | -3 | -8 |
| é | 8 | 0 | -8 |
| | | | |
| p | 10 | +2 | -6 |
| a | 9 | +1 | -5 |
| r | 7 | -1 | -6 |
| | | | |
| l | 5 | -3 | -9 |
| a | 9 | +1 | -8 |
| | | | |
| s | 7 | -1 | -9 |
| e | 8 | 0 | -9 |
| u | 10 | +2 | -7 |
| l | 5 | -3 | -10 |
| e | 8 | 0 | -10 |

| 424 | 425 | 426 | 427 |
|---|---|---|---|
| v | 9 | +1 | -9 |
| o | 9 | +1 | -8 |
| l | 5 | -3 | -11 |
| o | 9 | +1 | -10 |
| n | 10 | +2 | -8 |
| t | 7 | -1 | -9 |
| é | 8 | 0 | -9 |
| | | | |
| d | 10 | +2 | -7 |
| e | 8 | 0 | -7 |
| | | | |
| s | 7 | -1 | -8 |
| e | 8 | 0 | -8 |
| s | 7 | -1 | -9 |
| | | | |
| h | 10 | +2 | -7 |
| a | 9 | +1 | -6 |
| b | 10 | +2 | -4 |
| i | 5 | -3 | -7 |
| t | 7 | -1 | -8 |
| a | 9 | +1 | -7 |
| n | 10 | +2 | -5 |
| t | 7 | -1 | -6 |
| s | 7 | -1 | -5 |
| , | 5 | -3 | -8 |
| | | | |
| e | 8 | 0 | -8 |
| l | 5 | -3 | -11 |
| l | 5 | -3 | -14 |
| e | 8 | 0 | -14 |

| 424 | 425 | 426 | 427 |
|---|---|---|---|
| e | 8 | 0 | -14 |
| s | 7 | -1 | -15 |
| t | 7 | -1 | -16 |
| | | | |
| d | 10 | +2 | -14 |
| e | 8 | 0 | -14 |
| v | 9 | +1 | -13 |
| e | 8 | 0 | -13 |
| n | 10 | +2 | -11 |
| u | 10 | +2 | -9 |
| e | 8 | 0 | -9 |
| | | | |
| u | 10 | +2 | -7 |
| n | 10 | +2 | -5 |
| e | 8 | 0 | -5 |
| | | | |
| g | 9 | +1 | -4 |
| r | 7 | -1 | -5 |
| a | 9 | +1 | -4 |
| n | 10 | +2 | -2 |
| d | 10 | +2 | 0 |
| e | 8 | 0 | 0 |
| | | | |
| n | 10 | +2 | +2 |
| a | 9 | +1 | +3 |
| t | 7 | -1 | +2 |
| i | 5 | -3 | -1 |
| o | 9 | +1 | 0 |
| n | 10 | +2 | +2 |
| . | 5 | -3 | -1 |

428

429

FIG. 50A
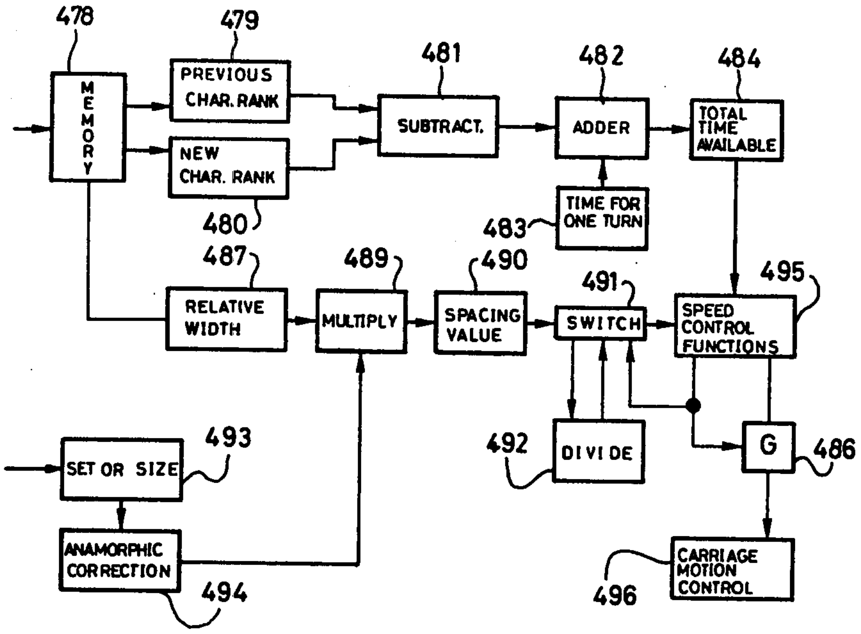
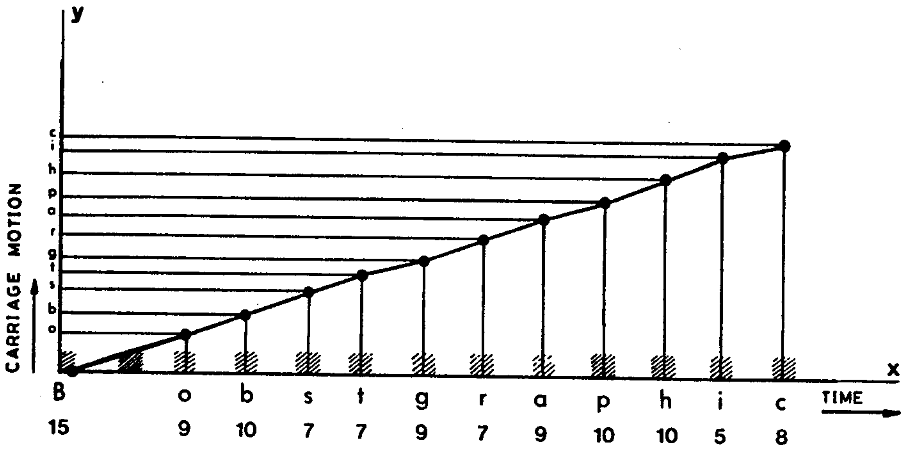
FIG. 51A

FIG. 50B
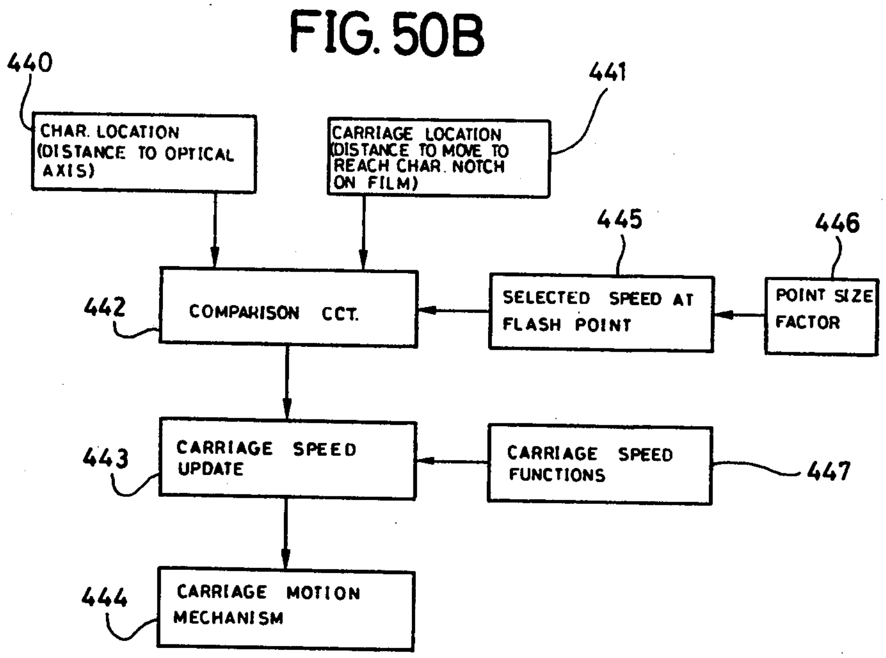
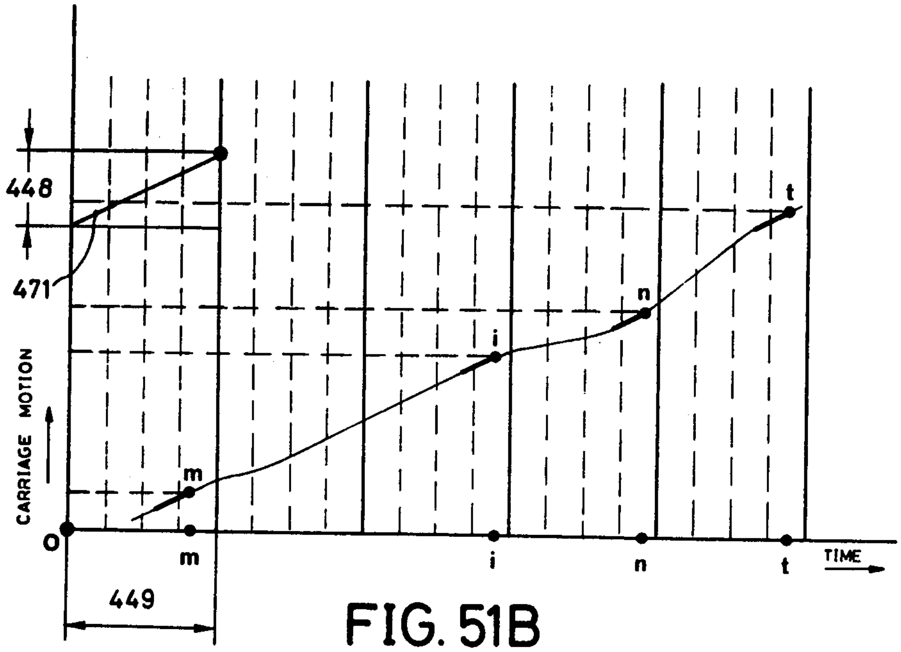
FIG. 51B

FIG. 55A
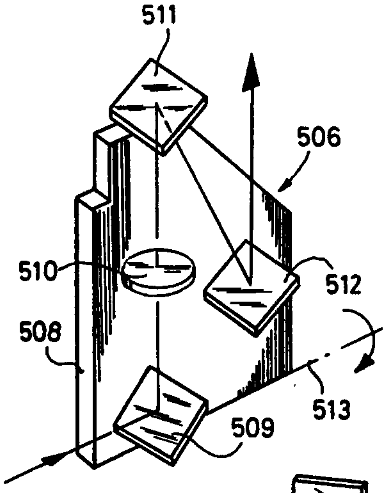
FIG. 55B
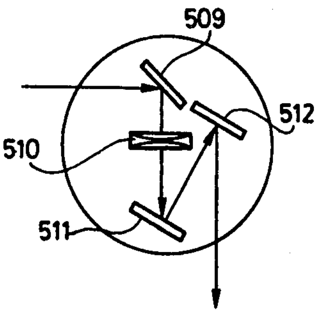
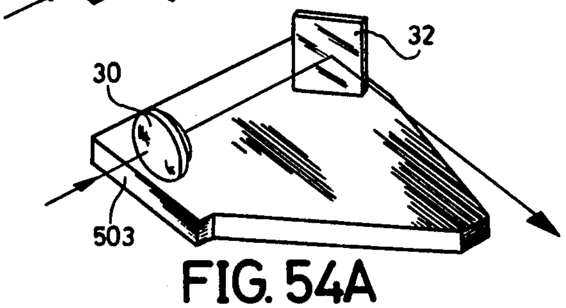
FIG. 54A
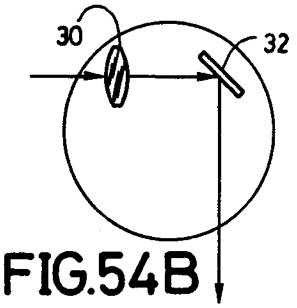
FIG. 54B
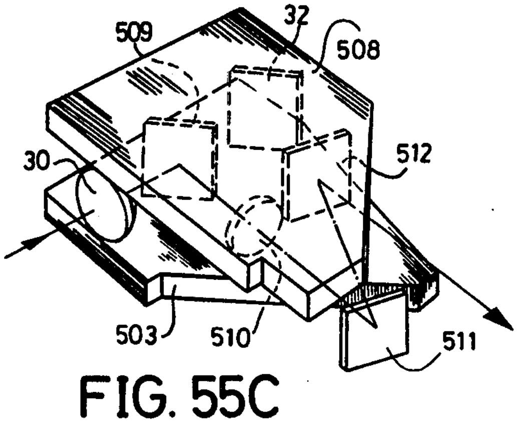
FIG. 55C
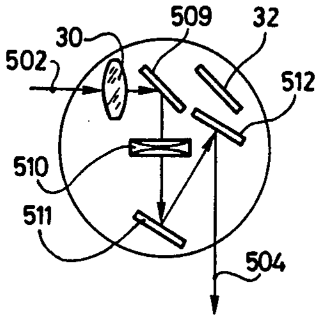
FIG. 55D FIG. 68
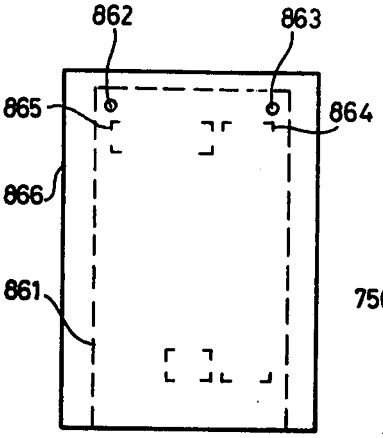
FIG. 70
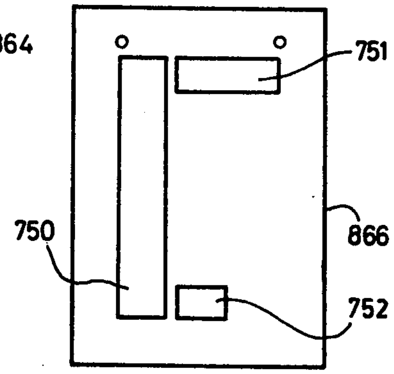
FIG. 69
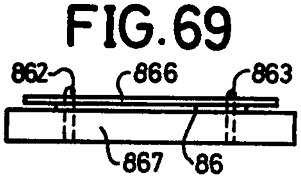
FIG. 71
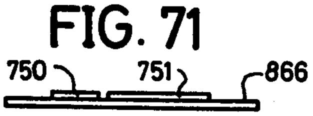
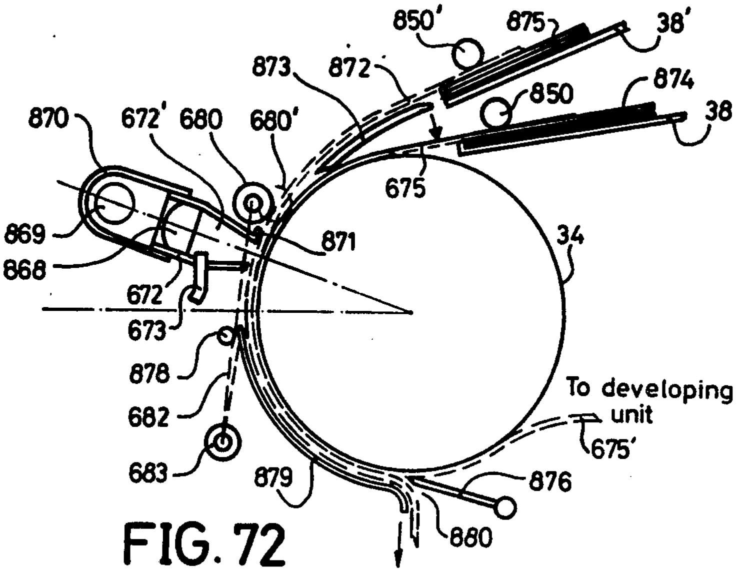
FIG. 72

PHOTOCOMPOSING MACHINE AND METHOD

This application is a division of U.S. Ser. No. 374,172, filed May 3, 1982, now U.S. Pat. No. 4,431,295 issued Feb. 14, 1984, which is a division of U.S. Ser. No. 198,284, filed Oct. 17, 1980, now U.S. Pat. No. 4,329,027, issued May 11, 1982 which relates to the subject matter of U.S. patent applications Ser. No. 899,001, filed on Apr. 21, 1978, now U.S. Pat. No. 4,230,299, and Ser. No. 092,465, filed Nov. 8, 1979. The disclosures of those patent applications and patents hereby are incorporated herein by reference.

TABLE OF CONTENTS

I. Field of the Invention
II. Objects of the Invention
III. Summary of the Invention
IV. Description of Drawings
V. Multi-Petal Storage Machine
- A. General Description
- B. Petal Structure
- C. Circular Row Selection
- D. Swing-Arm Assembly
- E. Petal Magazine Structure
- F. Petal Unloading and Loading
- G. Initial Magazine Loading VI. Multi-Disc storage Machine
- A. General Description
- B. Disc Structure
- C. Swing-Arm Assembly
- D. Disc Changing
- E. Alternative Embodiments VII. High-Speed Embodiment
- A. Mechanism
- B. Character Spacing Method
- C. Character Spacing Control Circuits
- D. Speed-Modulated Embodiment VIII. Auxiliary Matrix Embodiments
IX. Character Shape Modification
X. Ruling
XI. High Light Intensity Mode of Operation
XII. Automatic Adjustment Controls
- A. Base-Line Adjustment
- B. Margin Adjustment
- C. Enlargement Control
- D. Intensity Control
- E Automatic Focusing Control XIII. Lens Attachment
XIV. Output Unit
- A. Using Photographic Film
- B. Using Electrophotographic Media XV. Automatic Graphic Insertion
- A. Graphic Insertion Mechanism
- B. Graphic Insertion Control Circuit
- C. Mixing Blocks of Text and Graphic Matter
- D. Producing Half-Tones
- E. Laser Device for Graphics Insertion
- F. Semi Automatic Insertion of Graphics XVI. Zoom Lens Unit

FIELD OF THE INVENTION

This invention relates generally to photocomposition; more particularly, this invention relates to full-page composition of characters and graphic matter by optical, electronic and mechanical means.

OBJECTS OF THE INVENTION

One object of the invention is to provide a photocomposing machine which has relatively high versatility, relatively high speed and productivity and good composition quality, and yet has a relatively low manufacturing cost.

It is another object of the invention to provide such a machine which is compact enough to fit onto the top of an ordinary desk.

A further object of the invention is to provide such a machine which is capable of producing columns of text matter, or whole pages of text and graphic matter, as desired.

An additional object of the invention is to provide such a machine in which a relatively high level of light intensity is available for illuminating characters but without a corresponding increase in the size, power or cost of the light source.

Still another object of the invention is to provide a machine having the foregoing attributes which is capable of producing composition on a variety of photo-sensitive recording media, such as photographic and electrographic media.

Yet another object of the invention is to provide such a machine in which relatively few adjustments need be made manually in order to keep the quality of the output at a relatively high level.

A further object of the invention is to provide a photocomposing machine in which the size-changing means operates relatively quickly and easily, and is relatively simple and inexpensive to manufacture.

SUMMARY OF THE INVENTION

In accordance with the present invention, the foregoing objectives are met by the provision of a photocomposing machine and method in which a relatively large number of character matrices is made accessible by automatic operation of the machine, thus providing a relatively large number of different styles of type available for automatic mixing in the machine. Preferably, this is accomplished by storing a plurality of such matrices in a storage device, such as a magazine with compartments, and automatically retrieving them when needed. The matrices are either complete discs or pie-shaped "petals" which are assembled into discs. Preferably, the discs and petals are relatively small and light-weight, thus ensuring that the petal or disc handling mechanism will be relatively small, light-weight, and fast-acting.

Preferably, the storage and retrieval of matrices is performed by the same simple, light-weight mechanism which is used to select among different character arrays on the matrices during composition, and to enable the use of "pi" matrices and ruling means.

The objects of the invention are met by the further provision of a zoom lens which is reversed from its normal orientation, thus making it faster and easier to operate. Preferably, this zoom lens is one which normally is used in video cameras, and is relatively inexpensive.

In an embodiment of the invention intended to give relatively high-speed operation, the character spacing mechanism moves continuously instead of intermittently, and means are provided for deflecting the character images to one side or the other so as to compensate for differences in the widths of the characters, kerning, etc. and produce a line of proportionallyspaced characters. Preferably, the matrix disc spins at a constant speed, and flash timing delay is used to compensate for groups of exceptionally wide characters. The speed of the character spacing mechanism is decreased to accommodate groups of exceptionally narrow characters. The deflecting means preferably is a light-weight lens shuttled back and forth by a stepping motor or equivalent mechanism.

In another continuous-motion embodiment, there is no shuttling lens. Instead, the speed of the character spacing carriage is checked and modified, if necessary, after every character projection so that the carriage will be at the precise location required for the accurate placement of the next character when the image of that character arrives at the projection position.

In another embodiment, three different matrices can be used, and the images to be composed can be selected from any one of the three by means of a reflector which can be positioned in three positions; two rotary positions and a retracted or disabled position.

The invention also includes a character shapemodifying feature utilizing a double-dove prism and optical wedges to slant or rotate the characters, as desired.

Rules (lines) are formed without the use of an auxiliary lamp. An appropriately-shaped opening is positioned between the flash lamp and the character spacing mechanism, and the flash lamp is flashed very rapidly so as to form sequential overlapping line segments. The flash frequency and intensity are varied depending on the photosensitive medium, the speed of composition, the aperture size of the system, etc. in order to produce rules of the desired weight.

In a further embodiment, the character matrix is operated in a speed modulated mode, and the characters are exposed when the matrix petal speed has been reduced. This embodiment is especially useful in composing on photosensitive media which require relatively high levels of light intensity for proper exposure. This helps to maintain a high level of composition quality despite the considerable increase of the flash duration at relatively high intensity levels. The petal form of matrix is especially advantageous in this embodiment because it limits the distances the matrix must travel when composing characters in a selected type style.

Another feature of the invention is the provision of controls to automatically adjust the base line of the characters, the margins, the degree of enlargement, the flash intensity, and the focus. The image from a test spot or pattern is projected onto a photocell. A differential photocell is used to detect any deviation of the position of the test spot from a desired location, and to produce a correction signal. Thus, the cost and time of manual adjustment are avoided.

A simple attachment is provided for changing the enlargement of the character images; either multiplying or dividing by a factor of two. A second lens system is mounted on a support near the support for the traveling focusing lens and reflector of the character spacing mechanism. When it is desired to change the enlargement ratio, the second lens system is moved into alignment with the first. This changes the enlargement ratio without the need for operation of the zoom lens, thus effectively extending its range without the cost and complexity usually associated with so doing.

The machine is equipped to use either electrophotographic or photographic film or paper as a photosensitive medium. A vacuum system holds the medium on the surface of a drum for steadiness during composition.

Means are provided for automatically inserting or mixing graphic matter (e.g., pictures) with text matter in order to compose whole pages at one time. Preferably, an auxiliary projection means is provided for projecting images of segments of the graphic material from one scanning station to the photosensitive material which is located at another station. The graphic matter is prerecorded on strips of photosensitive material such as photographic film, along with coded indicia to indicate the x and y coordinates of the location for the graphic matter in the composed page. The text matter is composed using the character spacing mechanism in its normal mode. Then, the character spacing mechanism shifts to receive and project the graphic matter onto the film. Preferably, the graphic matter projection means includes a drum with the graphic matter on it. The drum is synchronized with the drum on which the output medium is located. An attachment is provided for making half-tones from the pictures, if desired. In one form of the invention, the graphics insertion is done by a laser system. The picture is scanned with a scanner which encodes its markings. The coded signals are used to modulate a laser beam which reproduces the picture on the output medium.

Other objects and advantages of the invention will be set forth in or apparent from the following description and drawings. The same reference numerals are used throughout the drawings to denote the same parts.

DESCRIPTION OF THE DRAWINGS

FIG. 7 is a front elevation view of the structure shown schematically in FIG. 6;

FIG. 8 is a plan view of the structure of FIG. 7;

FIGS. 13 through 13D are cross-sectional, partially broken-away schematic views of the petal holder and storage magazine showing the storage and retrieval of petals;

FIG. 14 is a side elevation view of side wall plate forming one of the compartments of the petals storage magazine;

FIG. 14A is a cross-sectional view taken along line x-y of FIG. 14;

FIG. 15 is a side elevation view of another side wall plate of the petals magazine;

FIG. 15A is a cross-sectional view taken along line x'-y' of FIG. 15;

FIG. 16 is a block diagram of a control system for loading and unloading petals in the magazine;

FIG. 17 is a block diagram of the control system used to correct horizontal and vertical deviations in the placement of character images in the device of the invention;

FIG. 24B is a side elevation view of a portion of the device of FIG. 24A;

FIG. 24C is an elevation view of the aperture plate 290 of FIG. 24A;

FIG. 28 is a schematic, partially cross-sectional plan view of an alternative projection mechanism constructed in accordance with the present invention;

FIG. 29 is a cross-sectional view taken along line 29—29 of FIG. 28;

FIGS. 36 and 36A are schematic diagrams of pages of composition requiring copy-fitting;

FIG. 36B is a schematic block diagram of a control system for use with the mechanism of FIG. 34 to alleviate the conditions shown in FIGS. 36 and 36A;

FIG. 42 is a table representing lines of standard texts in English and French with associated character width data utilized in one embodiment of the invention;

FIGS. 50A and 50B are block diagrams of the character spacing carriage control circuit in the continuously-modulated mode of operation of the invention;

FIGS. 51A and 51B are graphs representing the character spacing carriage speed variations in continuously modulated operating mode;

FIGS. 54A and 54B are perspective and plan views, respectively, of the standard optical components of the characterspacing carriage;

FIGS. 55A and 55B are perspective and plan views, respectively, of the size-enlarging carriage attachment of the invention;

FIGS. 55C and 55D are perspective and plan views, respectively, of the size-enlarging attachment of FIGS.

Figure 56A:
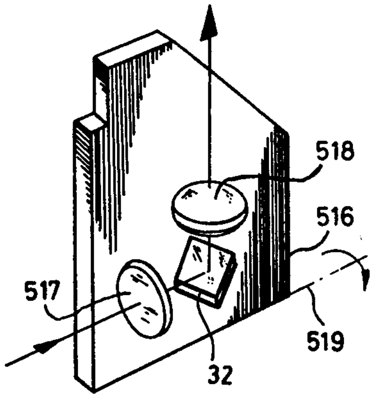
Figure 56B:
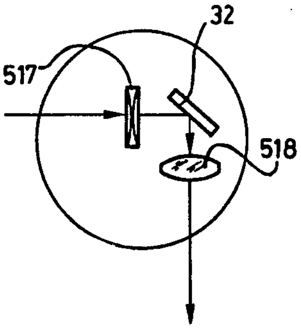
Figure 56C:
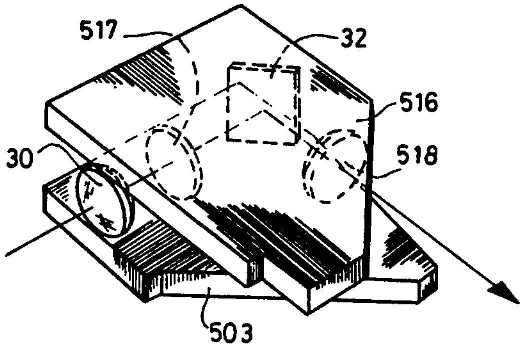
Figure 56D:
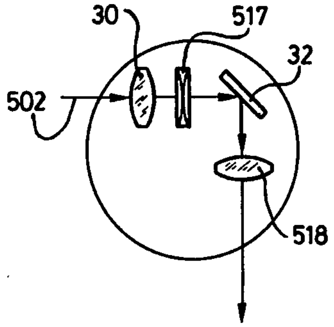
Figure 57:
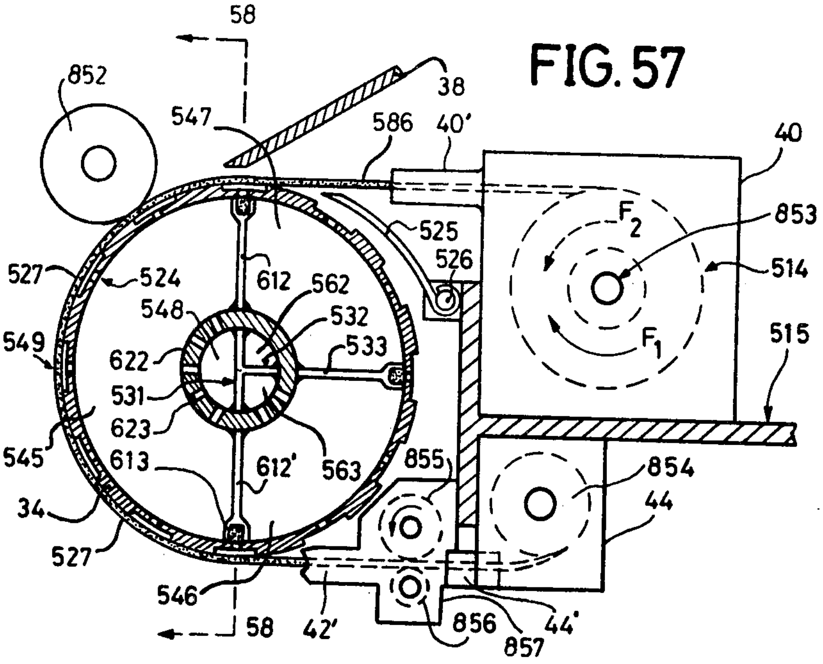
Figure 58:
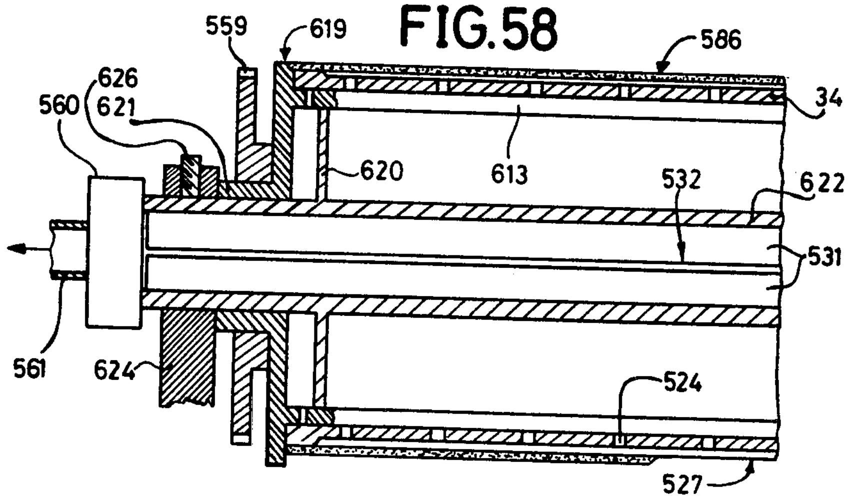
Figure 59:
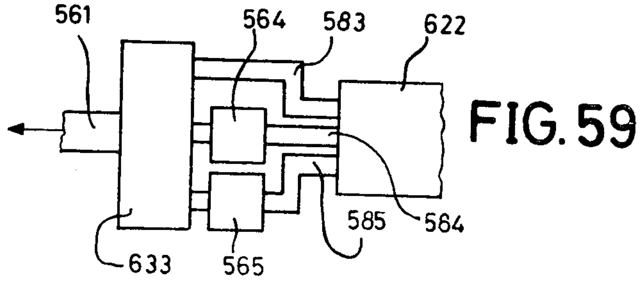
Figure 61:
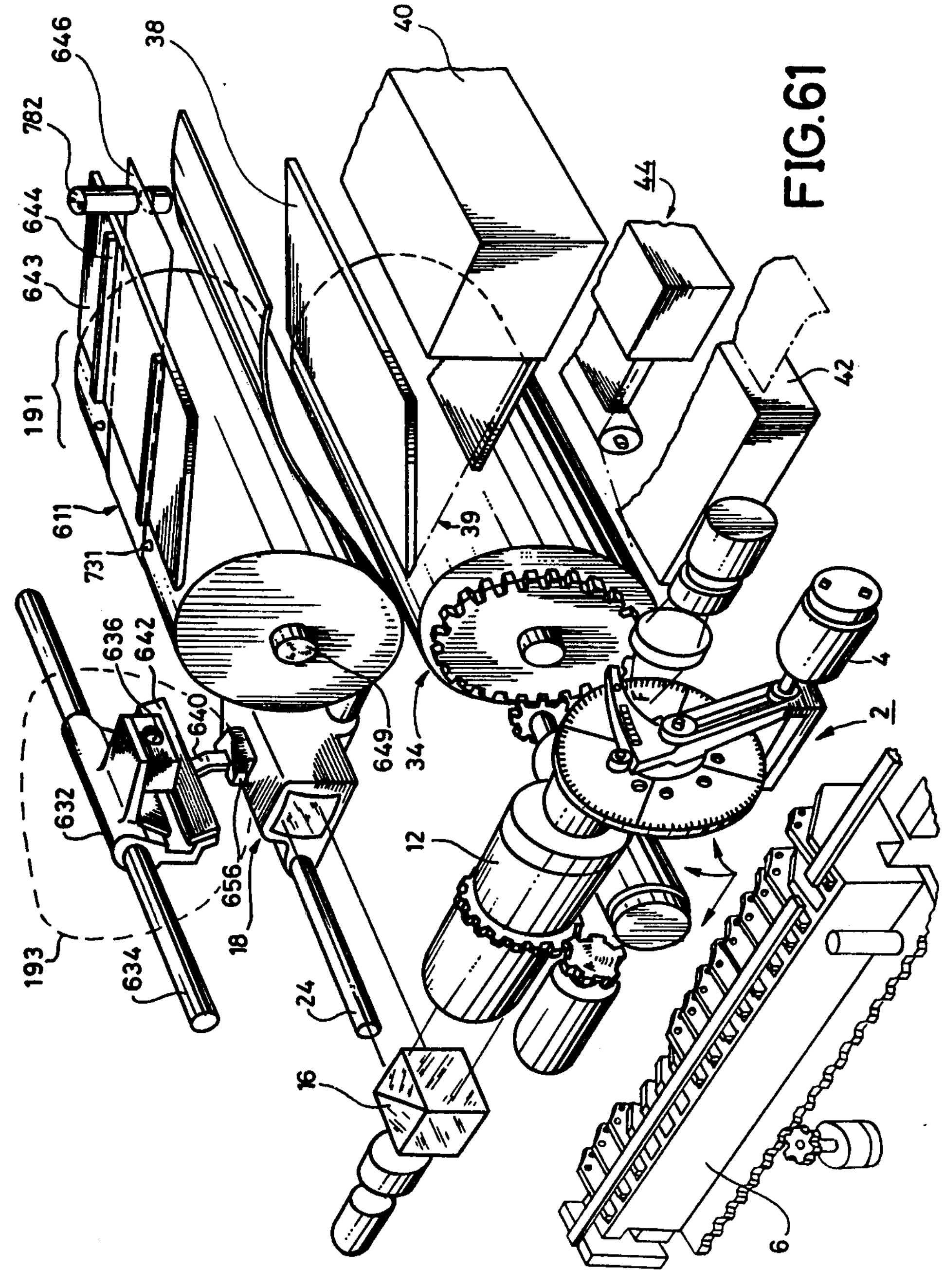
Figure 62:
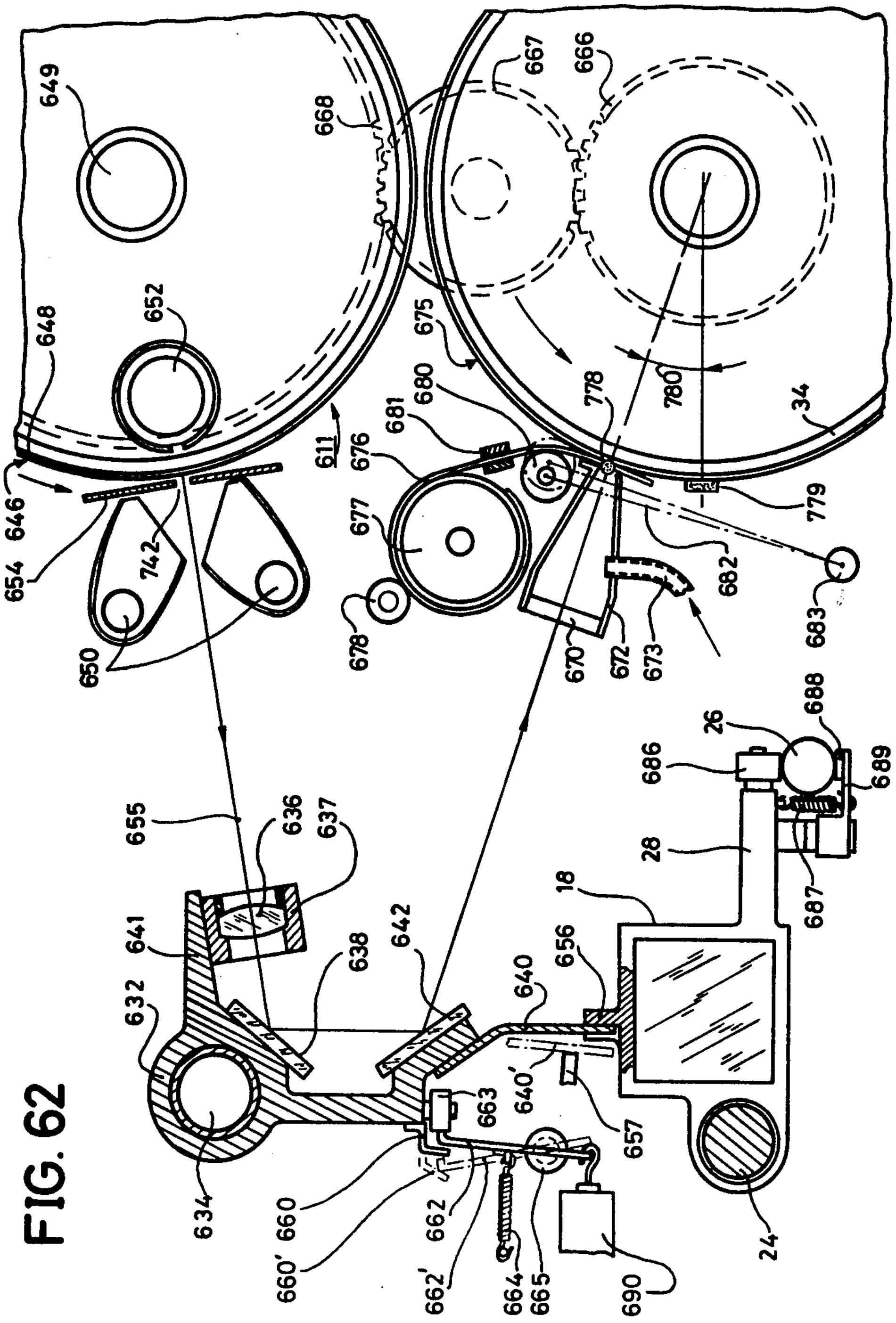
Figure 63:
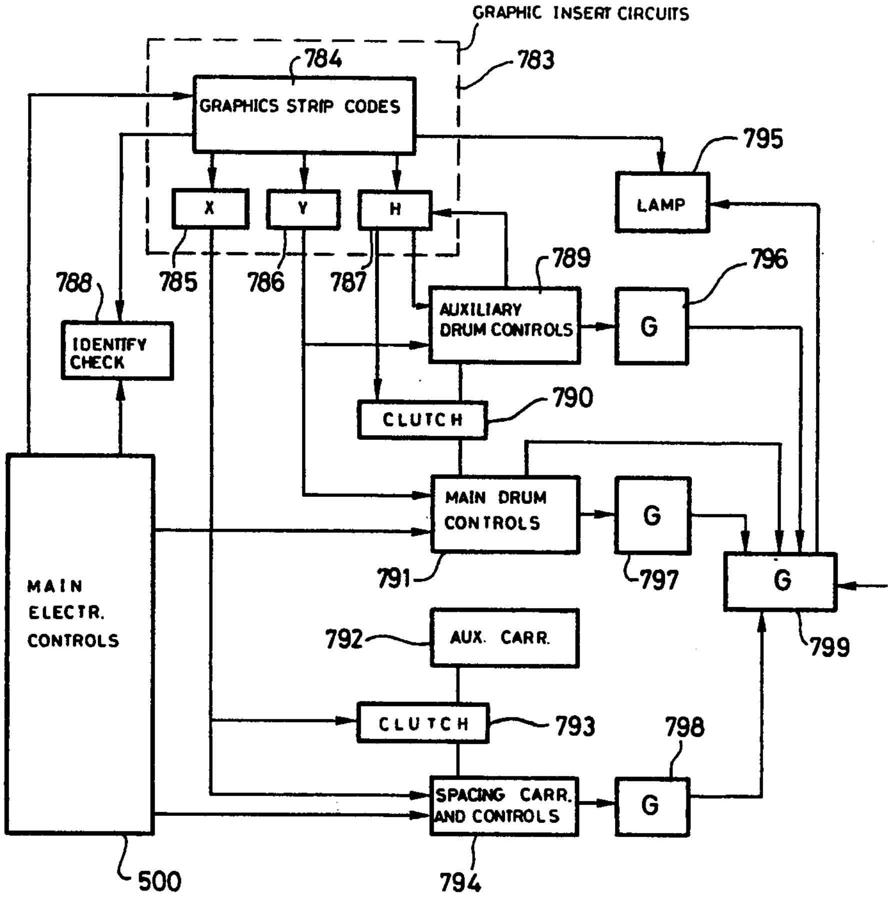
Figures 64, 65:
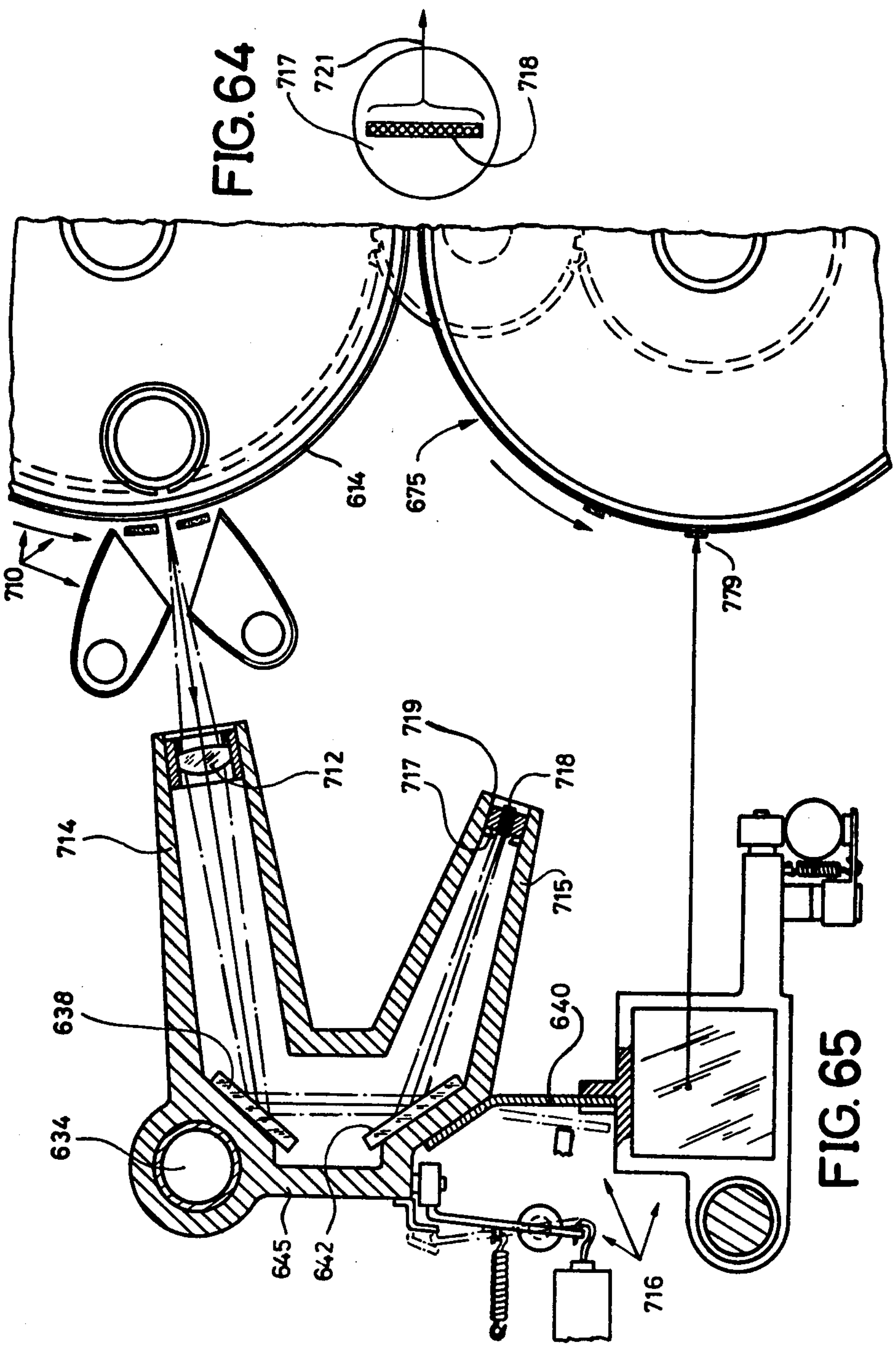
Figure 66:
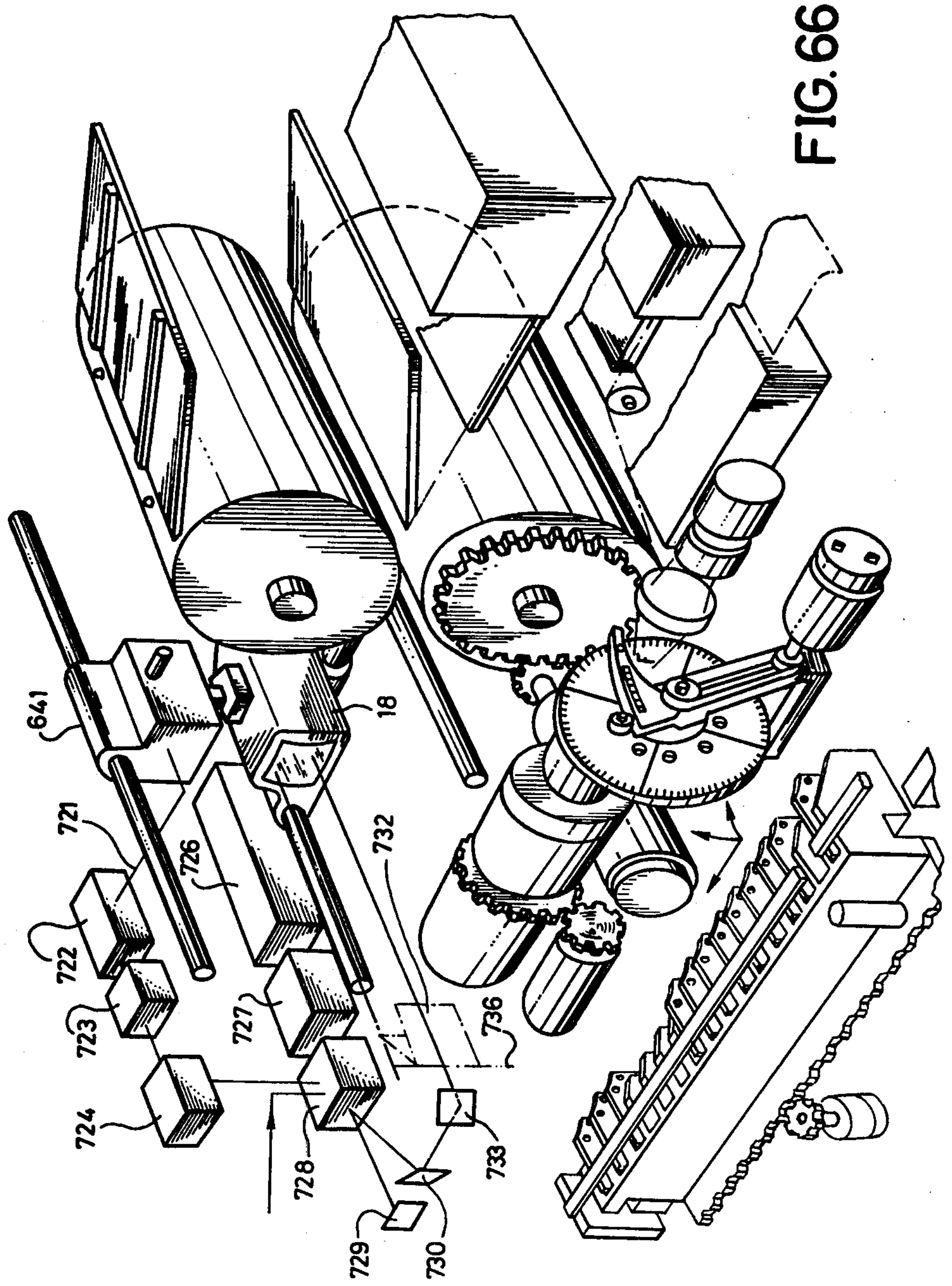
Figure 67:
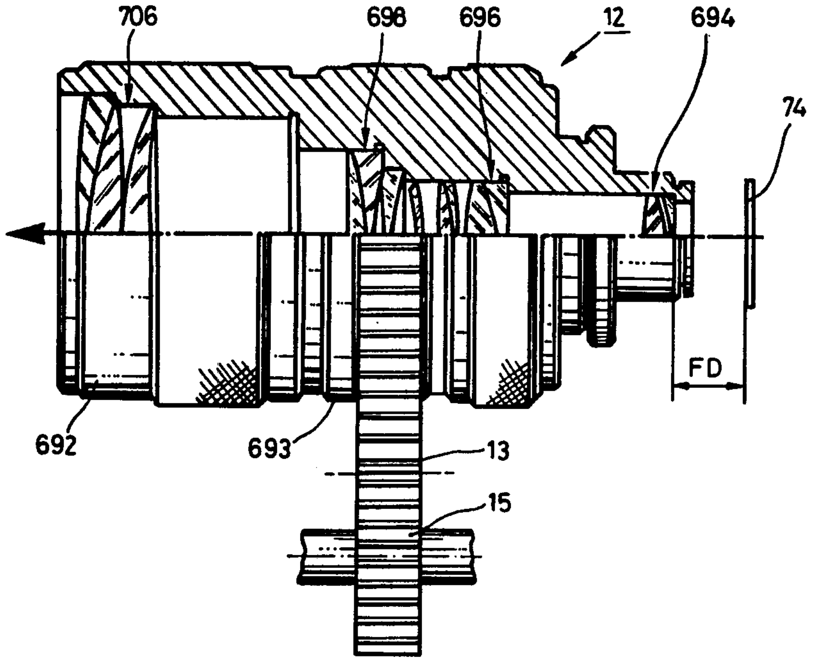

55A and 55B mounted on the carriage and combined with the optical elements of FIGS. 54A and 54B;

FIGS. 56A and 56B are perspective and plan views, respectively, of the size-reducing carriage attachment of the invention;

FIGS. 56C and 56D are perspective and plan views, respectively, of the size-reducing attachment of FIGS. 56A and 56B mounted on the carriage and combined with the optical elements of FIGS. 54A and 54B;

FIG. 57 is a cross-sectional view of the multi-purpose output mechanism of the invention, shown in use in a first mode of operation;

FIG. 58 is a partially schematic cross-sectional view taken along line 58—58 of FIG. 57;

FIG. 59 is a schematic diagram of a portion of the device shown in FIG. 58;

FIG. 60A through 60L and 60'A' through 60'H' are schematic diagrams illustrating another mode of operation of the output section of the machine;

FIG. 61 is a perspective, partially schematic view of the major components of a first embodiment of a machine equipped with a graphic insertion unit in accordance with the invention;

FIG. 62 is a partially schematic cross-sectional view of the device of FIG. 61;

FIG. 63 is a schematic circuit diagram of a control circuit for operating the device shown in FIGS. 61 and 62;

FIG. 64 is a schematic representation of a portion of the device shown in FIGS. 65 and 66;

FIGS. 65 and 66 are schematic cross-sectional and perspective views, respectively, of another embodiment of the combined text and graphics output system for the machine of the present invention;

FIG. 67 is a cross-sectional view of a zoom-lens used in the present invention;

FIGS. 68 and 70 are schematic plan views illustrating a method of semi-automatic insertion of graphic matter;

FIGS. 69 and 71 are cross-sectional views of the subject matter of FIGS. 68 and 70, respectively; and FIG. 72 is a schematic cross-sectional view of another device for the semi-automatic insertion of graphic matter.

MULTI-PETAL STORAGE MACHINE

A. General Description

Figures 1, 1A:
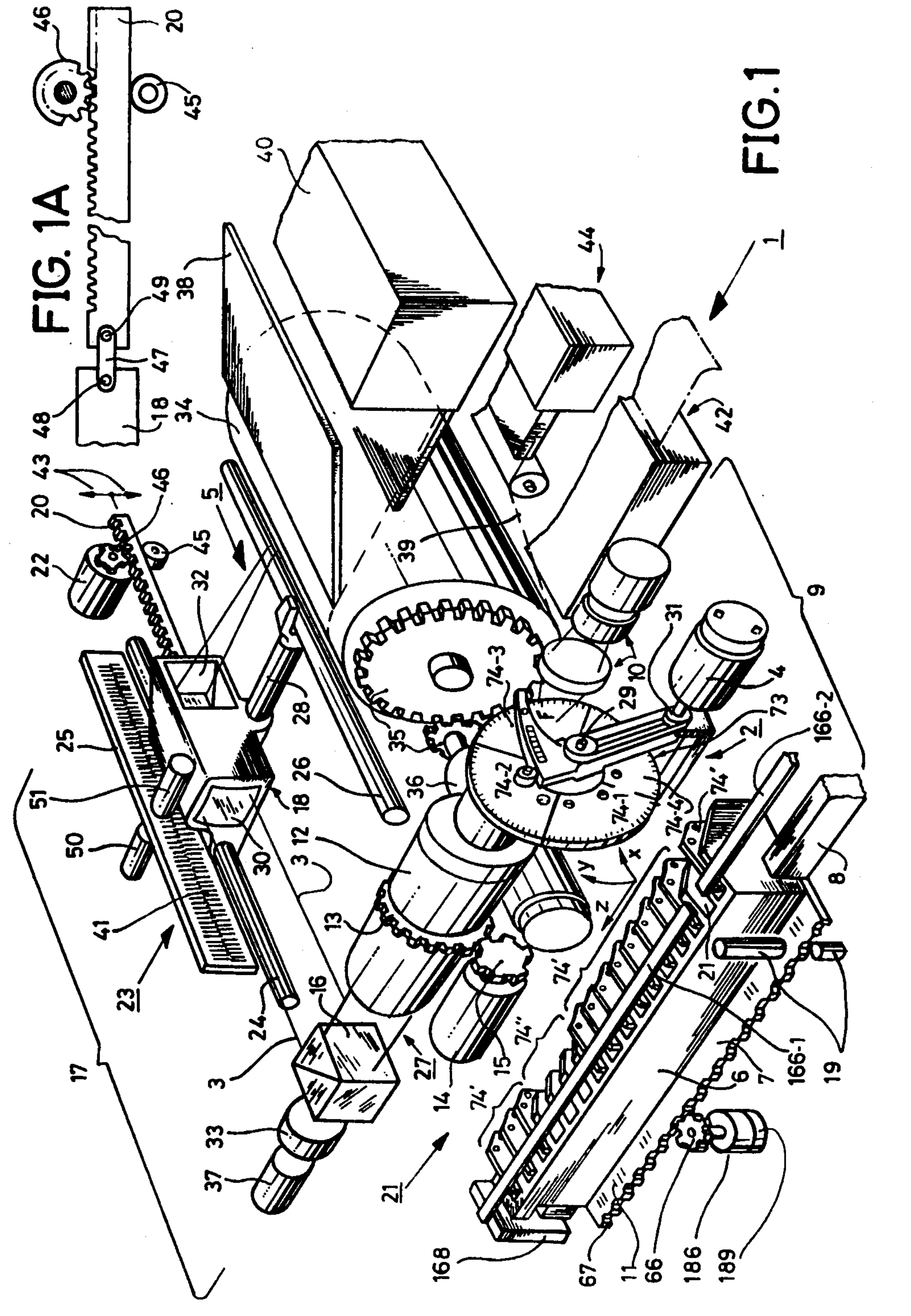
FIG. 1 is a simplified, partially schematic perspective view of the preferred photographic unit of a photocomposing machine constructed in accordance with the invention.
FIG. 1A is a schematic representation of the drive connection of the character spacing carriage of the device of FIG. 1.

FIG. 1 is a perspective view of the major components of the photographic unit 1 of a photocomposing machine. It should be understood that the complete photocomposing machine normally will include an input unit, such as a keyboard, and electrical control units, as well as the photographic unit 1. However, only the photographic unit is shown in FIG. 1, for the sake of clarity in the drawings.

The photographic unit 1 includes an image presentation unit 9, an image projection unit 17, and an image recording surface comprising the surface of a drum 34 bearing photosensitive material.

The image projection unit includes an image sizing unit 21 for determining the sizes of images projected onto the recording surface, and an image spacing unit 23 for directing and spacing the images on the recording surface 34.

A notable feature of the character presentation unit 9 is its capability for automatically changing the make up of a composite disc by selecting an image matrix from a relatively large number of individually stored matrices. These matrices are single-font pie-shaped matrix segments, which will be referred to as "petals" herein.

Four of the petals 74-1; 74-2; 74-3; and 74-4 are assembled together to form a circular matrix disc 73. Each petal may contain 132 different alphanumeric characters. The characters are transparent on an opaque background, as it is well known in the art. The disc is mounted for continuous rotation about an axis 29 which is located on a disc support or "swing-arm" mechanism generally represented by reference numeral 2.

In accordance with one feature of the invention, an elongated magazine 6 is provided for storing a plurality of petals 74'. The magazine 6 shown in FIG. 1 can contain up to 16 petals, each representing a different type style or face. However, magazines capable of storing even more petals (e.g., thirty-two or more) are highly desirable. In FIG. 1, the magazine 6 contains twelve petals 74'. There are four empty slots 74" from which the four petals 74-1 through 74-4 have been removed to form the disc 73.

Any character on the stored petals (sixteen petals, in this case) can be accessed automatically, either by the rotation of the four-petal disc 73 alone, or by selection of another petal, by rotation of the disc support mechanism 2 around a pivot axis 31, and/or by the longitudinal displacement of the magazine 6, together with rotation of the disc 73. These different selecting motions are represented by arrows x, y and z in FIG. 1. The y-axis selection is the rotation of the disc 73 which is produced by a motor 4 through a drive belt. Selection along the x axis is achieved in a manner which will be explained later. Selection along the z axis, that is, the selection of a petal from the petals magazine 6, is achieved by sliding the magazine along a rail 8 by means of a motor 186 driving a pinion 66 engaging a rack 67 which is secured to the magazine 6. The exact location of the magazine may be detected by photodetector means 19 sensing a reticule or grating 11 which is supported by the rack 67. Alternatively, the position of the magazine 6 can be detected by a decoder 189 associated with the magazine motor 186, as it will be explained later.

Each petal location is represented by a unique code or unique pulse count from a magazine home position. The detector means 19 co-operates with the longitudinal displacement control mechanism of magazine 6 in order to move it in one direction or the other to quickly bring a pre-selected petal to a loading position, in a manner which will be explained in greater detail below. The loading position is a slot 21 which is defined by a pair of rigid, stationary strips 166-1 and 166-2 which serve as barriers to the removal of other petals.

Selected characters are illuminated by a conventional condenser and flash-lamp assembly 10, and the character-bearing light beams emerging from the selected petal enter the image sizing unit 21.

The sizing unit 21 includes a commercially-available zoom lens 12 which, according to one feature of the invention, is reversed from its normal orientation. More specifically, what would be the image plane if the zoom lens 12 were used in a camera is the object plane in FIG. 1. The zoom lens is focused to infinity, so that the light emerging from what is normally the entrance (and now is the exit) of the zoom lens tends to make an image of the illuminated character at infinity. Thus, the light emerging from the zoom lens is collimated. The zoom lens enlargement ratio is controlled by a motor 14 and gears 15 and 13.

The photocomposing machine of this invention uses very light and small matrices bearing smaller-than-normal master characters so that the zoom lens is used exclusively for enlarging the master character images.

The collimated light beams 27 emerging from the zoom lens may be: divided into two components by a beam splitter 16 which lets a relatively small fraction of the light through to an optical system 33 and photodetector 37 for the purposes which will be explained below. The major portion of the light beams 27 is reflected ninety degrees, as shown, along lines 3 towards a decollimating or imaging lens 30 mounted on an image-spacing carriage 18 forming a part of the image-spacing mechanism 23. The lens 30 directs the light towards a mirror 39 on the carriage 18 which reflects the images by another ninety degrees and directs them along lines 5 onto the recording surface on the drum 34. The spacing carriage operates basically as described in U.S. Pat. No. 2,670,665.

The spacing carriage 18 slides on rails 24 and 26 which are relatively widely spaced apart to insure great stability and, therefore, excellent accuracy in the positioning of characters along a line. An extension arm 28 engages the rail 26. The purpose of this is to obtain stability without unduly increasing the carriage size and weight.

The spacing carriage 18 is driven along its guide rails by a motor 22 provided with a gear 46 meshing with a rack 20. In order to avoid backlash, the rack preferably is forced into engagement with the gear 46 by a spring-loaded roller 45. Also, in order to avoid possible jamming caused by misalignment of the components, the rack 20 is attached to the carriage so as to give it a slight up-and-down or transverse degree of freedom (schematically represented by arrows 43), to the exclusion of any longitudinal play. A preferred embodiment for achieving this end is schematically shown in FIG. 1A where a link 47 is pivotally attached to carriage 18 by pivot 48 and to rack 20 by pivot 49.

An elongated plate 25 with a reticule or grating 41 is attached to the spacing carriage 18 and cooperates with stationary photodetector means 50, 51 for the purpose of continuously feeding back positional information to the carriage displacement control circuit (not shown in FIG. 1) which is utilized to operate the spacing mechanism to compose a line of text.

The drum 34 upon which the photosensitive material is located is rotated in steps for leading or line-spacing purposes by a motor 36 and gearing 35. The photosensitive material can be fed to the drum in sheet form from a platform 38, or in roll form from a supply magazine 40. The sheet-feeding operating mode is preferred for the production of printing plates using a zinc-oxide coating.

Individual pre-cut sheets preferably are exposed and developed through the use of electrophotographic processing means well known in the art. Such sheets are processed one-at-a-time in a receptacle 42 containing a liquid toner, as it will be explained in greater detail below.

When rolls of conventional photographic film or paper are used, the exposed section 39 containing galleys or pages is fed into an output cassette 44. The machine can produce either electrophotographic plates or conventional film, with a minimum of changes from one mode of operation to the other. This is of particular importance for commercial printers who may have an occasional urgent, relatively short-run and simple composing job to do, in which case the electrophotographic mode is preferred, since a printing plate is directly obtained, but who would frequently use conventional rolls of film to produce long galleys of text for subsequent corrections, alterations and page make-up. The electrophotographic process, however, can be used to produce a "dry" copy which can be duplicated on an office copier for the production of proofs or a relatively small number of copies.

Figure 2:
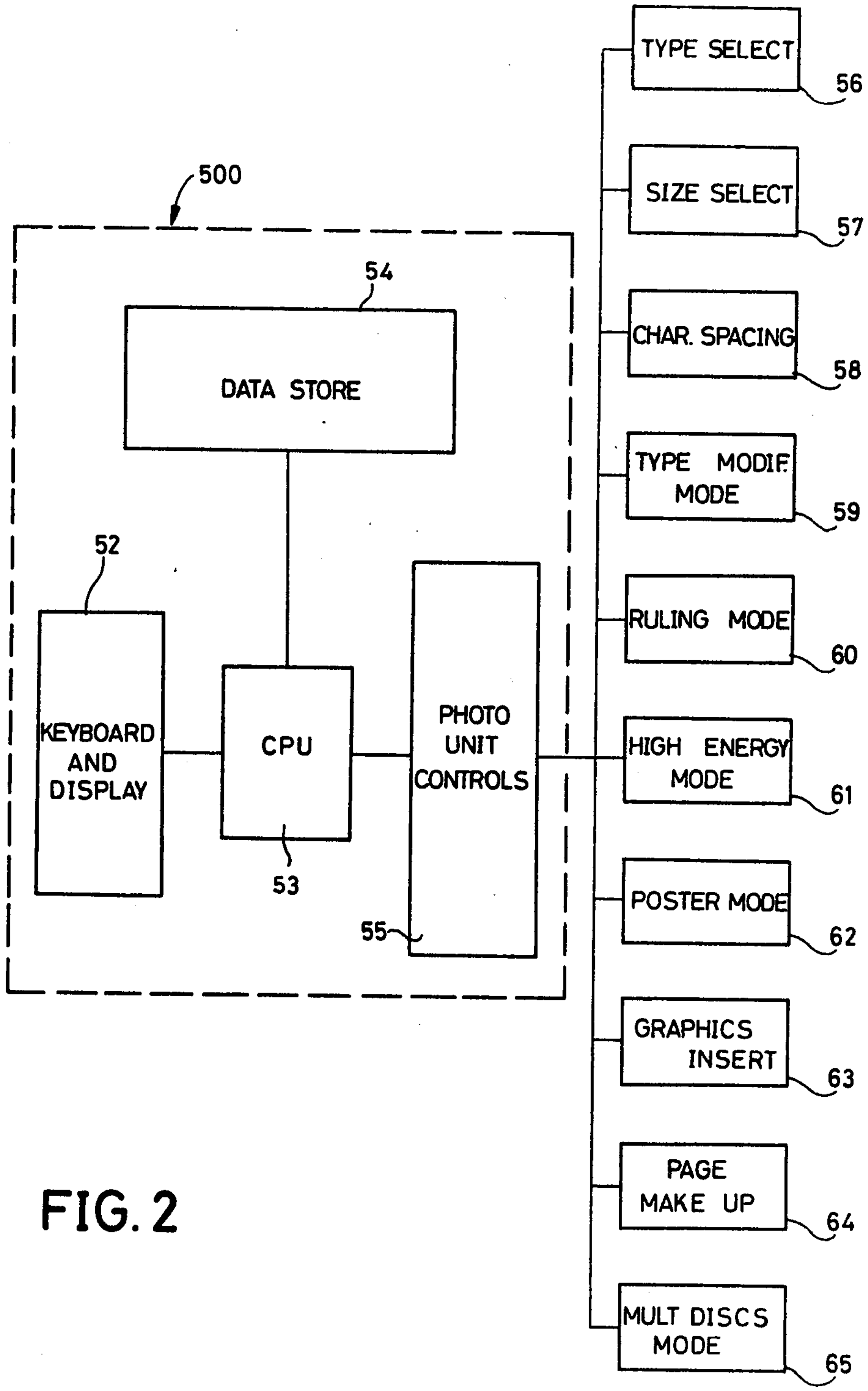
FIG. 2 is a block diagram of the control system of the photocomposing machine of the present invention, and illustrating several of the principal operating modes and functions of the system.

The general capabilities and organization of the complete machine are illustrated schematically in FIG. 2. The photo-unit controls 55 receive all of the necessary information for the composing function of the photographic unit 75 from a CPU 53 connected to a data storage unit 54 and/or to a keyboard-display unit or units 52. The different modes of operation of the machine, as well as its different functions, are illustrated by blocks 52 through 65. Each block represents a separate circuit or specific control circuitry of a single data processor.

B. Petal Structure

Figure 3:
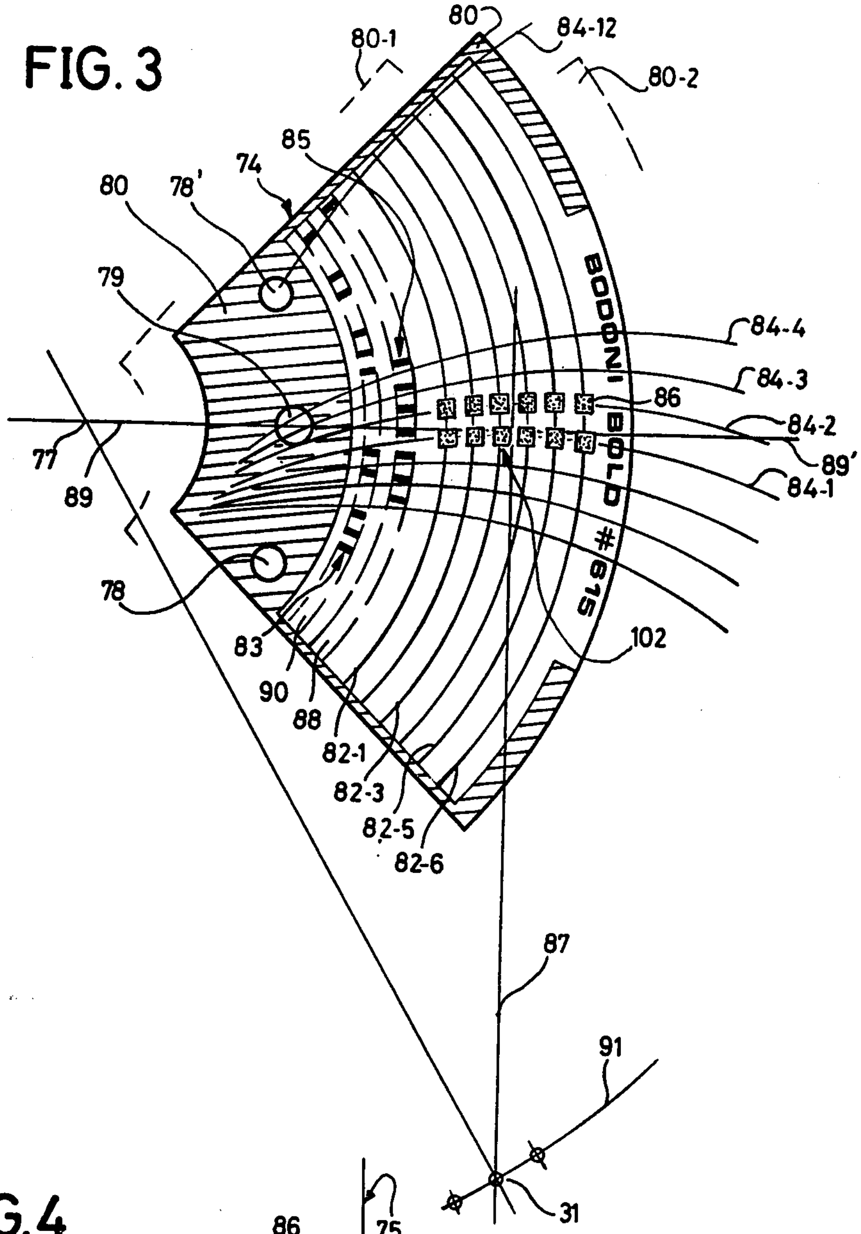
FIG. 3 is a plan view of a character petal used in the machine of FIG. 1 with a schematic representation of its information structure.
Figure 5A:
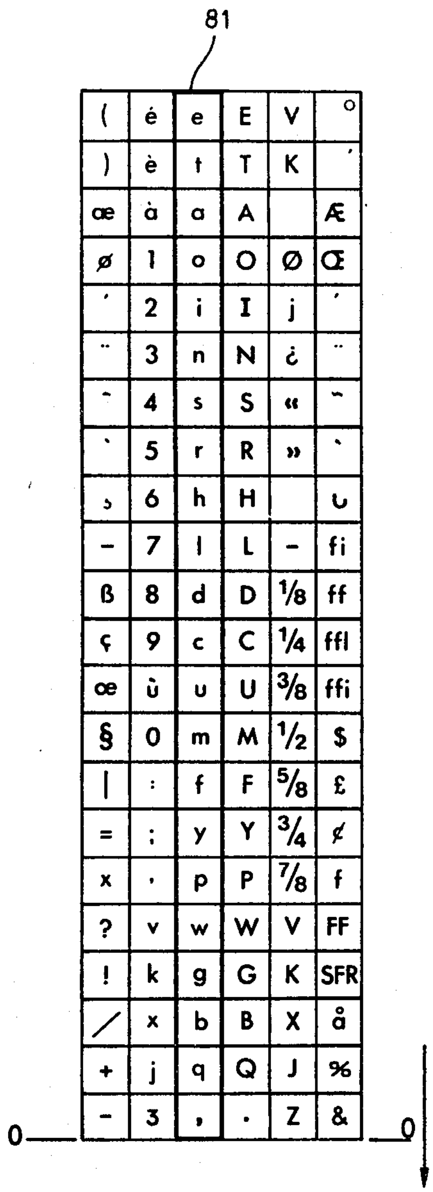
FIGS. 5 and 5A are schematic diagrams showing the locations of characters on a petal.
Figure 5B:
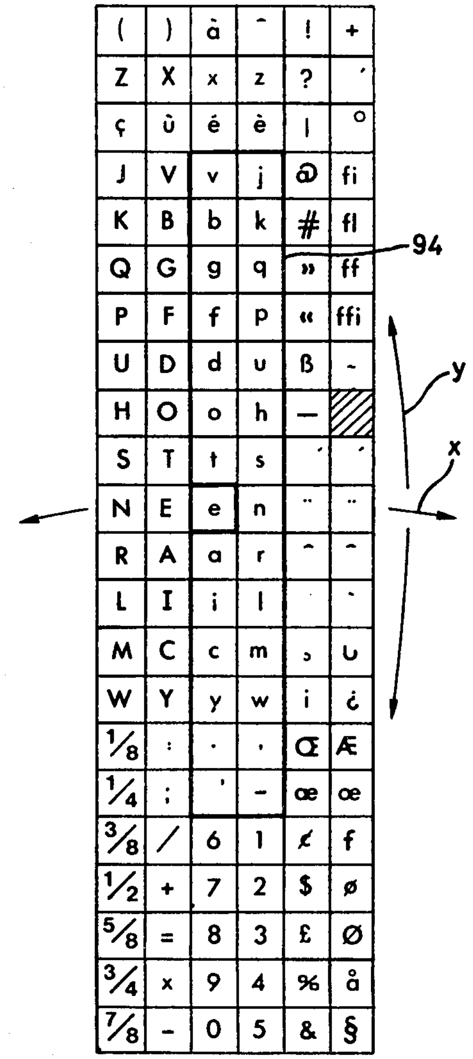

A character-bearing petal 74 is shown in detail in FIG. 3. The petal 74 contains a complete array of capital and lower-case characters, as well as punctuation marks, special signs, etc., as illustrated in FIGS. 5A and 5B.

Because of some of the operating characteristics of the character presentation system utilized in the machine, each petal should be as light and small as possible. In order to obtain images of high quality from the machine, the characters located on the petal should be of even higher quality so as to show no objectionable deterioration after enlargement. In addition, the image-bearing surface of the petal should be relatively resistant to abrasion, manipulation and occasional cleaning. For the above mentioned reasons, in a preferred embodiment, the transparent characters on an opaque background are produced by etching away an extremely thin metallic coating on the transparent base material of the petal. The remaining metal serves as the background, and the places where the metal has been etched away form the master characters.

Figure 4:
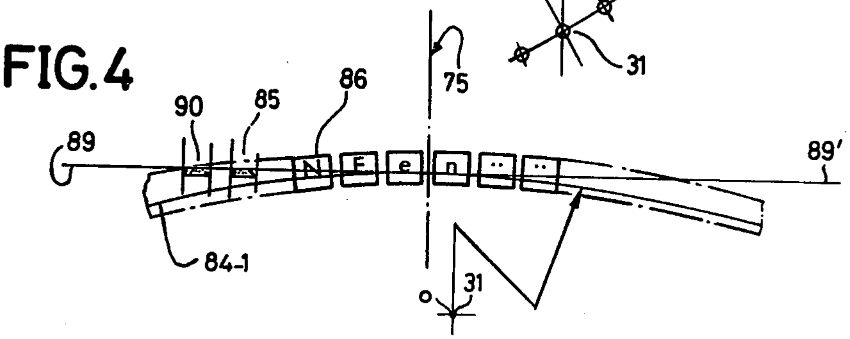
FIG. 4 is a partially schematic plan view of a row of characters on a petal.

The petal 74 bears 132 characters, of which only eighteen are shown in FIG. 3. Those eighteen characters are shown as the squares 86. Each character is located along one of six concentric circles shown at 82-1 to 82-6 whose centers are at point 77, the center of the disc 73. Each character is located at the intersection of one of the circles 82-1, 82-2, etc. with other circles, such as 84-1, 84-2, 84-3, whose centers are located at different points along a circle 91 which is concentric with circles 82-1, 82-2, etc. The radius of circle 91 is equal to the distance between pivot point 31 (also see FIGS. 1 and 6) and point 77. Each square 86 of FIGS. 3 and 4 represents the maximum area occupied by the character.

Each character is accurately located in each area 86 in relation to two lines: a base line and a reference line, as explained in U.S. Pat. No. 3,291,015. The intersection of these two lines, called the reference point, may be located on the circle intersections mentioned above.

Timing slits such as slits 85 are located on a circle 88. Each timing slit of a row (84-1; 84-2; etc.) is substantially aligned with that row, so that each petal contains all of the timing slits needed to time the flashing of every character on the petal 74.

The pivot axis of the swing arm 2 is shown at 31 in FIGS. 3 and 1. The petal 74 is shown in FIG. 3 in a neutral central position with the optical axis 102 located between rows 82-3 and 82-4, at the intersection of arc 84-1 and line 89—89'. Line 89—89' is defined as the line connecting the optical axis 102 and the axis 77 of rotation of the disc 73. In the position of the petal shown, any character located on arc 84-1 can be brought into projection position, that is, on the optical axis 102, by swinging the petal around pivot point 31. Point 31 is located on line 87 which intersects the optical axis and is perpendicular to line 89—89'.

The distance between the optical axis 102 and the pivot point 31 should be relatively small so as to decrease the weight of the swing arm assembly, and yet large enough to reduce the space lost between the most distant row such as 84-12, its associated timing slit 85 and the straight radial edge of the petal.

The extreme positions of the petal, if it were not rotating but remained free to move around pivot point 31, are shown at 80-1 and 80-2. Those positions correspond to projection positions for the characters located on outside circle 82-6 and inner circle 82-1, respectively.

Each petal is provided with two locating holes 78 and 78' and a central hole 79, for purposes to be explained later. The shaded areas 80 of the petal surface represent areas free of images, which preferably are the only flat surface areas contacted by the petal-handling mechanism, as it will be explained in relation to FIGS. 14 to 17.

Another advantageous feature of the invention is that a unique identification code is provided for each petal. A coded pattern is recorded on the petal in an arc 90. It can be appreciated that a large number of bits, each one represented by a slit such as 83 can be provided on each segment to generate a unique reference number representative of the particular petal or type face or font. The spacing between slits 83 varies in accordance with the code. These identity slits or marks are read by a photodetector (not shown in FIG. 3) and the output pulses are transferred to a memory so that the control unit of the machine knows at all times which petals are assembled to form a disc 73, which petals are in the magazine, and in which slot each is located, as it will be described in greater detail below.

Preferably, the identity code of each petal contains coded data to indicate whether the petal in use contains a thin, light face or a heavy, bold face. The latter data is utilized to act on the flash circuit in the manner explained in co-pending application Ser. No. 899,001, filed Apr. 21, 1978, in order to decrease the light flux reaching the photosensitive material if a bold face is used, and increase it if a light face is used.

It is a feature of the invention to position any preselected character character on the optical axis 102 of the machine (and the zoom lens 12) by selective rotation of the disc 73 to give y selection, and, whenever necessary, by simultaneous displacement of the disc along an arc to give x selection. In order to obtain the required relatively high positioning accuracy in a relatively short time, it is desirable to use small and light petals, as mentioned above, and, in addition, all the characters of one style or font should be located in an area as small as possible. Thus, in the embodiment illustrated, the disc 73 contains no more than four petals, which provide for four different styles, a number sufficient for most composition jobs. Also, the swing-arm 2 is made as lightweight as possible, so that maximum character selection speed is obtained.

FIG. 4 shows schematically the relative positions of a row of characters, their associated timing slit 84 and a one-bit identity mark 90. The timing slit 85 and identity mark 90 are adjacent to the line 89—89', which is tangent to arc 84-1 at the center 75 of the character row.

FIG. 5B illustrates schematically a preferred arrangement of characters on a petal for a modulated matrix speed mode of operation of the machine. In this mode, rather than continuously rotating in one direction, the petal is moved in a high-low speed mode in one direction or the other around the axis 77 within a 90 degrees arc. Vertical columns in FIG. 5B correspond to circles 82-1 through 82-6 of FIG. 3, and the horizontal rows in FIG. 5B correspond to the rows 84-1, 84-2, etc., of FIG. 3.

The most frequently used characters are grouped in an area framed by heavy lines 94 in FIG. 5B. The area 94 includes more than 90% of the characters usually utilized for text composition in the languages of the western world. The grouping of most frequently used characters in a small area around the most frequently used letter, lower case "e", helps to increase the speed of the character selection process by decreasing the average petal motion during text composition.

FIG. 5A shows a preferred arrangement of the characters of a petal for the other mode of operation of the machine, in which the disc 73 spins continuously. In this figure, the most frequently-used characters are located in a column 81 which is framed by heavy lines. These characters also represent close to 90% of all the characters found in the ordinary text of western languages. It can be appreciated that, with four petals in the disc 73, the time available for moving the swing arm 2 to change the column of characters (by x motion) is three-quarters of the time necessary for a complete revolution of the disc 73. The swing-arm 2 operates at such a speed that it can swing from a column to an adjacent column in substantially less time than it takes for the petal to rotate three quarters of a revolution.

In order to minimize its size and weight, each petal 74 is made of a relatively thin, rigid transparent material such as plexiglass. The plexiglass is given a thin, uniform deposited coating of aluminum, and the characters and slits are formed by photo-etching techniques. By the use of such means, the characters can be made quite small and yet with such high quality that they can be enlarged twenty-two times or more to produce larger characters of highly acceptable quality.

Using the foregoing means, petals 74 have been made and used successfully having a radial width of about 3 cm. (about 1.17 inches), forming a composite disc having a radius of about 4.5 cm. (about 1.75 inches). The material of the petals is plexiglass whose thickness is 0.8 mm. (0.31 inch). The size of the characters is 3.24 points. The petal 74 and the composite disc 73 made up of four such petals thus is quite small and has a relatively low mass, making it relatively easy to move. This enhances x selection and facilitates changing the speed of the disc quickly and smoothly.

C. Circular Row Selection

Figure 6:
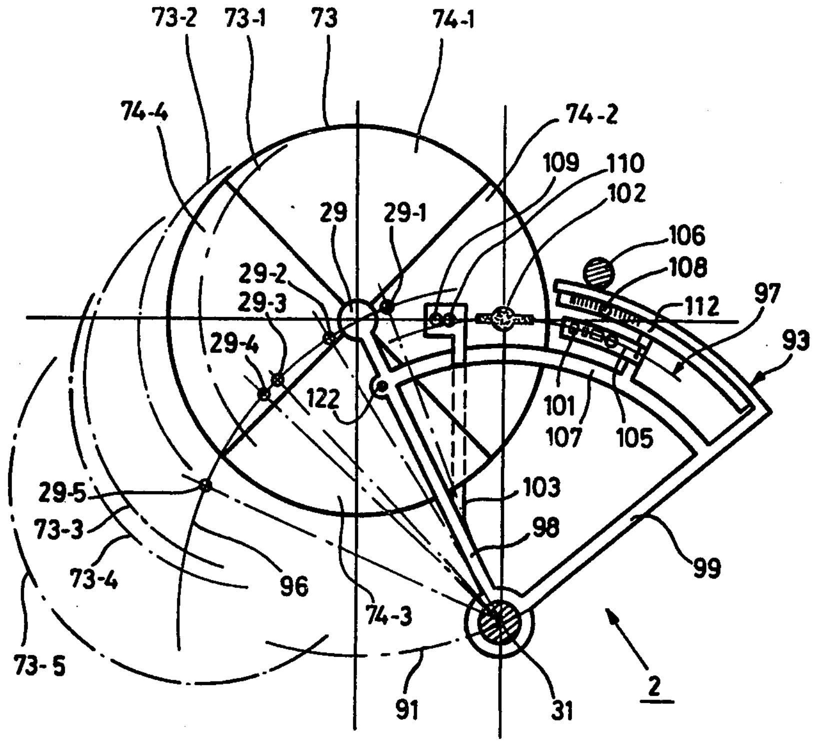
FIG. 6 is a schematic view of the matrix support "swing arm" of the FIG. 1 device.

FIG. 6 is a schematic representation of the swing-arm assembly 2. The extreme operating positions are shown in dashed lines. The shaded areas represent stationary components. The pivot axis for the arm is shown at 31, the optical axis at 102, a swing-arm control gear at 106, and a photodetector at 108. As it is shown in FIG. 1, as well as FIG. 6, the disc 73 is composed of four petals 74-1 to 74-4.

The most extreme positions used for character projection are shown at 73-1, for the innermost character circle, and at 73-2 for the outermost character circle. The disc 73 is shown in FIG. 6 in solid lines in a median position. Positions 73-3 and 73-4 represent locations for the projection of rules or "pi" characters, and position 73-5 illustrates the most extreme position of the disc 73 for the unloading or loading of a petal to or from the petals magazine 6.

The rotational axis 29 (FIG. 1) of the disc 73 moves along an arc 96 from a first position 29 to another position 29-1 in one direction, and through to an extreme position 29-5 in the opposite direction. The swing-arm assembly 2 is composed of light, rigid radial members 98, 99 and 103, and an arcuate connecting link 107.

Arm 107 holds a photodetector 122 co-operating with a light source (not shown) and a hole 123 (FIG. 7) located in the hub of the disc 73 in order to produce a synchronizing or initializing pulse for each revolution of the disc 73. Arcuate link 107 supports a plate on which photodetectors 109 and 110 are located. Photodetector 109 reads the identity code of each segment, and photodetector 110 generates timing pulses from the slits 85, in a conventional manner. The detectors 109, 110 cooperate with a light source (not shown) which may comprise two small lamps or a LED located on the other side of the petals. The position of swing-arm assembly 2 around pivot axis 31 is controlled by a mechanism at a fixed location comprising the gear 106 engaging an arcuate rack 93 supported by the arm 98 and member 107.

An arcuate coded plate 112 also is attached to the arm 98 and member 107 and cooperates with the photodetector 95.

A small plate 105 is also attached to arcuate link 107. The plate 105 is provided with apertures 101 of different sizes and/or shapes aligned along a line 97 to produce rules by shining a light through a selected aperture. To make rules, disc 73 is first moved out of the way by swinging the supporting arm assembly to a position such as 73-3 in which plate 105 replaces the petal in the object plane of the zoom lens.

The machine herein described preferably includes means for the automatic correction of inaccuracies introduced by the variable focal optics. These corrective functions will be described in more detail later. In one embodiment special "characters" in the form of lines, squares, bullets, etc. are projected onto photodetectors from properly shaped apertures of the plate 105. In the feed-back system utilizing the beam splitter of FIG. 1, a special filter can be attached to the plate 105 to block the shorter wavelength radiation that would "expose" the film and let the longer (red) radiation go through to energize the photodetectors.

When the selected aperture 101 is in position, the flash lamp, normally fired only once per revolution for the projection of characters, is flashed with a reduced energy at a higher frequency, producing, for example, 1,000 flashes per second. At the same time, the spacing carriage 18 is moved continuously, so as to produce horizontal lines or "rules" on the photosensitive surface. Alternatively, the photosensitive surface is continuously moved in the line-spacing direction to produce vertical rules. In either case there is a continuous feedback signal from the continuously moving component to the flash circuit in order to synchronize the flash command with the instantaneous position of that component.

D. Swing-Arm Assembly

Figure 9:
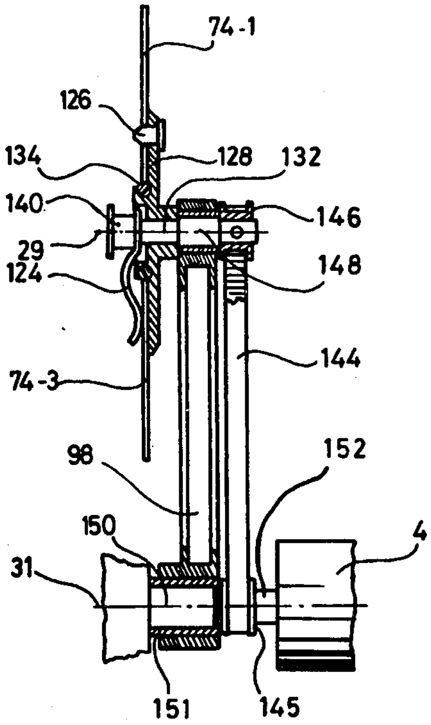
FIG. 9 is a side elevation view of the structure of FIG. 7.
Figure 11:
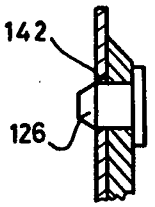
FIG. 11 is an enlarged, partially cross-sectional view of the petal locating assembly shown in FIG. 9.
Figure 12:
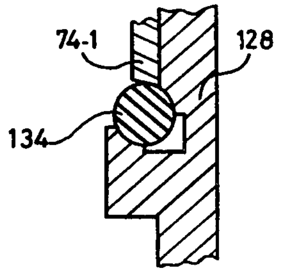
FIG. 12 is another enlarged, partially cross-sectional view of a portion of the petal holder assembly shown in FIG. 9.
Figure 10:
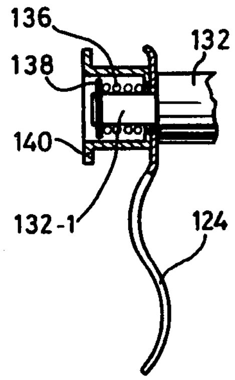
FIG. 10 is an enlarged, partially cross-sectional view of the mechanism used for holding the petals in FIG. 9.

The swing-arm assembly 22 and its components are shown in greater detail in FIGS. 7 through 12. Referring to FIGS. 7 to 9, the petals 74-1 to 74-4 are mounted on a hub 128 pinned to a shaft 132 (FIG. 9) whose rotational axis is the axis 29 shown in FIG. 1. The shaft 132 is rotated by the motor 4 through a shaft 152, a pulley 145, a belt 144 and a pulley 146. The motor shaft 152 is co-axial with the axis 31. The arm 98 can rotate about axis 31 on a stationary shaft or stud 150 for the various functions mentioned above, which are, more specifically: character selection from a multiplicity of circles; rules or pi-character selection; loading and unloading of a petal; clearing of the optical axis for other purposes, such as allowing the use of an auxiliary input signs disc.

Arm 98 is rotatably mounted on the stud 150 by means of a bearing 151 substantially without radial or axial play. Similarly, shaft 132 can rotate freely but substantially without play in a bearing 148 housed in a hole in the upper end of arm 98. Although plain bearings have been shown at 148 and 151 for simplicity's sake, the use of pre-loaded, free-of-play ball bearings is preferred.

In the structure illustrated in FIG. 7, different petals are shown in some detail at 74-1 and 74-4. The location and orientation of petal 74-4 in the loading-unloading position is represented in broken lines at 74-4'. Petals 74-2 and 74-3 have been omitted in order to show that hub 128 has locating pins 126, notches 130 and the clearance hole 123 cooperating with the initializing photodetector assembly 122 described above and shown in FIG. 6.

A motor 116 drives the gear 106 to select one of the arcuate character arrays on a petal. The gear 106 engages an arcuate rack 104. (Although some parts shown in FIG. 6 are the same as those in FIG. 7, others are not. Hence, different reference numerals sometimes are used). Attached to a plate 114 mounted on frame 98 is an encoder-decoder reticule or grating 112 cooperating with the photodetector unit 108. The timing photoreceptor is shown at 118 (FIG. 8) and the code detector at 109, located on an adjustable plate 111 mounted on arm 99. Removably secured to arm 99 is a plate 118 provided with "rules" openings and/or pi-characters 120.

FIG. 9 is a partial cross-section through the center of FIG. 7. FIG. 9 shows that segments 74-1 and 74-3 are positioned on the hub 128 by means of pins 126 which are attached to the hub 128. The pins 126 fit into holes such as 78—78' (FIGS. 7 and 3). For easier engagement and removal of a petal, the holes 78—78' may be slightly larger than the pins, leaving a small clearance shown at 142 in FIG. 11. It can be understood that the centrifugal force developed during the rotation of the petals will tend to push the petals outwardly so that the exact radial location of a petal will be obtained by the engagement of pin 126 with the edge of the petal hole 78 which is closest to the axis of rotation 31. Moreover, to ensure better contact between radial locating means, even when the assembly is not spinning, there is provided a resilient means such as an "O ring" shown at 134 (FIG. 12) secured in a groove of the hub 128 to push petal 74-1 outwardly against the radially innermost part of pin 126.

A special star-shaped leaf spring 124 is used to hold the petals in a desired axial position. The spring 124 is resiliently attached to stud 132-1 (see FIG. 10) by a coil spring 136 secured to the hub 128 by a retaining ring 138 and loosely attached tubular cover 140.

In FIGS. 7 and 8, it has been assumed that the timing slits and identity codes are located on the outside of each petal. However, their location is immaterial as long as all the marks for timing or identity are located within the confines of the petal.

The automatic selection, removal and insertion of petals will now be described.

E. Petal Magazine Structure

Referring now to FIGS. 13 through 15, the petals 74 are located in notches or compartments such as compartment 154 (FIG. 13D), of the magazine assembly 6. The magazine assembly 6 includes a base 170, to which are secured vertical side plates 158 and 160. The side plates are assembled in pairs, each pair of plates 158, 160 forming one of the compartments 154.

Side plates 160, shown in elevation in FIG. 14 and in section in FIG. 14A, are located on the image-bearing side of each petal. In order to avoid damaging the characters on the petal, raised portions 174-175 are provided. These portions 174-175 contact only the blank or non-character-bearing areas 80 (FIG. 3) of the petals. In the same manner, opposite supporting plates such as 158, also shown in FIGS. 15 and 15A, are also provided with raised areas 180 to contact the petals in non-image areas, thus avoiding detrimental scratches on the petals during handling.

The magazine assembly holder, mounted in fixed location on the base of the machine and comprising guiding and driving means, as explained above, is also provided with retaining strip 166-1 and 166-2 extending along the path of the magazine for the purpose of keeping the unused petals in their slots during the longitudinal displacement of the magazine, and also to secure in the slot 21 a petal in the process of being removed, as it will be explained below.

F. Petal Unloading and Loading

Assume that a petal such as 74 in FIG. 13A has to be removed from the disc 73. The petals-carrying hub 128 is first rotated to the unloading position of the petal, and then is locked against unwanted rotation, either by locking the motor drive, or by a detent. Then, or simultaneously, the petals magazine 6 is moved to bring the empty slot 154 for that petal to the unloading position in which the empty slot is in alignment with the gap 21. Then the swing-arm mechanism 2 is moved to the "loading" position (shown at 73-5 in FIG. 6) so that, at the end of the operation, the petal has entered its compartment as shown schematically in FIG. 13A, with the raised portions of the plates 158 and 160 opposite the non-image areas 80 of petal 74.

At this point the petal is still engaged by the locating pin 126 (FIG. 13A') and held against the flat hub surface 156. After the petal is fully inserted into its compartment, the petals magazine is moved a pre-determined distance in the direction of arrow 164 (FIG. 13B). Since the hub assembly is fixed, this motion moves the petal from position 74 to position 74' because said petal is now confined to its notch. This action causes the locating pin 126 to disengage from the petal, as shown in FIG. 13B' as the petal is pushed in the direction of the arrow by plate 160-2. In order to avoid unwanted locking or canting of the petal, the raised extension 174' (see FIG. 14) cooperates with clearance notch 130' (FIG. 7) of the hub in order to apply a disengaging force as close to the locating pin as possible. This displacement is relatively small and does not cause detrimental strain on blade spring 124 because of the elastic configuration of the assembly of FIG. 10, from which it is clear that coil spring 136 prevents excessive deflection of the blade 124. In the next sequence of operation, the swing-arm is moved upwardly to disengage from the replaced petal, as it is shown in FIG. 13C. It is shown in this figure that petal 74 cannot be moved out of its notch by the arm motion because it has moved under retaining strip 166-1.

FIG. 13D shows the relative position of the petals magazine and the hub 128 at the beginning of an "unload" operation or at the end of a "load" operation.

To load a petal, the reverse sequence of operations takes place. The free quadrant of the hub 128 (i.e., the quadrant which has no petal) is first rotated to the "load" position at the same time as the petals magazine is moved to bring the desired petal to the load position. Then the swing-arm is moved downwardly so that the relative position of components is as shown in FIGS. 13B and 13B'. Then the magazine is moved along its rail 8 (FIG. 1) by the pre-determined distance necessary to bring plate 160 from position 160-2 to position 160-1. This action results in engaging the new petal on to the locating pin 126 so that, at the end of the operation, the relative position of components is as shown in FIG. 13A and 13A'. Then the swing-arm is returned into any pre-determined operating position by rotation around its pivot 132.

It follows from the above that the load and unload positons of the magazine for a given notch are different. In the load position shown in FIG. 13B and 13B' and 13C, the petal is in such a position that it will not interfere with the locating pin 126 as the hub 128 moves down. The passage from load position to unload position illustrated in FIG. 13A causes engagement of petal and pin.

Figure 40:
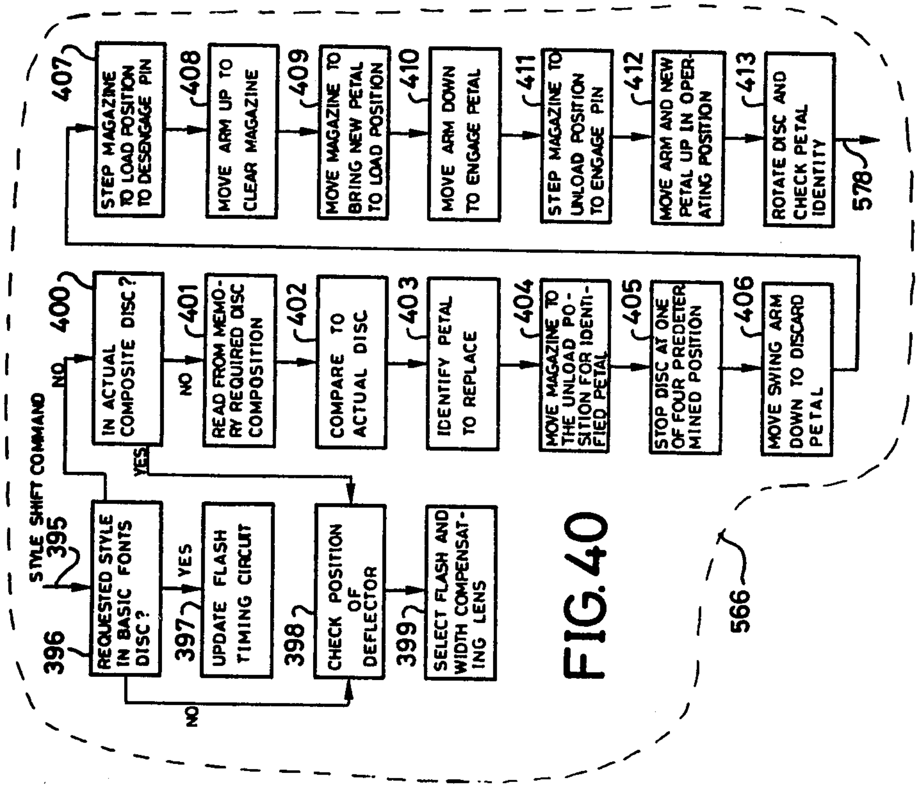
FIG. 40 is a block diagram illustrating the style selection process in a first embodiment of the invention.

The sequence of operations for the replacement of a petal by another is shown schematically in FIG. 40, blocks 400 to 413. Blocks 396 to 399 of FIG. 40 pertain to a modified version of the machine and will be explained later.

G. Initial Magazine Loading

In the preferred embodiment, there is provided a total of thirty-two petals in the magazine 6. This number is sufficient for a large number of composing jobs. The thirty-two petals required to be "on line" are selected by the operator and are manually inserted in a random sequence into the thirty-two notches of the magazine. Then the operator turns the machine on, and by depressing a key, starts the following sequence (see also FIG. 16):

The rotational control circuit 153 of the petals holder or disc 73 moves the holder into position to receive a petal and stops, for example, in position one (of four).

In the meantime, the magazine moves to position No. 1 under the control of the magazine displacement control circuit 157.

The petal in notch No. 1 of magazine is loaded, as explained above.

The swing-arm moves up under the control of circuits 147 and 149.

The rotational control circuit 153 causes the petal to rotate. The identity code of that petal is read by the detection unit 155 and stored in a storage unit 162 where it is associated with the position "one" code of the magazine which is stored in the unit 161.

The rotation of the petal stops at the load-unload position for the quadrant holding that petal.

The swing-arm 2 moves down to replace that petal in notch or compartment No. 1 of the magazine, following the unloading sequence described above.

The swing-arm (and now empty petal holder) moves up again.

The magazine moves one notch, under the control of units 157 and 159, to bring notch No. 2 into position to load the petal located in said notch.

The swing-arm moves down to load that new petal.

The swing-arm moves up.

The petal rotates, its identity is recognized and stored in association with the position "two" of the magazine.

The above-described basic sequence is repeated until there is a petal identity code associated with each position of the magazine. The machine is now ready to select any petal, under petal identity code control, from the associated keyboard memory means or any attached or remote input device.

MULTI-DISC STORAGE

A. General Description

Figure 18:
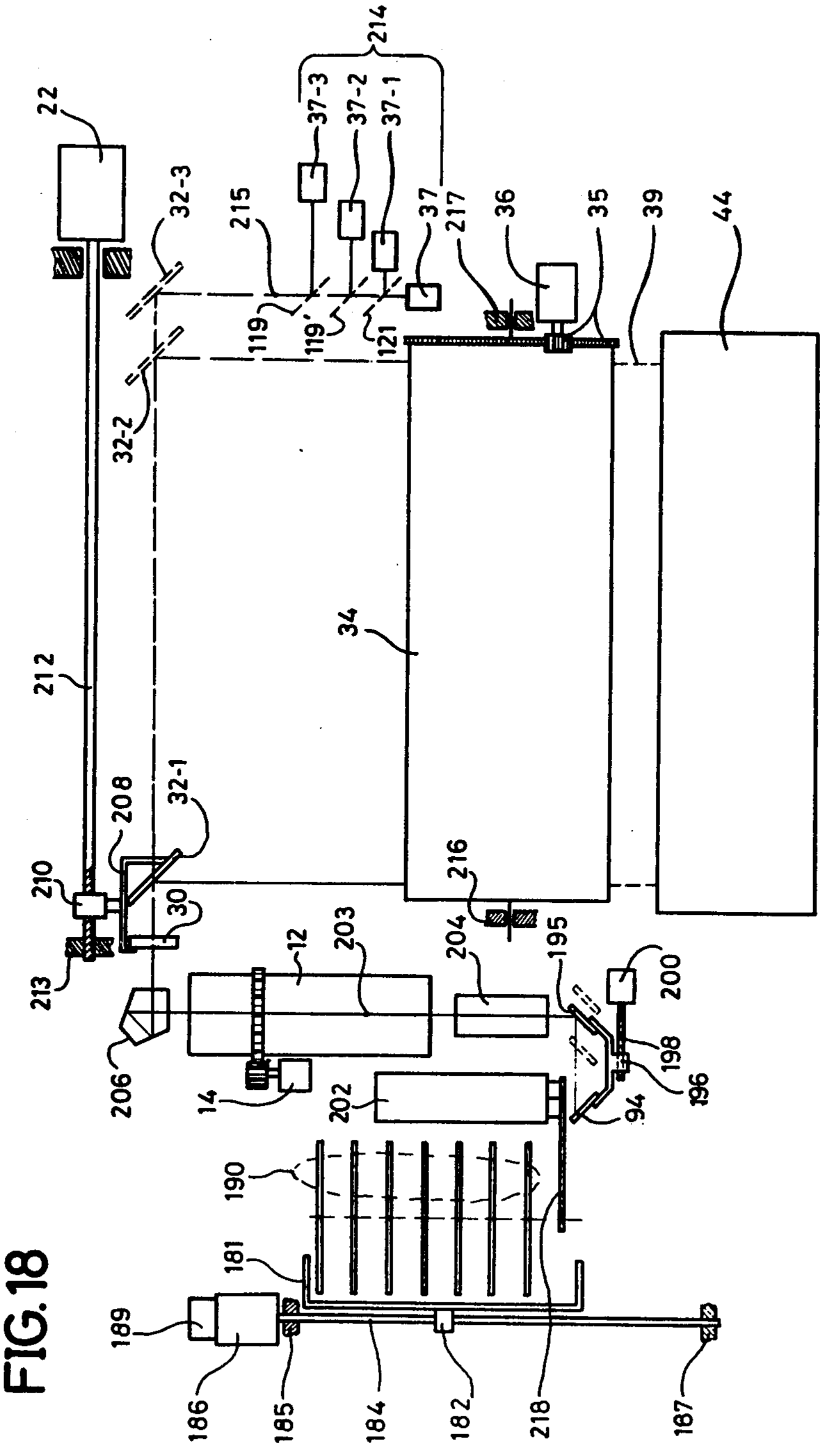
FIG. 18 is a schematic plan view showing the principal components of another photographic unit of the invention.

A modified version of the petals storage device is shown in FIGS. 18, 19A, 19B, 22 and 23 along with a modified photographic unit of the photocomposing machine. In this version, the magazine contains composite discs, such as the one shown in FIG. 19, rather than individual segments or petals. In FIG. 18, seven composite discs provided with four petals each are shown at 190 with one disc in operating position at 218. The disc magazine is shown at 181 with its displacement controls represented by motor 186, decoder 189, screw 184 engaging nut 182 attached to the magazine and mounted in bearings 185 and 187.

The character illuminator assembly is shown at 202. The circular row selection mechanism, which will be explained in greater detail later, consists of a pair of 45° reflectors 194, 195 mounted on a carriage 196. The carriage 196 has a threaded hole engaged by a screw 198 driven by motor 200 for transverse displacement of the reflectors.

An intermediate imaging system is shown at 204. The zoom lens is shown at 12, and its control at 14, the same as in FIG. 1. A pentaprism 206 is used rather than a right-angle prism, as an alternative to obtain right- or wrong-reading images, as it is explained in U.S. Pat. No. 4,230,399. The same reference numerals are used for corresponding parts in FIGS. 1 and 18.

A character spacing carriage similar to the carriage 18 of FIG. 1 is shown at 208. It is driven by a screw 212 which is rotated by a motor 22 and supported by bearings 213. The screw 212 engages a nut 210 attached to the carriage frame. The mirror 32 (see also FIG. 1) can move from position 32-1 to position 32-2 for the production of rules and also to the extreme position 32-3 to project a light beam 215 to photodetectors 214 for the automatic compensation of baseline, reference line deviations, and other corrections, as described in U.S. Pat. No. 4,230,399. The drum 34 is rotatably mounted in bearings 216 and 217 on the frame of the machine, and is rotated by the motor 36. The photosensitive material stored in cassette 44 is shown at 39, as it is in FIG. 1.

B. Disc Structure

Figure 19:
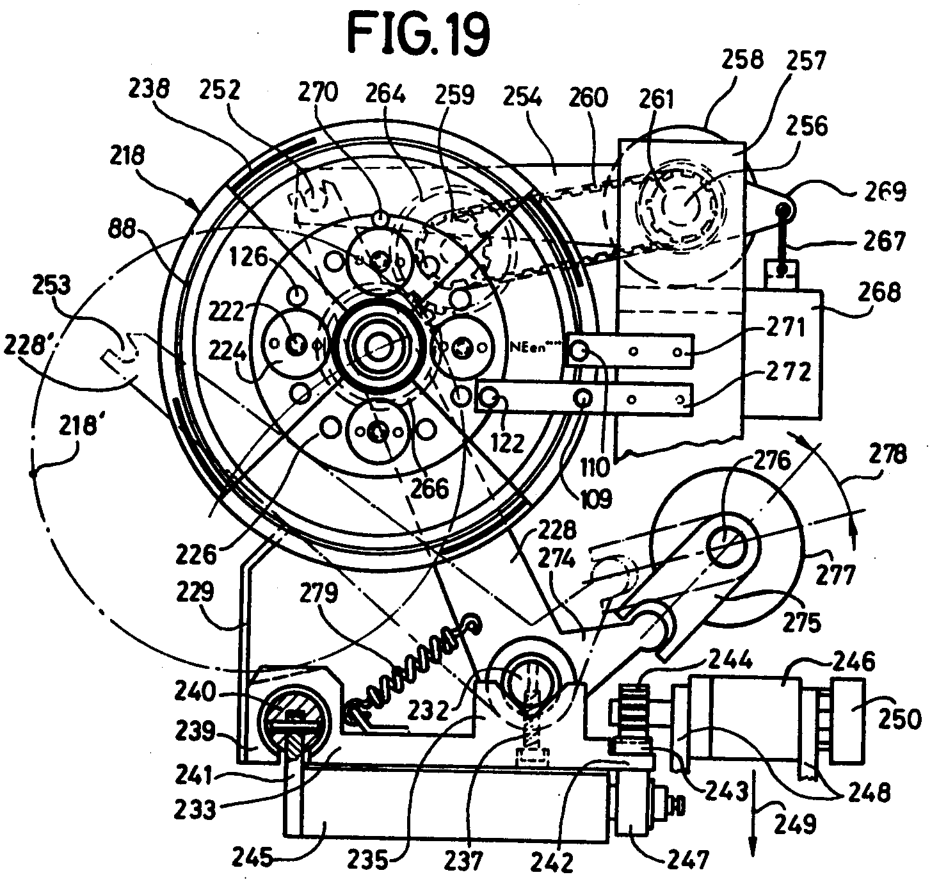
FIG. 19 is a front elevation view showing a multiple disc storage and retrieval system for use in an alternative embodiment of the invention.
Figure 22:
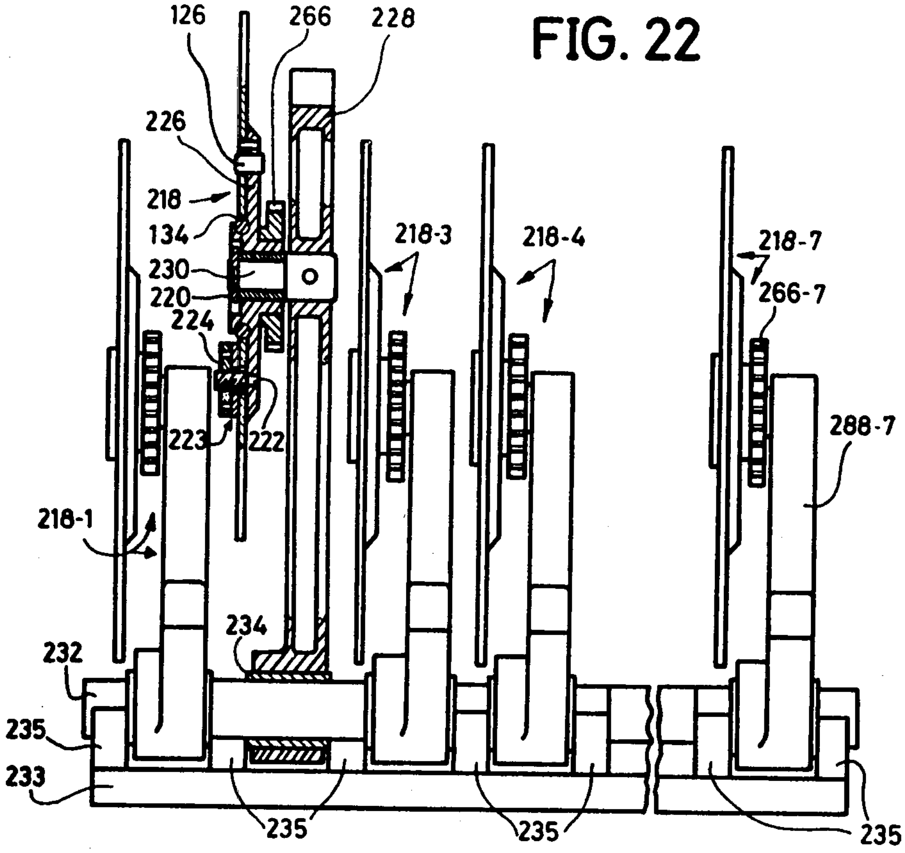
FIG. 22 is a side-elevation view, partially in cross-section, of the structure of FIG. 19.
Figure 23:
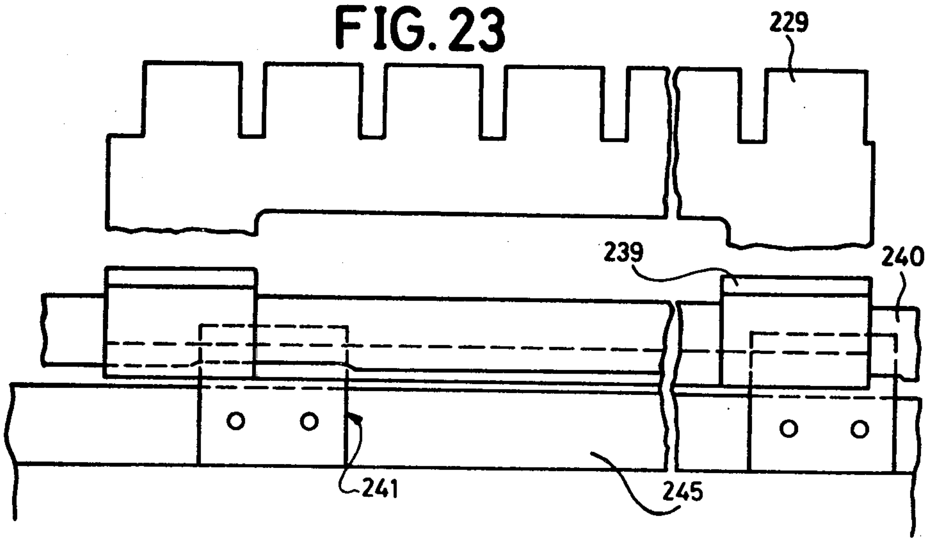
FIG. 23 is a side elevation view, partially broken-away, of the guide-rail portion of the FIG. 19 structure.

Referring now to FIGS. 19 and 22, each composite disc 218 includes a hub 226 to which four petals are manually secured by flat nuts 224 engaging threaded studs 222 secured to the hub. A resilient washer 223 is located between the flat nut and the petal to avoid damaging the petal and also to resiliently urge the petal against the flat portion of the hub for accurate axial positioning. Accurate radial positioning of the petals is obtained by the engagement of pins 126 secured to the hub into corresponding locating holes provided in each petal, as described above.

Clearance between the holes and the pins is provided in order to facilitate insertion and removal of the petals. In order to compensate for this clearance, there is an "O" ring 134 whose purpose is to push each segment outwardly in the same direction as the centrifugal force will tend to force the segment during the rotation of the assembly, as it has been explained above.

C. Swing-Arm Assembly

Each hub 226 is rotatably secured to a stud 230 (FIG. 22) providing with a retaining ring 220 pinned to its swing-arm 228. Each swing-arm can pivot on bearing 234 on a shaft 232.

Seven arm-and-disc assemblies are shown in FIG. 22 at 218-1 through 218-7, but it is evident that the number of such assemblies can be varied according to the purpose of the machine.

Each of the assemblies 218-1 through 218-7 is mounted on the same shaft 232. The shaft 232 is secured to the sliding base 233 of the magazine by screws 237 (FIG. 19) and "V" shaped base projections 235. Bearings 234 fill the gap between two consecutive "V" projections in order to avoid any detrimental longitudinal play.

Referring again to FIG. 22, each composite disc hub is provided with a toothed pinion 266 rotated by a timing belt 260 (FIGS. 19 and 19A) driven by a motor 258 through pinions 259 and 261. Pinion 261 is attached to the motor drive shaft 256.

Figure 19A:
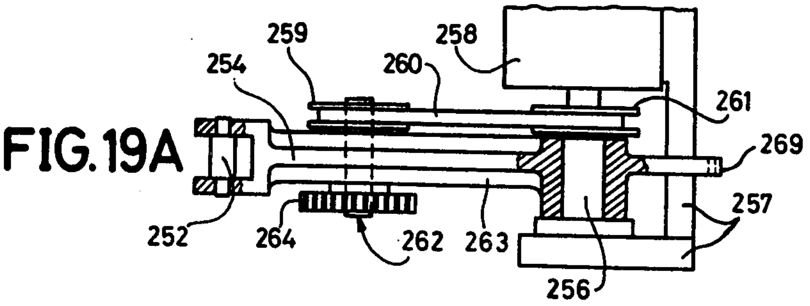
FIG. 19A is a partially cross-sectional plan view of a portion of the structure of FIG. 19.

Driving pinions 261 and 259, as well as a gear 264, which is secured to the same shaft 262 as the pinion 259, are mounted on arm 254 pivoted on the motor drive shaft 256 (FIG. 19A. The arm 254 can be rotated clockwise about axis 256 by means of a solenoid 268 (FIG. 19) which, when energized, pulls downwardly on a link 267 connected to a projection 269 of the arm 254, in order to disengage the driving pinion 264 from the driven pinion 266.

The solenoid 268 and the motor 258 are mounted on a frame 257. Also mounted on the frame 257 at fixed locations are brackets 271 and 272 (FIG. 19) on which are mounted photodetectors 110, 109 and 122. As in the previously-described embodiments, photodetector 109 reads the identity code located at 238 on each petal, photodetector 110 is used for flash timing, and photodetector 122 cooperates with hub clearance hole 270 to give a signal for each revolution of the composite disc.

D. Disc Changing

Figure 19B:
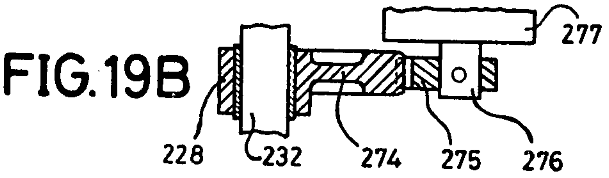
FIG. 19B is a partially broken-away cross-sectional view of a portion of the structure of FIG. 19.
Figure 20:
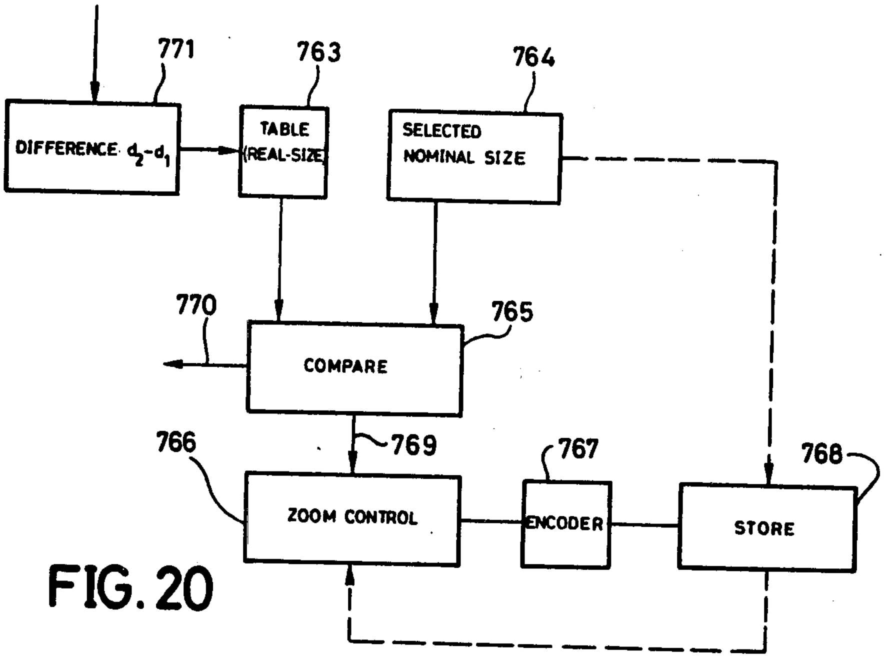
FIG. 20 is a schematic block diagram of the control circuit used for automatic enlargement control in the machine of FIG. 1.
Figure 21:
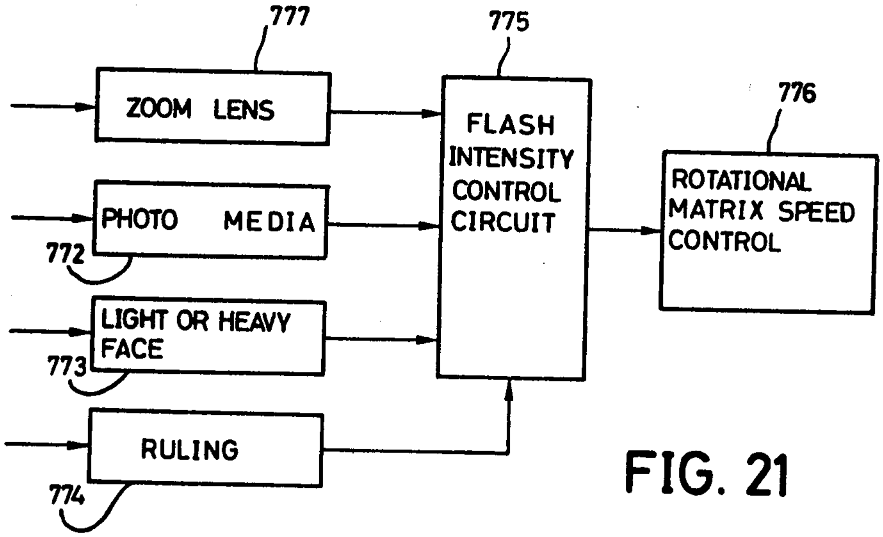
FIG. 21 is a schematic block diagram of the control circuit used for automatic flash intensity control in the machine of FIG. 1.

Referring again to FIG. 19, the disc swing-arm can move to either one of two positions shown at 228 (operating position) and 228' (release position). Each swing-arm 228 is provided with a projection 274 with a semi-cylindrically-shaped end as shown in FIGS. 19 and 19B. The projection 274 is engaged by matching lever 275 pivoted at 276 and operated by a rotary solenoid 277 which is mounted at a fixed location on the frame of the machine. The released positions of arm extension 274 and lever 275 are shown in broken lines in FIG. 19, and the operating position is shown in solid lines. In the released position, lever 228 is urged against the edge of a retaining plate 229, which is attached to the base of the magazine, under the pulling action of a coil spring 279.

When each of the swing-arms is in the released position, the magazine carriage can move freely along a rail 240 attached to the base 245 by supports 241 under the motive power of a magazine motor 246 provided with an encoder 250. The motor 246 drives a pinion 244 engaging a rack 243 attached to an extension 242 of the base of the magazine carriage. The extension 242 is supported by fixed bearing 247 mounted on the base 245.

The motor 246 is resiliently supported by levers 248. Pinion 244 is urged into engagement with rack 243 by springs (not shown) which tend to urge the motor assembly downwardly, as shown by arrow 249, with a pressure which is adjustable. There is enough clearance between the partially cylindrical end of arm extension 274 and the matching recess of lever 275 to avoid any interference during the longitudinal displacement of the magazine to select a new swing-arm assembly.

It should be apparent that the magazine drive system just described is an alternative to the one shown in FIG. 18, and is quite similar to the one shown in FIG. 1.

The character row selection in this embodiment is not accomplished by moving the arm, but by moving a reflector carriage, as it was mentioned in relation to FIG. 18, and as it is described in U.S. Pat. No. 4,230,399. A selected composite disc is brought to the operating position by first moving the disc magazine longitudinally in order to bring the disc to the proper position 218 on the optical axis, as shown in FIG. 18, and then energizing the rotary solenoid 277 (FIG. 19) to rotate the lever 275 by an angle 278 (FIG. 19) sufficient to bring the selected composite disc from the inoperative (broken-line) to the operative (solid-line) position.

The upper end of swing-arm 228 has a notch 253 to be engaged, when it is in operating position, by a locking pin 252 attached to the arm 254 as shown in FIGS. 19 and 19A. This locks the swing-arm 228 in its operating position.

The embodiment just described enables faster changes of fonts and may be preferable to the first-described embodiment in composing texts requiring frequent changes of typefaces, or for languages comprising many different characters such as the languages of the East and Far East. The characters of different rows in the petals utilized in this embodiment are not arranged along an arc, but are radially aligned, for example as described in U.S. Pat. Nos. 3,590,705 and 3,620,140.

Figure 24A:
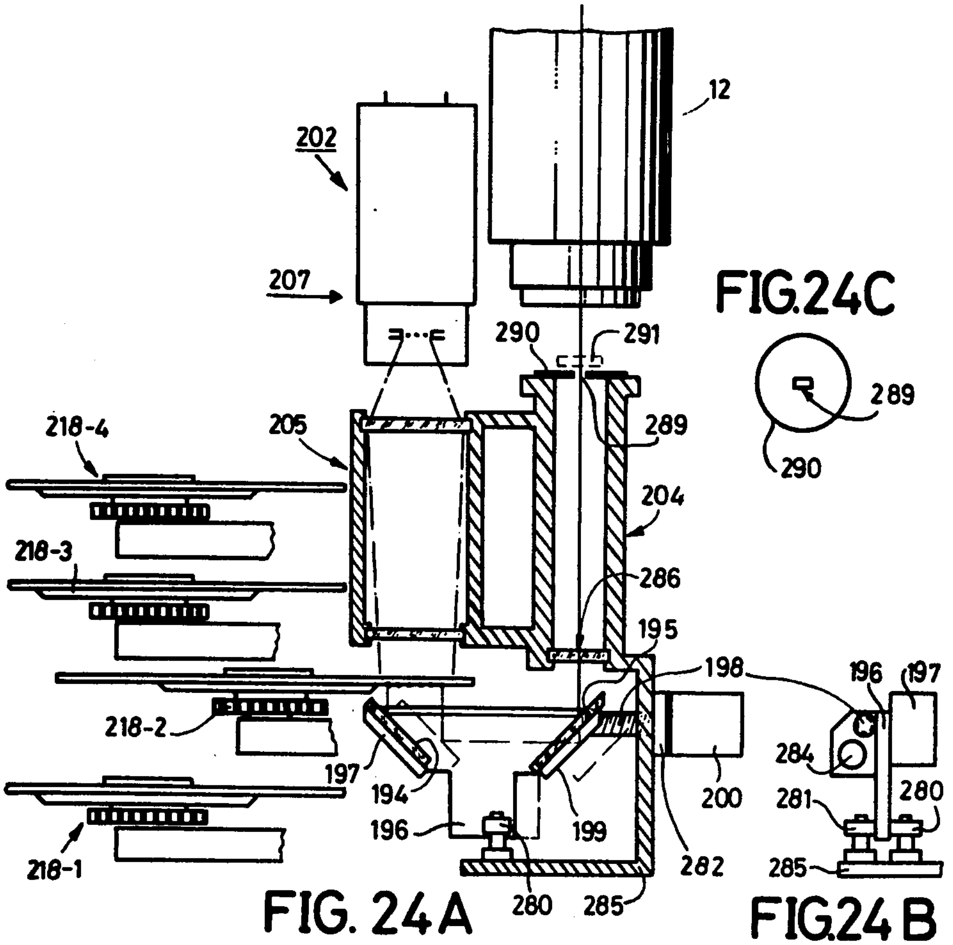
FIG. 24A is a cross-sectional view of a portion of the optical system used with the structure of FIGS. 19, 22 and 23.

The row selection mechanism is shown in FIGS. 24A. In this figure, idle composite discs are shown at 218-1, 218-3 and 218-4, while an active disc is shown at 218-2.

The character illumination assembly 202 includes a flash unit 207 cooperating with a condensing system 205 to illuminate an area on the pre-selected petal covering at least one radial row of characters. If the petal contains six circular rows, as described earlier, six characters will be illuminated simultaneously, one character from each circular row.

The light passing through the illuminated character area is deflected by mirrors 194 and 195 in the same manner as described in U.S. Pat. No. 3,620,140, and is projected by lens 286 onto a diaphragm 290 forming a part of the unit 204. A real image of the selected character is made at the aperture 289 (see FIG. 24C) of the diaphragm 290. The aperture 289 is just large enough to let the selected character-forming rays pass through to the exclusion of the other characters of the illuminated row. That is, the other characters are blocked by the diaphragm.

To select any character of a six-character row, the carriage 196 is moved to a pre-selected one of the six positions it can occupy. The extreme left position of the carriage mirror is shown in solid lines and the extreme right position in broken lines. The carriage is provided with angular members 197 and 199 on which the mirrors are secured, a tapped section engaged by drive screw 198, a bearing 284 (FIG. 24B) and a vertical plate 196 which is held between guide bearings 280-281 attached to the frame 285 of the machine. Circular row selection is obtained by operation of the motor 200 provided with and controlled by encoder 282.

A major advantage of this system is the speed at which any circular row can be selected. A high selection speed can be achieved because of the light mass and low inertia of the components to be displaced, and because of the relatively small distance of travel of those components when moving from one row to another. For example, in one embodiment, the characters of one of the adjacent circular rows are 2.5 millimeter apart. However, it requires a motion of only 1.25 millimeter by the carriage to move from one row to an adjacent row.

An aerial image of the selected character may be made at, or close to, a field lens 291 before reaching the zoom lens 12, for well-known purposes.

E. Alternative Embodiments

Figure 25:
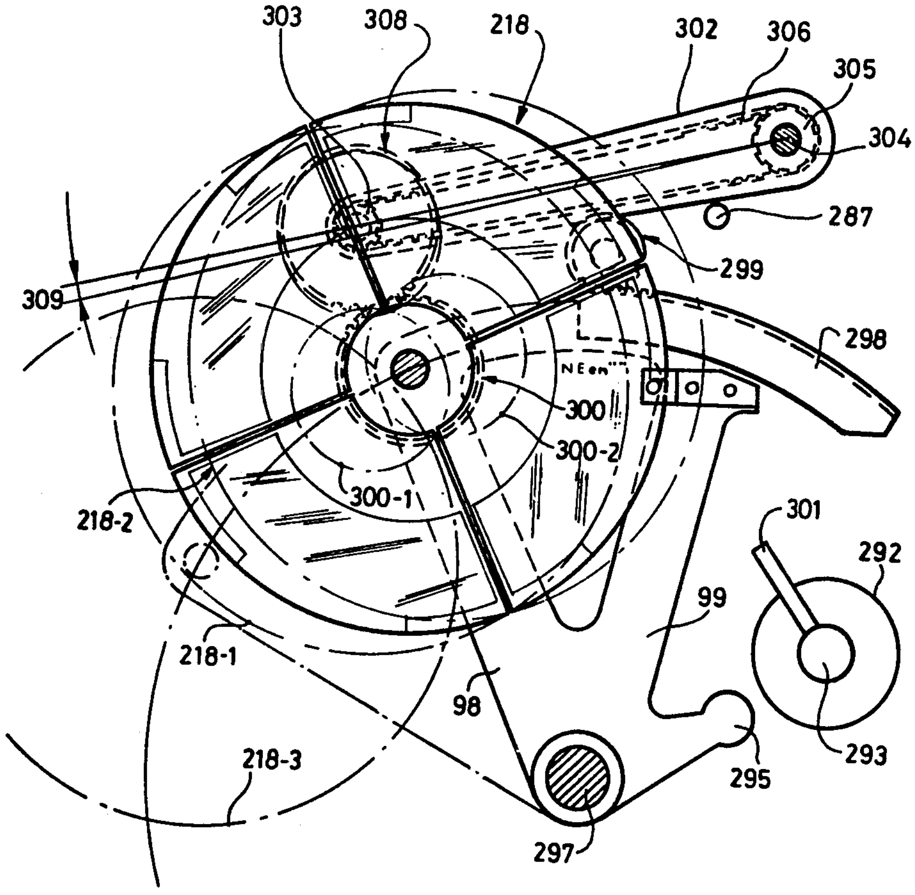
FIG. 25 is a front elevation view of another embodiment of the structure shown in FIGS. 6, 7 and 19.

Another preferred embodiment, also utilizing a composite disc magazine rather than individual petals, is represented schematically in FIG. 25. In this embodiment the swing-arm is utilized as described in relation with the first part of the machine description in that it accomplishes all of the functions of the structure shown in FIG. 6.

Each disc arm 98 is provided with an extension 295 similar to the extension 274 of FIG. 19. A lever 301 attached to shaft 293 of a rotary solenoid 292 differs from lever 275 of FIG. 19 in that it is utilized exclusively to move the selected composite disc assembly up from the idle position in the magazine, shown in dotted lines at 218-3, to engage an arcuate rack 298 with a row selection pinion 299 similar to pinion 106 of FIG. 7 and used for the same functions. Other components of the assembly of FIG. 25 are not shown because they are identical or quite similar to the components shown in FIGS. 3 through 12.

In order to move a composite disc from the active to the inactive position, pinion 299 is rotated clockwise until it disengages from rack 298, at which point the assembly rotates counterclockwise around the shaft 297, either by gravity or pull from a spring similar to spring 279 of FIG. 19 until arm 98 rests on a stop (not shown).

In the inactive positions, the disc assembly clears driving pinion 308 so that the disc magazine is free to move along its rail to bring another disc into a preactive position. At this point, the rotary solenoid 292 is energized and the disc arm 99 is moved clockwise by the action of lever 301 against lever end 295. This causes the new disc assembly rack 298 to engage the pinion 299, at which point the solenoid 292 is released and the motor which drives pinion 299 takes over the movement of the disc arm.

The rotation of the petals assembly or disc 73 is obtained by energizing a motor whose shaft 304 drives a toothed pinion 305 engaging a toothed belt 306 to drive the gear 308 through another pinion 303. These pinions and the driven gear are mounted on a rocking lever 302 pivoted on shaft 304 of the drive motor. The lever 302 is pulled down counterclockwise by a spring (not shown) to fully engage a gear 300, mounted on the petals hub, which is similar to the gear 266 of FIG. 22.

When the swing-arm is moved for row selection from one extreme position to the other, the composite disc moves from position 218-1 to position 218-2 and the hub gear 300 from position 300-1 to position 300-2.

As it can be seen in FIG. 25, the displacement of the gear 300 around pivot point 297 causes a slight rocking of arm 302 through an angle 309. It is clear that at all times during the row selection motion of the disc arm assembly, driving gear 308 and driven gear 300 remain in full engagement. When the disc assembly is returned to the disc magazine, the counterclockwise motion of lever 302 is stopped by a pin shown at 287. In order to facilitate the engagement of driven gear 300 with driving gear 308 when a new assembly is brought into position, the gear 308 is continuously rotated at a slow speed. Preferably, the pinion 299 also is rotated to avoid the possibility of being jammed against the first tooth of the new arcuate rack 298.

Figure 41:
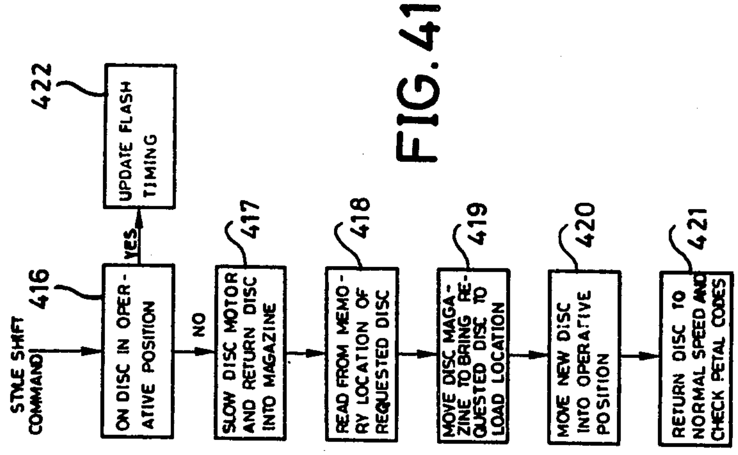
FIG. 41 is a block diagram illustrating the style selection process in a second embodiment of the invention.

FIG. 41 graphically represents the sequence followed for the replacement of a composite disc assembly by another. Each block represents one or several functions. The drawing is self-explanatory and will not be described in detail.

HIGH SPEED EMBODIMENT

Figure 26A:
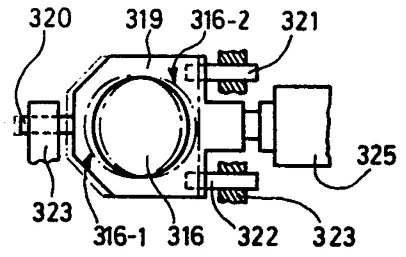
FIG. 26A is an elevation view of a component of the structure of FIG. 26.
Figure 26:
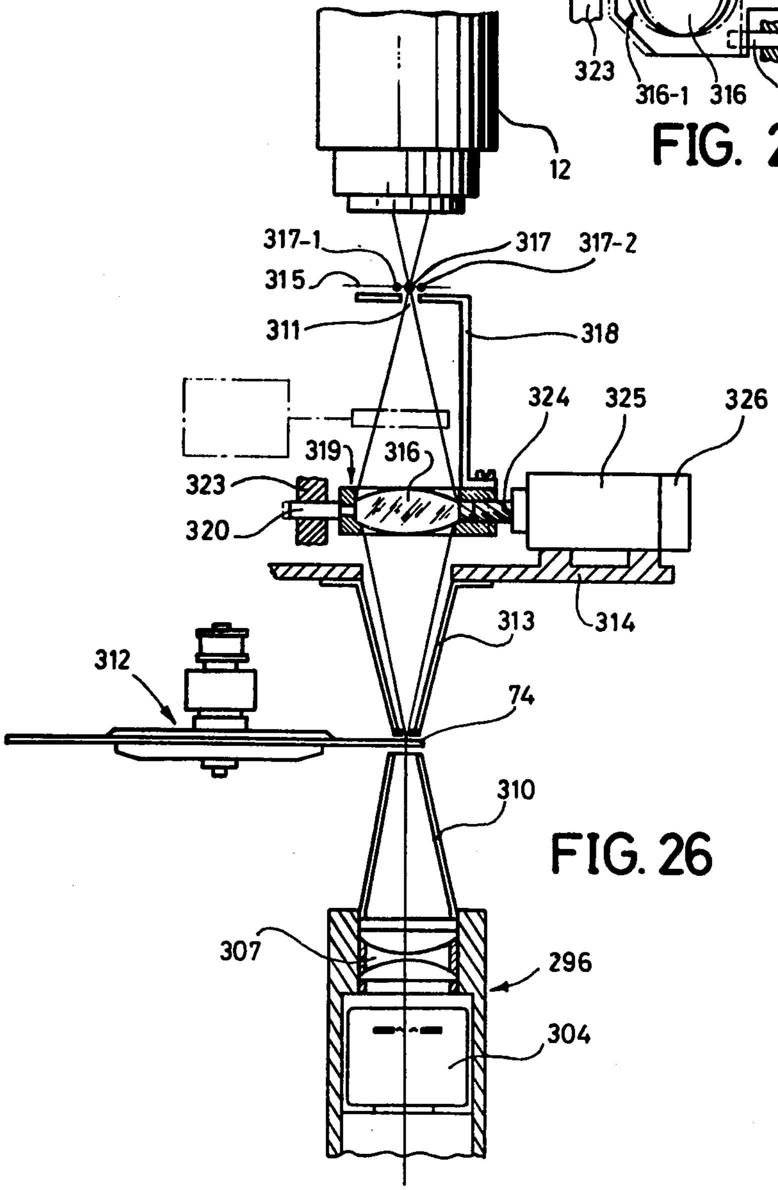
FIG. 26 is a plan view, partially cross-sectional and partially schematic of a modified character projection system for high-speed operation.

The optical system of FIG. 26 differs from the basic optical system of the machine by the addition of components which make it possible to substantially increase the composition speed of the machine. This is done by eliminating or considerably reducing the start-stop operation of the character spacing carriage as it is customarily used in photocomposing machines.

A. Mechanism

Referring to the lower portion of FIG. 26, a flash lamp 304 is mounted in a housing 296 provided with a condenser. A disc assembly is shown at 312 and a petal at 74. Stray light is eliminated by shields 310 and 313 on each side of the petal. A lens 316 forms an aerial image of the flashed character in the imaginary plane 315.

The lens 316 is mounted on a small sliding holder, also shown in FIG. 26A, comprised of a flat body 319 provided with guiding pins 320, 321 and 322 which can slide freely, but without play, within a supporting frame 323. The lens holder sliding motion is controlled by a small screw 324 engaging a tapped hole in said holder and driven by a motor 325 provided with a decoder 326 and supported by bracket 314 attached to the base of the machine.

In order to further reduce stray light and/or to reduce the requirement for an accurate window at the end of the shield 313, a bracket 318 may be secured to the lens holder. The bracket 318 is provided with a hole 311 to block any unwanted image or light. The lens 316, through the mechanism described, can move slightly to the left or to the right from position 316 to position 316-1 or position 316-2 (FIG. 26A). When the lens is at the center of its travel, the image of the flashed character is made at 317. When the lens is moved to the left, the image is moved to point 317-1 and when the lens is moved to the right, it is moved to 317-2. Of course, the lens can be moved to any intermediate position. Regardless of its position, the intermediate image is picked up by the collimating zoom lens 12 as described in relation to FIG. 1.

B. Character Spacing Method

The purpose of the mechanism first described is to move the image projected onto the photosensitive medium by a distance proportional to the image displacement times the enlargement ratio. It is well known in the printing art that character widths are variable and usually are "unitized"; that is, the width of each character is represented by an integral number of units, generally one-eighteenth or one thirty-sixth of an "Em". These units are called "relative" units because they represent a width relative to other characters of the same point size. To obtain the width of the image the relative width of each character is multiplied by a factor proportional to the enlargement ratio, as it is explained in U.S. Pat. No. 2,876,687. The resulting value represents the amount of space to be left for each projected character image.

In the prior art the spacing carriage, such as the carriage shown at 18 in FIG. 1, was generally stepped before (or following) the projection of each character by a distance equal (or proportional) to the widths of the characters, for example, by the use of a variable escapement such as that described in U.S. Pat. No. 3,220,531. These systems are referred to as "start-stop" character spacing mechanisms. An improved version is described in U.S. Pat. No. 3,422,736 where the start-stop motion is utilized only once for a plurality of characters, and further spacing is controlled by flash-timing. That improved system, as well as the arrangements of U.S. Pat. No. 3,450,016 and U.S. Pat. No. 3,721,165, which tend to avoid or reduce the problems associated with start-stop spacing means, necessitate the use of a matrix drum rather than a disc.

It has been found by applicant that in practice it extremely difficult to obtain very good typographical quality from a matrix drum provided with characters having their base line perpendicular to the drum axis, an arrangement which is necessary in order to space characters by flash control as it was originally disclosed in U.S. Pat. No. 3,422,736.

The purpose of the width compensating lens mechanism just described is to make it possible to move the spacing carriage at a uniform speed for a given point size (enlargement ratio) and a given style for the composition of text matter. For such text matter it is well known that the average character width varies little from one line to the next. In the sample which will be described below, it is assumed that the width allocation of characters is based on the eighteen units of an "Em" system. In such a system, the "i" may be five-units wide, the "e", which is the most frequently used character, could be eight units wide (considered as the average width) and the "m" fifteen units wide.

It is clear that with continuous motion of the spacing mechanism at a uniform speed relative to the matrix, the timing of each character's projection must be determined by the instantaneous location of its "notch" in the line, as explained in U.S. Pat. No. 3,117,502, which describes a continuously moving film with character images projected at a common point, and in U.S. Pat. No. 3,643,559 in which a rotating matrix drum and multiple light sources are utilized for instant location of characters. With the use of a matrix disc or petal as in the present invention, the orientation of characters shown, (e.g., in FIGS. 4 and 7) is such that any flash delay would cause the displacement of the base line. This is highly undesirable.

The foregoing problem has been solved, according to one characteristic of the invention, by "borrowing" the extra width of the wider-than-average character and "giving" it to narrower than average characters. This result is achieved by the motion of the compensating lens 316, which will be moved in one direction for positioning the image ahead of the point where it would fall, if no compensation were utilized, for narrow characters, and in the other direction to move the image impact point "downstream" for wide characters.

Figure 43:
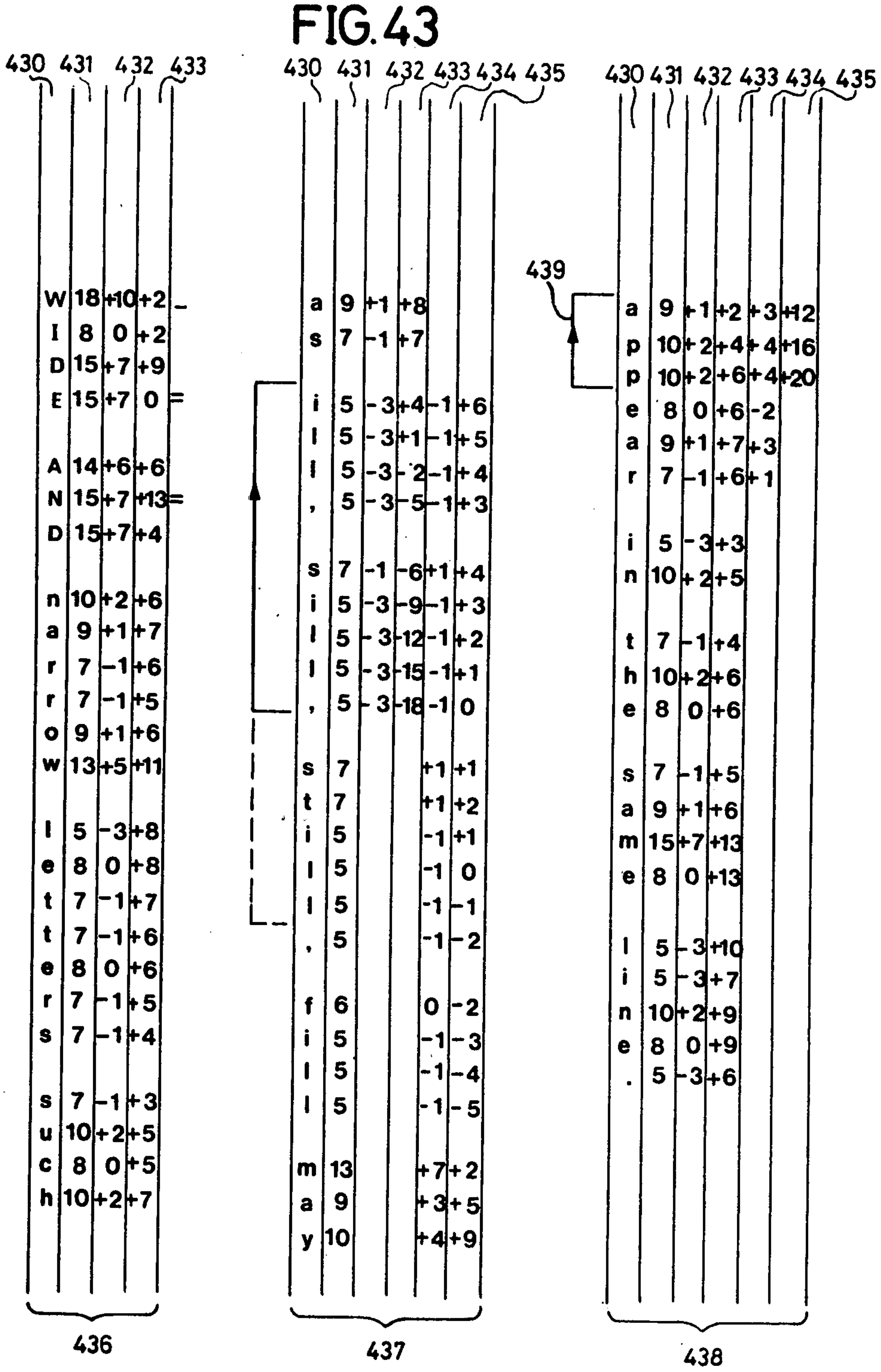
FIG. 43 is a table representing lines of a special text used to illustrate the operation of the character spacing mechanism of the invention in the high speed mode.

The operation of the system can be better understood with reference to the tables of FIGS. 42 and 43. In FIG. 42 columns 428 represent a line from an English text, and columns 429 represent a line from a French text.

In each group of columns 428 and 429, the first sub-column, such as column 424, represents the character identity, the next column 425 its relative width, the next column 426 the departure from the average width in units (it has been assumed that the average width is eight-units), and the last column 427 the accumulated deviation from that average width. Similar sub-columns represent similar values in the columns groups 429 associated with the French text.

It can be observed that the accumulated deviation is, in both cases, relatively small, with a maximum negative value of sixteen units in the French text and a maximum positive value of thirteen units in the English text. If we now consider that the compensating lens mechanism can move the intermediate image by eighteen units in the plus or minus direction, it becomes evident that the accumulated deviation can be compensated for by properly locating the compensating lens before the projection of each character. Because the compensating lens and its associated moving structure is very light and the driving system is especially constructed so as to have very low inertia, the lens can be moved within six or seven milliseconds, which is fast enough to make it possible to reach a productivity of more than one hundred characters per second, by proper selection of the rotational speed of the composite disc.

It may be pointed out here that because there are four petals around the disc hub, and only one petal is normally utilized for a "straight" text, the disc will rotate a minimum of three-quarters of a revolution between the projection of adjacent characters. The fact that characters are located at different points along the arc of the petal utilized necessitates the introduction of a "timing" factor (in addition to the accumulated deviation factor) in the control circuit of the compensating lens. In the case where a succession of wider-than-average characters are used in the same line, for example, for a heading in capital letters, when the accumulated deviation reaches eighteen units, a matrix turn is skipped to let the carriage "catch up" and move far enough along its rail to properly project the next character.

In order to illustrate extreme cases in which continuous uniform motion cannot be sustained, a specially "fabricated" text comprising successive groups of wide and narrow characters is shown in FIG. 43. In the first group of columns 436, the character identity is shown in sub-column 430, followed in subsequent sub-columns 431, 432 and 433 by the relative width of each character, the positive or negative departure from an average of eight units and the accumulated deviation, respectively.

The first character "W" has a width of eighteen units, a width that is ten units above average. It is also assumed in this example that the spacing carriage moves eight units for each rotation of the disc. Thus, we can skip one turn to reduce the accumulated deviation from ten to two as shown in sub-column 433. The horizontal bars adjacent to sub-column 433 represent skipped turns. It can be observed that following the projection of character "D" in the first word, the accumulated difference is plus nine units, which would be increased to sixteen for the following letter "E". According to the procedure explained above, two full turns will be skipped following the projection of "E". This reduces the accumulated difference to zero. Two more turns will again be skipped between the projection of "N" and "D" in "AND".

In the next group of columns 437 there is a succession of narrow characters such as "1", "i" and "t". The accumulated variation from an eight-unit average value is shown in sub-column 433. It can be seen that if that average value were not changed, the compensating lens system would be incapable of correcting the spacing at the comma following the word "sill" because it has been assumed that eighteen units is the maximum correction and eighteen units would have to be "gained" before the comma is flashed.

In a preferred embodiment, before the characters are flashed, a group of consecutive character codes (e.g. eight) is stored in a register at the same time as the average width of that group of characters is computed. In practice, no attention is paid to groups of characters wider than the average (first group of columns) because it is easy to compensate by skipping turns, but an unusual sequence of narrower than average characters must be detected in order to change the "standard" average width from, say, eight units to six units.

In the present example, following the first word (and its inter word space) of columns 437, the accumulated deficit reaches the limit after the temporary storage of the comma after "sill". At this point, the average reference width is changed from eight to six units, and the new "departure from average" is computed as shown in column 434, with the new accumulated variation in column 435. Consequently, following the projection of the last character of "positive" size (the space following the first word) the carriage speed is reduced from eight to six units per revolution until a point is reached where the characters in the temporary storage show a positive value higher than eighteen units. This point is reached, in the example shown, following the storage of character "p" which is the third character of the first word of columns 438. The circuit then causes the carriage speed to be returned to eight units per turn. This change preferably is made at the previous word space as indicated by the arrow 439.

The purpose of the temporary storage of a group of characters is to minimize the number of speed changes. The point at which the speed change may occur can be determined by going back to the point where the average becomes negative when a group of narrow characters is reached, or at the exact point where the average goes beyond eighteen units, as it will be explained in relation to FIG. 44. For example, instead of moving from the low to the high speed at a word space located before the first word of columns 438, it also is acceptable to skip a turn before the projection of the second "p" of "appear", thus losing six units at the same time as the carriage speed is increased. Columns 432 and 433 of each group represent the departure from an eight-unit average, and columns 434 and 435 the departure from a six-unit average.

Figure 45:
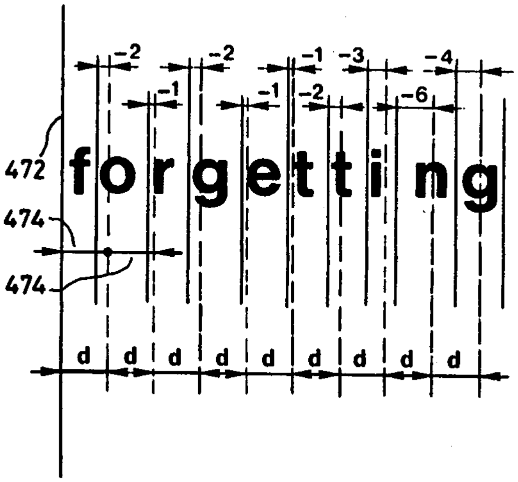
FIG. 45 is a graph representing a word composed in the high-speed mode.
Figure 46:
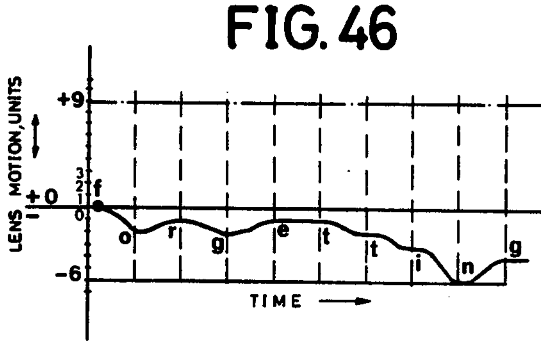
FIG. 46 is a graph representing the displacements of the movable lens of FIG. 26 for the production of the word of FIG. 45.

The excursion of the compensating lens for the composition of the word "forgetting" of FIGS. 42 and 45 is shown in FIG. 46. In FIG. 45 the distance 474 is the distance separating the left-hand margin 472 from the first dotted line, and consecutive, equally-spaced dotted lines, and represents the spacing between characters which would occur with a carriage which is moving continuously at a uniform speed of eight units per turn, assuming that each character is projected from the same radial position of the petal in use. The accumulated "departure from average" of FIG. 42, column 427, is graphically represented by numbers "−2; −1; −2, etc." in FIG. 45.

The graph in FIG. 46 represents the compensating lens excursion from the zero line during the composition of the word "forgetting". The number of units moved by the compensating lens is plotted vertically, and the characters represent the approximate times of flashing.

Figure 47:
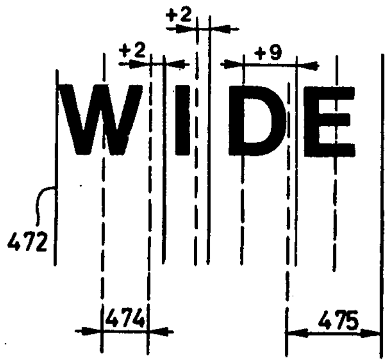
FIG. 47 is a graph representing another word composed in the high-speed mode.
Figure 48:
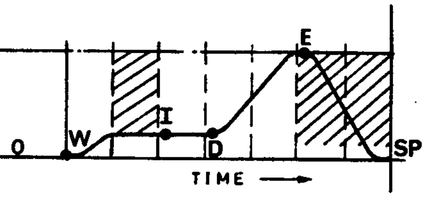
FIG. 48 is a graph representing the displacements of the movable lens of FIG. 26 for the production of the word of FIG. 47.

In the same manner, the composition of the word "WIDE" of FIG. 43 is represented in FIGS. 47 and 48. It can be seen that three turns are skipped between the first character "W" and the space following "E". These skipped turns are represented by shaded areas in FIG. 48.

It can be observed that the letter "E" is projected during the fourth matrix turn following the projection of "W", but, due to a nine-unit compensation, the "E" is projected one unit beyond the point where it would be if one turn had been skipped. In other words, the eight-unit compensation by turn-skipping could as well have occurred before the projection of "E". This alternative mode may be preferable in certain cases, but we have assumed in the above example that maximum usage is made of the capability of the compensating device before skipping turns or reducing the carriage speed.

Figure 49:
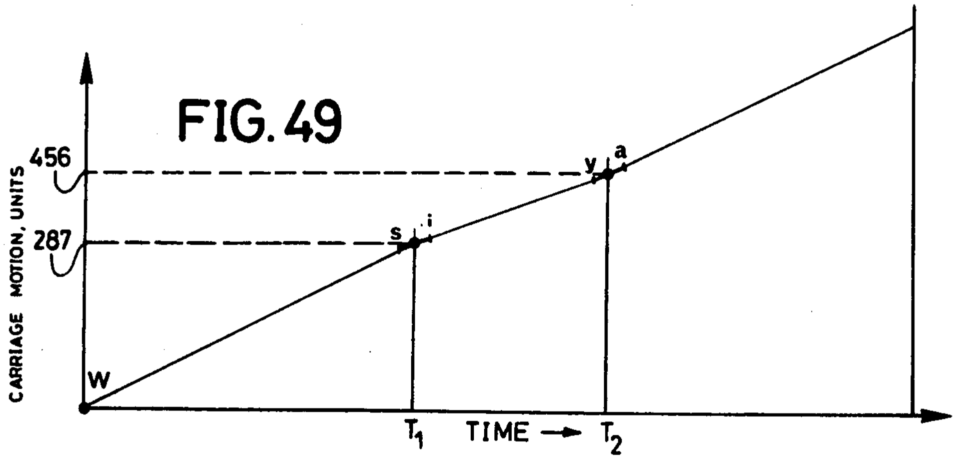
FIG. 49 is a graph illustrating the speed variation of the continuously-moving character spacing carriage when operating in the high-speed mode.

The change of carriage speed during the composition of the words appearing in columns 437 and 438 of FIG. 43 is illustrated graphically in FIG. 49. In this figure, the curve represents the carriage speed variation. Following the projection of the first letter "W", the carriage moves at the normal speed of eight units per turn until the space following the word "as", which occurs at time $T_1$ after the carriage has moved 287 units (the units being represented on the Y axis). The carriage now moves at a reduced speed until time $T_2$, at which time the carriage is located 456 relative units from "W". At this point the speed is returned to its normal value of eight units per turn. The speed change just described is rather infrequent in normal straight-matter composition, and it is small enough not to introduce detrimental vibrations and "bounce" into the character spacing mechanism. It is evident that there are times when the carriage should come to a complete stop, for example, at the end of a line or to let special functions occur, such as a change of style or size, etc.

C. Character Spacing Control Circuit

Figure 44:
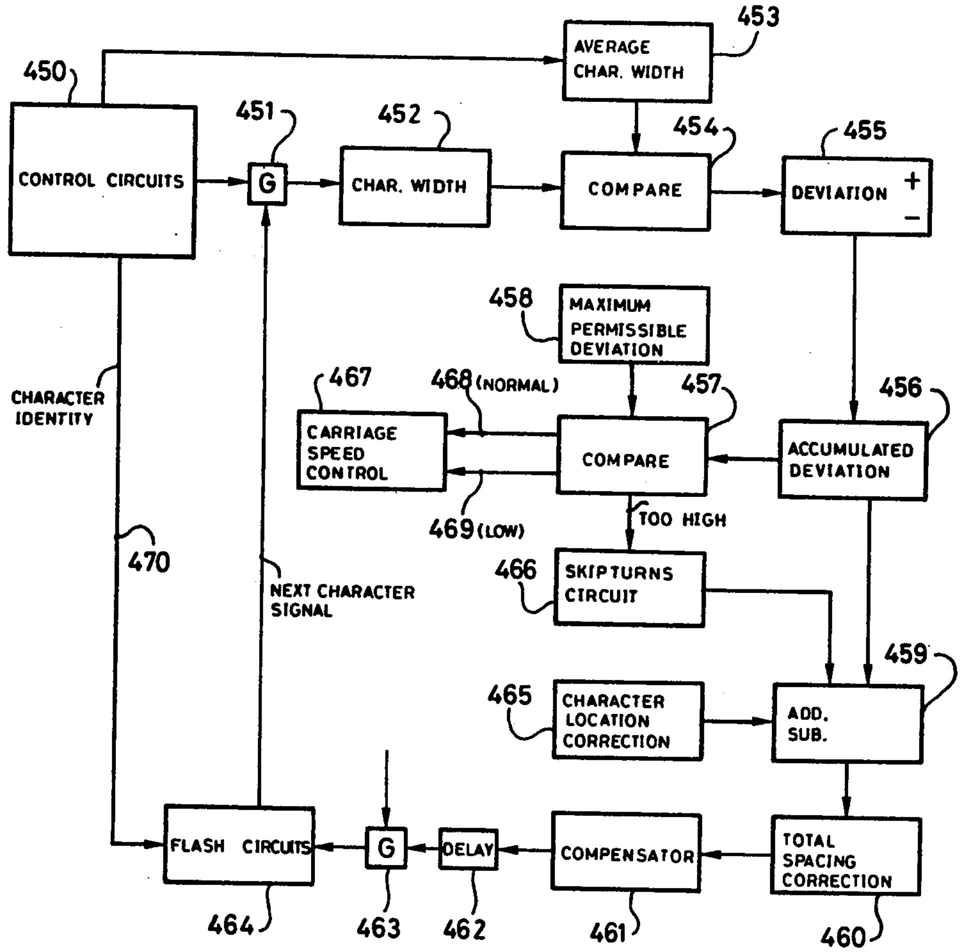
FIG. 44 is a block diagram of a control system for use in spacing characters during the "high-speed" mode of operation.

A simplified spacing control circuit in block diagram form is shown in FIG. 44. In this Figure the control circuits are represented at 450. Character width information is sent through a gate 451 to a register 452 and to a comparison circuit 454 where the width of each successive character is compared to the average width for a given typeface. This width is stored in a storage unit 453. The deviation (columns 426 of FIG. 42) is recognized by a differential detection circuit 455, and that deviation is added to the total deviation stored in unit 456, which represents, at all times, the accumulated deviation value of columns 427 of FIG. 42.

The accumulated deviation in unit 456 is compared by a comparator unit 457 to the maximum permissible deviation (18 units in the previous example) stored in a storage unit 458. If the accumulated deviation is higher than permissible, the "skip" circuits of unit 466 are activated and the width value corresponding to one turn or more is sent to an add-subtract unit 459. If the comparision circuit 457 indicates a value within or above the acceptable correction value, the "normal" speed signal is sent over a lead 468 to the carriage speed control circuit 467. If, on the other hand, the comparison circuit indicates a value below the acceptable negative deviation, the "low" speed signal reaches unit 467 over a lead 469. As mentioned earlier, a supplemental correction is necessary to take into account the angular position of the character to be flashed on the petal. Referring back to column 81 of FIG. 5A, if we assume that the petal moves clockwise, as indicated by the arrow in FIG. 5A, the first character of the petal to reach the optical axis will be "," followed by "g", then "b", etc., and the last characters will be "a", then "t" and finally "1".

If we assume, for simplification's sake, that the disc assembly rotates at such a speed that 0.2 millisecond elapses between the passage of consecutive characters on the optical axis (corresponding to an approximate speed of 58 revolutions per second), the additional correction to be introduced by a supplemental correction unit 465 will be determined by the distance of the character to be flashed from line 0—0 in FIG. 5A (also called rank value) and the speed of the disc. If, as it has been assumed earlier, one turn of the disc corresponds to a carriage displacement of eight units, the passage of the petal will correspond to two units and the carriage will move 2 divided by 22, or approximately 0.09 unit between the passage of consecutive characters. Thus, the correction in the present example will be, for each character equal to its rank value times 0.09 units.

Referring again to FIG. 44, the total spacing correction is stored in a storage unit 460. That value is transferred to the lens compensating mechanism 461 and, following an appropriate time delay created by a time delay unit 462, and assuming that gate 463 is open, a signal is sent to the flash circuits 464 which will cause the flash lamp 304 (FIG. 26) to flash when the character identified by connection 470 from the control units reaches the optical axis, substantially as described in U.S. Pat. No. 2,775,172.

D. Speed-Modulated Embodiment

FIGS. 50A and 51A show a modified carriage speed control circuit for use with a modified optical system. The modified optical system does not use a compensating lens and is not capable of achieving the operating speed of the system just described, but it has the advantage of greater simplicity.

In the modified spacing control circuit the spacing carriage is moving continuously but in a speed-modulated mode which also has the advantage of producing a smoother operation than the usual start-stop spacing systems. Acceptable results can be achieved because on the average, as described in the previous embodiments, successive character widths vary within a relatively small range. It is clear that slowing down the carriage to space a six-unit character following a nine-unit character and then speeding up the carriage to accommodate an eleven-unit character does not cause the mechanical stress that is caused by a complete stop of the spacing carriage following the projection of each and every character.

The circuit of FIG. 50A includes a data storage unit or memory for storing character codes. This memory 478 can be part of the general control circuits of the machine. The memory 478 stores and transfers successive character ranks (as defined above in relation to FIG. 5A) to storage units 479 and 480 for the purpose of comparing the time separation within the passage of the petal, between consecutive characters. This time separation is computed by the subtraction unit 481. The time separation can be expressed in relative units for a given carriage speed, and may be positive or negative. For example, less time will elapse between the projection of characters "g" and "a" than between the consecutive projections of "e" and "b".

The character sequence differential of unit 481 is added in an adder 482 to the time necessary for the matrix to rotate one turn. A signal representative of that time is delivered from a storage unit 483, whose contents can be updated as needed.

The output of the adder 482 is delivered to a storage unit 484 which represents the total time available for spacing purposes. The output of unit 484 is transferred to the speed table storage unit 495, which also receives real character width information as follows: the relative widths of characters is transferred from memory 478 to relative width storage unit 487 and the relative width from unit 487 is multiplied in a multiplier 489 by a value proportional to the point-size or set (as explained in U.S. Pat. No. 2,876,687) to produce the real spacing value of the character image. The multiplicand value is stored in unit 493 which is controlled by the optical enlarging system. The real spacing value can be modified further in a unit 494 by an anamorphic correction factor, as it will be explained later.

The spacing value stored in unit 490 can be represented by a number of "escapement units" (or fractions of inches or millimeters). That value is transferred (after being converted to the desired measuring units) through a switch 491 to the unit 495. From the unit 495 is selected the appropriate speed curve for the carriage to move the exact spacing distance between the adjacent characters and exactly in the allocated time. The signals from unit 495 are transmitted through a gate 486 to a carriage motion control circuit which accelerates or decelerates the carriage as needed.

In the case where the relative width of the character is larger than the permissible maximum width, the relative character width is not sent directly from unit 490 to unit 495. Instead, after the situation is detected by the unit 495 as an impossible case, unit 495 sends a signal to enable gate 486 and, thus divert the value from unit 490 to a dividing circuit 492 through the switching 491 so that the unacceptable value will be divided by two. Thus, for larger than acceptable displacement, the spacing value will be sent in two successive steps at the same time as a matrix turn is skipped in a manner similar to the one described earlier. The flash circuit is disabled during the idle or "skip" turn.

The relative motion of the spacing carriage operated as described above is illustrated in FIG. 51A, in which the distance moved by the carriage is represented by the Y coordinate, and the time elapsed along the X coordinate. The slope of the curve is, of course, proportional to the carriage speed. It can be seen that the speed varies within a relatively small range for the composition of the word "Bobstgraphic". It can also be seen that a turn of the matrix has been skipped between the flash of "B" and the following character "O". This has occurred because "B" is 15-units wide and it has been assumed that the maximum width value which can be accommodated within a machine cycle is 12-units. The numbers shown along the X axis below each character of the word composed represents their relative widths. The vertical spacing of the letters shown adjacent to the Y axis is proportional to those relative widths.

A modification and/or clarification of the circuitry shown in FIG. 50A is represented in FIGS. 50B and 51B.

In the example shown in FIGS. 50B and 51B, it is assumed that at the flash time, whenever a character is projected, the spacing carriage is forced to move at a pre-determined speed for a given point size. That speed can be increased for larger sizes because the characters occupying a wider area, or decreased for smaller sizes. The selected "flash speed" is represented by the slope of line 471 in FIG. 51B, which represents the timing for the composition of the word "mint". In the example illustrated, the distance 449 between solid vertical lines represents a full turn of the matrix, and the distance 448 represents 8 relative width units so that the "speed line" 471 corresponds to a carriage speed of eight relative units per revolution of the matrix. Each quarter revolution is represented by dashed lines, the position of character points on the curve is determined by the accumulated character widths plotted on the Y axis, and the location of the character within the character matrix. The constant pre-determined carriage speed should be reached before the selected character reaches its flash position in order to facilitate the speed controls.

The heavy sections of the curve "mint" of FIG. 51B represent the portions during which the carriage moves at the predetermined constant speed. These portions are parallel to line 471 representing that speed.

The block diagram of FIG. 50B represents the operation of the carriage for the production of lines such as the one just described. The selected character distance from the optical axis (its flash point) is represented by block 440. That distance, at the time the preceding character is flashed, is equal to the rank value of the new character, as previously defined, plus the "idle" three-quarter of a turn during which the unwanted petals cross the optical axis, plus or minus the rank value of the preceding character. The value stored in unit 440 is continuously updated by the use of the photoelectric pulses generated by the petals as explained before. In the same manner, block 441 contains a continuous representation of the spacing carriage location either from its home position or from the point at which the previous character was flashed. The value stored in unit 441 is continuously updated, for example by the photodetector 19 and grid 11 shown in FIG. 1.

Comparison circuit 442 continuously compares the above values to the constant value (for a given size) in unit 445 (modified by a point size factor from unit 446) representing the speed at which the carriage should move at the time the character is projected. Unit 443 receives the "speed up" or "slow down" instructions from unit 442. In order to avoid brutal speed changes, the unit 443 also is connected to the carriage speed functions unit 447 which is similar to unit 495 of FIG. 50A. The unit 447 "knows" the total available time and, based on this knowledge, it causes unit 443 to generate appropriate "accelerate" or "decelerate" instructions to be sent to the carriage motion mechanism 444.

AUXILIARY MATRIX EMBODIMENTS

The embodiment shown in FIG. 28 includes two matrix assemblies 328 and 328', each of which is identical to the matrix assembly of FIG. 26, and a third "pi-characters" assembly 333.

The composite petals disc 73 of assembly 328 is associated with a petals magazine as shown in FIGS. 1 through 16, or with a composite discs magazine as shown in FIGS. 18 through 25. The composite petals disc assembly 328' is not associated with a magazine. The disc 73' of assembly 328', referred to as the "basic fonts disc", is provided with manually-inserted petals corresponding to very frequently used typefaces for current composition work. The use of the two discs assemblies 328 and 328' may very substantially reduce the number of magazine shift operations for intricate composing jobs requiring a wide variety of typefaces.

The "pi-disc" shown at 334 is similar to the pi-disc described in co-pending application Ser. No. 899,001, FIGS. 61 to 63, and is part of the same assembly. The disclosure of that application hereby is incorporated herein by reference.

According to a characteristic of the invention, the disc selection is obtained by a unique reflector assembly which has the advantage, over known systems, that is avoids light losses (as incurred for example in beam splitting devices), and has great simplicity of design, alignment and operation. The desired results are obtained by a simple mechanism which can rotate the reflector and move it up and down, as it now will be described with reference to FIG. 29.

The reflector mechanism is located in a cylindrical housing 332 (FIG. 29) mounted on the base of the machine. A prism 330 is cemented to a disc-shaped platform 339 integral with a shaft 338 and of such a diameter as to fit snugly into a recess 340 in the housing 332. The shaft 338 is provided with a threaded portion 341 that engages a matching tapped shoulder 343 integral with housing 332.

The assembly comprised of the prism 330, its platform 339, shaft 338 and its threaded shoulder 343, can be rotated through a coupling 342 by a motor 344 provided with a guide pin 345 engaging a matching vertical slot 346 in holder 332 in order to let the motor move up and down but prevent any detrimental rotation of the motor. It is evident that, because of the small size and light weight of the components, the small motions involved, and the relatively long time that can be allocated to those motions, motor 344 can be very small.

The system of FIGS. 28 and 29 operates as follows: When the selected characters are located on a petal of disc 73', the position of the prism 330 is as shown in solid lines in FIG. 28, with the reflecting plane shown at 331. With the reflecting plane 331 in this position, images from the disc 73' are reflected into the zoom lens 12 and are projected onto the photosensitive medium.

When a pi-character is called for, the prism 330 is rotated by motor 344 counterclockwise by 90° to a position in which the reflecting plane of the prism is at position 331'. Light rays emerging from the pi-disc 334 are focused by a lens 337 onto the axis of rotation of the prism assembly (which is located on the intermediate image plane of the lenses of 328 and 328'). Lens 337, which can be a simple achromat, is mounted in a longitudinally-adjustable cylinder 336 mounted on a fixed bracket 335. With the reflecting plane of prism 330 at 331', images from the lens 337 are reflected towards the zoom lens 12, and are projected onto the photosensitive medium.

When it is desired to shift either from using the assembly 328' or the pi assembly to assembly 328, the motor 344 rotates the screw 341 counterclockwise to "unscrew" shaft 338 from threaded shoulder 343 and thus retract the prism into the recess 340, to the position shown in dotted lines in FIG. 29. The prism now is out of the way, and the rays emerging from a petal of assembly 328 can freely enter the zoom lens 12.

The system also can operate by using a front-surface mirror instead of a prism, which may be of advantage since no rays have to pass through any glass before entering the zoom lens. Such a mirror can be a glass half-cylinder with a flat reflective face.

It is apparent that a 90° rotation of the reflector when it is in position to reflect either the light rays emerging from the pi disc, or those emerging from a petal of assembly 328', results in a slight axial displacement of shaft 338. But this displacement is of no importance because the reflecting surface of the prism or mirror is made tall enough to accommodate the intermediate image despite the displacement.

In the machine provided with the multiple discs just described, the style selection control circuit of FIG. 40 is completed by the addition of units 396 through 399. The first unit 396, in response to the receipt of a style-shift command on input lead 395, checks for the presence of the new requested style or font in the "basic fonts" disc 73'. If the face is not present in this manually-prepared disc, the command is shifted to the unit 400 to see if that face is in the automatically composed disc 73 of assembly 328, and the operator proceeds as previously described.

If the requested face is in the "basic fonts" disc the flash circuit is updated to enable the flash when the newly called petal is in position. In either case, as shown, the position of the reflector 330 of FIG. 29 is checked and modified if necessary, under the control of block 398, and finally the flash lamp corresponding to the selected assembly is operated by unit 399.

Figure 37:
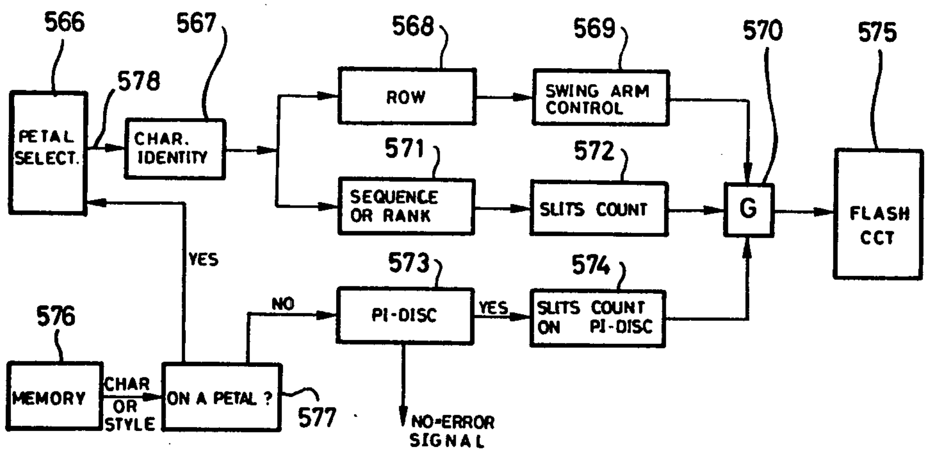
FIG. 37 is a block diagram of a character selection circuit used with the machine of the present invention.

The selection of any character located within the confines of the machine at any time is represented schematically by the block diagram of FIG. 37. Block 576 represents the character memory containing, in coded form, all the characters available. The character codes can comprise the petal identity codes, assembled discs identity codes (in the second mechanism character storage embodiment) and pi-characters identity codes.

When a new character is called for, a comparison circuit 577 determines whether said character is on a petal or on the pi disc 334. If it is on a petal, the command is transferred on the lead 395 to the selection circuit 566 which is shown in detail in FIG. 40, as well as in FIG. 37.

After the petal containing the desired character has been selected by the unit 566, the output signal on lead 578 in FIGS. 37 (and 40) is transferred to a character identity unit 567 which controls the row selection circuit of unit 568, thus controlling the row selection motor 569. The flash circuit 575 is operated, provided gate 570 has been cleared by the swing-arm control operation, when the selected character location has been detected by units 571 and 572.

If the selected character is not located on a petal but is on the pi-disc instead, unit 577 sends a signal to the pi disc circuit of unit 573 which transfers to unit 574 the necessary information to move the pi disc to the right location. At this time, gate 570 opens and the pi character is flashed.

CHARACTER SHAPE MODIFICATION

Figures 34, 34A, 35:
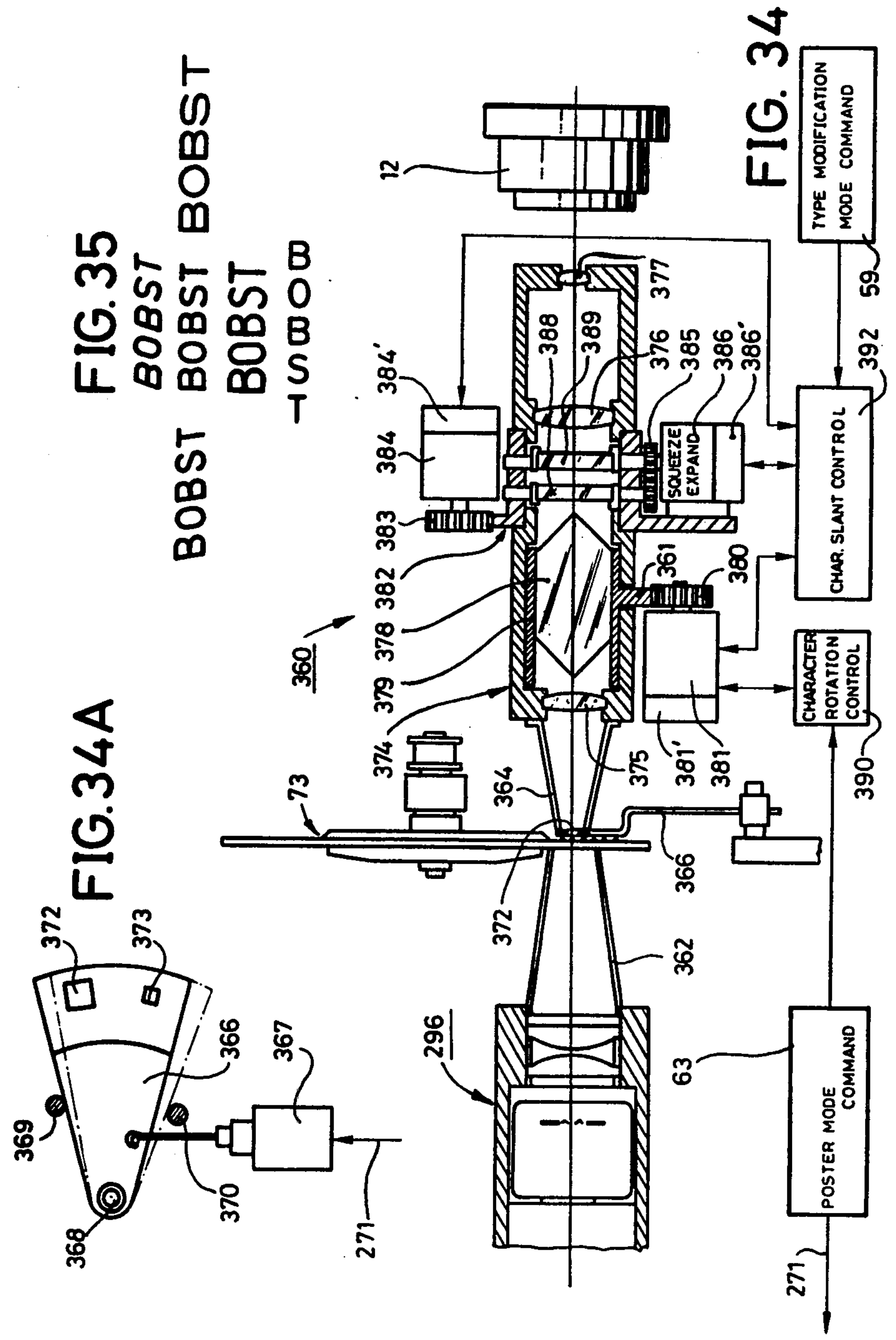
FIG. 34 is a schematic representation of the optical character shape modification unit of one embodiment of the optical system of the complete machine of the invention.
FIG. 34A is a partially schematic elevation view of a component of the machanism of FIG. 34.
FIG. 35 illustrates various modified character shapes produced by the device of FIG. 34.

The character shape modification system shown in FIGS. 34 and 35 gives the added possibility of changing the appearance of characters as it is shown graphically in FIG. 35. In FIG. 35, the same word composed from the same petal or fonts appears in a variety of different shapes.

The components of the character modification unit 360 of FIG. 34 are similar to the components of the type modification system described in U.S. Pat. No. 4,230,399. Petal characters of composite disc 73 are illuminated by device 296 (also see FIG. 26) provided with a shield 362 whose output opening is large enough to illuminate characters twice as large as normal characters, for the purpose of producing lines of display type of large size.

The light beams energing from the petal can be diaphragmed by the window mechanism of FIG. 34A. Those beams pass through a shield 364, through collimating lens 375, double dove prism 378, a pair of optical wedges 388 and 389, and finally through an imaging lens 376 which is located on the focal plane of zoom lens 12.

Double dove prism 378 is mounted in a sleeve 379 rotatably mounted in a cylinder 374 which is attached to the frame of the machine. The dove prism sleeve 379 is provided with an arcuate toothed extension 361 engaged by a gear 380 which can be rotated by motor 381 under the control of a decoder 381'. By this means, the dove prism can be rotated by a maximum of 45° in order to move character images by 90° around the optical axis. This facilitates the production of large signs in which character lines appear parallel to the film edge rather than perpendicular to the edges as is the case for normal text matter. Characters rotated in this manner are shown in the lower-most line of FIG. 35.

The "poster command" unit 63 (see also FIG. 2) operates the control circuit 390 which causes the dove prism assembly to rotate by 45°. At the same time, the poster-mode command signal switches the character-spacing circuit to the leading or line-spacing circuit, and vice versa.

When double-size master characters are utilized, the poster-mode command signal is delivered over a line 271 to a solenoid 367 (FIG. 34A) to rotate the diaphragm 366 around its pivot 368 from its upper portion, where it is maintained against a stop 369 by a spring (not shown), to its lower position against stop 370. This operation replaces the small diaphragm aperture 373 (for normal master characters) by the large aperture 372.

The dove prism assembly can also be used for special effects for display ads and for the production of slanted characters. The purpose of wedges 388-389 is to expand or contract characters, in the manner explained in U.S. Pat. No. 4,230,399. In the position shown, if the wedges are simultaneously rotated around their axes by gearing 385 controlled by motor 386 and its decoder 386', the character image produced at the output will be either "squeezed" (narrowed in width) or "stretched" (widened) depending on the rotation direction of the motor 386. The height of the character image remains unchanged.

The wedges 388, 389 are assembled on a rotatable ring member 382 which can rotate around the optical axis under the control decoder 384', motor 384, pinion 383 and an arcuate toothed section of member 382, as shown. The assembly can be rotated up to 90°, at which time the simultaneous rotation of the wedges will result in either an elongated or compressed character image, with no effect on its width.

Intermediate positions of the wedges around the optical axis, possibly combined with a small rotation of the dove prism, can produce slanted characters as shown in FIG. 35. The character slant control unit 392 is connected to receive the type modification commands from unit 59 of FIG. 2.

The use of the type modification unit 360 of FIG. 34 for "fitting" purposes will be described in relation to FIGS. 36 and 36A. It is well known in the printing art that special tables can be used to "copy-fit" a certain text within a certain space. The typeface and size is usually specified, although the latter can be subjected to small changes to fill the allocated space. The amount of line spacing or leading can also be slightly modified to shorten or lengthen a page. The desired result can be achieved by the selective use of the type modification unit 360 by slightly "squeezing" or "stretching" character images without changing the nominal typeface or size.

Blocks 808 and 809 of FIGS. 36 and 36A represent the allocated space for one column of text matter. The number of lines to be fitted into each block has been predetermined by reference to copy-fitting tables as mentioned above. But those tables can give only an approximate result so that, as shown in FIG. 36, at 808, the actual keyboarded column (in the specified style and size) is too long by an excessive amount "E". On the other hand, the example shows that the text of column 809 is too short by the deficit "D". These differences, E and D, are generally small, for example, of the order of 6%. The type modification unit can be utilized to fit the specified number of lines into the allocated space, as it will be explained now with reference to FIG. 36B.

The specified column height, for example, represented by a number of "leading" or line spacing increments, is stored in unit 810. The actual height after keyboarding and storing the column in memory is stored in a unit 811. The desired and actual values are compared in a comparator 812. If there are too many lines the excess "E" is transferred into box 813 and the difference is compared to the desired height of the column in unit 815 to produce a percentage correction value appearing on line 807.

It is assumed, in the present example, that the text of the column has been composed with no extra space between lines so that the excess E cannot be absorbed by reducing the value of line spacing, and that the nominal point size should not be altered and, in addition, that the style being used could not accommodate any squeezing by reducing the intercharacter spacing. In this particular case, the character modification unit will be used to slightly squeeze each character image by the percentage appearing on line 807, without affecting the character height.

It is evident that the above modification will increase the number of characters per line, which makes it necessary to re-justify each line. This is accomplished, as it is well known in the art, by adding individual relative character widths from unit 817, multiplied by the size (or set) factor of unit 818 to determine the actual length of the line to be composed. In order to take advantage of the type modification being described, an additional factor represented by connection 807 is introduced into the multiplier circuit before the actual hyphenation and justification operation of unit 820, which is connected to the storage unit 824 as shown. A code corresponding to the percentage compression of character shapes also is transferred from unit 815 to the storage 824. During the transcription cycle, upon reading the special compression code from memory 824, the optical wedges assembly is positioned to produce the specified compression by selective rotation of the assembly supported by rotatable member 382 through actuation of the motor unit 384 (FIG. 34), and/or by energizing motor unit 386 controlling the "compression" - "expansion" function.

Referring now to block 809 of FIG. 36, the length deficit D could be absorbed by increasing the line spacing. But there are cases where it is desirable to keep lines of adjacent columns in perfect alignment. In this case, the characters can be expanded following the same procedure as described above, except that the wedges are rotated in the opposite direction.

To compensate for the "deficit" D of column 809, it is possible to recompute the line spacing value as determined by unit 812 and appearing on line 826 or, if it is desired not to leave any blank spaces between lines, the character images can be stretched by the percentage determined by comparison circuit 812, and units 814 and 816. A special "stretch" code is introduced into storage unit 824, as is the new leading value based on the original preselected leading shown in unit 821 connected to unit 822 by the required percentage to produce a "solid" column.

RULING

The production of horizontal and vertical ruling can be obtained in either one of two modes of operation. If no special "pi" disc is used, the rule producing light beam can be obtained either by shining light through a special "hole" (dot or other small transparent mark on the petal) after accurately stopping the rotation of the petal so that the desired hole is on the optical axis, or, as described in relation to FIGS. 6 and 8, by rotating the swing-arm in order to bring the appropriate aperture of plate 105 on the optical axis. In either case, rules are projected by using the flash-lamp ordinarily fired for the projection of characters.

For the ruling operation, the flash-lamp is operated at a frequency dependent on the size of the aperture selected, the relative displacement speed of the light-receptive medium, and the sensitivity of the medium. Also, the flash intensity can be varied for the beginning and the end of a rule, or at the intersection of rules, by acting on the flash intensity control circuit. Rules are obtained by projecting small overlapping dots or segment images at a flashing rate much higher than the rate used for text composition in order to obtain the same "rule" quality as can be obtained by a continuous light source as described in U.S. Pat. No. 4,148,571.

Figure 53:
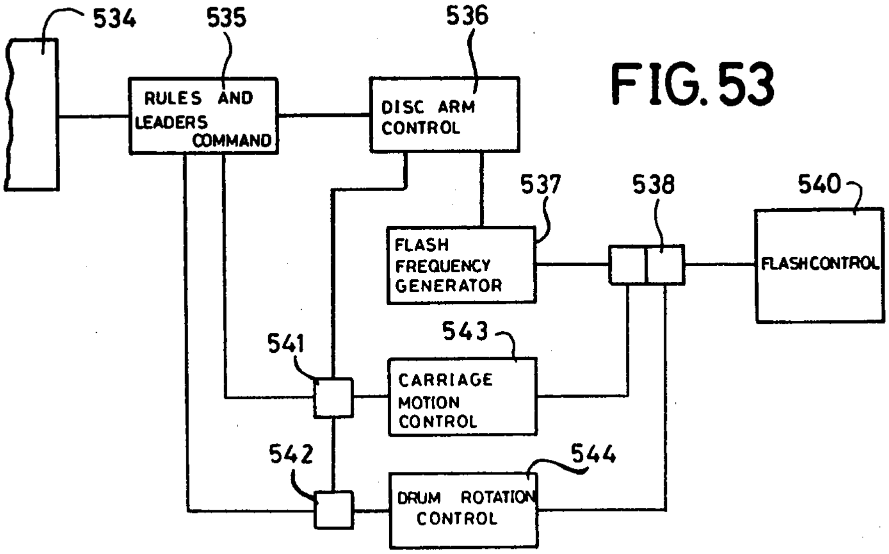
FIG. 53 is a block diagram of the control circuit for automatic ruling with the machine of the invention.

FIG. 53 is a schematic representation of a control circuit which can be used for the production of rules. The rule signal emerging from input unit 534 (see also block 60 in FIG. 2) is transferred to the rule command control unit 535 which causes the swinging disc arm to move to place the pre-selected aperture of the plate 105 (FIG. 6) or 120 (FIG. 7) on the optical axis by acting on the disc arm control circuit 536. When the arm is in the desired position, the unit 535 causes a gate 541 or 542 to open. Unit 536 triggers a flash frequency generator 537. Unit 535 causes either the character spacing control circuit 543 or the drum rotation control circuit 544 to operate in a continuous mode; horizontal rules are produced if gate 541 has been opened, and vertical rules are produced if gate 542 is energized. The triggering of the flash frequency generator 537 and of the spacing carriage and/or line spacing mechanism causes a gate 538 to open, and the flash control circuit 540 to start firing the flash lamp, as long as either the character spacing or line spacing mechanism is in motion. Continuous feedback signals may be sent to the circuit 537 from the photoelectric pulse generator associated with the spacing carriage shown in FIG. 1, or from a similar generator or decoder associated with the spacing drum 34.

The frequency of the output signal from the generator 537 determines the frequency of the flash. As mentioned above, this frequency varies; it is an inverse function of the aperture size, and sensitivity of the medium, and is a direct function of the speed of the character spacing mechanism. Thus, the frequency rises as more light is needed, and drops if less is needed.

HIGH LIGHT INTENSITY MODE OF OPERATION

As it has been mentioned in the description of the first embodiment of the invention, the continuous rotation of the petal assembly or disc 73 can be replaced by an oscillating movement. This mode of operation, which will now be described, is preferable for certain types of recording media which necessitate a relatively high light energy level. Although present day flash lamps can produce the necessary energy, it is well known that the flash duration increases with the output energy. This increased duration produces an undesirable "trailing edge" on one side of the character image, as it is well known in the art. It is of course possible to reduce the trailing edge to an acceptable value by decreasing the rotational speed of the matrix. However, a point is quickly reached when the speed of productivity is no longer acceptable for the class of machine herein described.

According to a feature of the invention, the character disc 73 is decelerated considerably just before the selected character reaches the optical axis, and then accelerated again after the character has been flashed. The speed reduction is, for example, by a ratio of ten to one. In order to reach a reasonable level of productivity, the petal assembly or disc should be slowed down and speeded up within a very short time, of the order of a few milliseconds. This mode of operation is made possible by the structure, and the small size and weight of the petal assembly, an important characteristic of the invention.

In a preferred embodiment, the disc oscillates first in one direction, and then in another, relative to the optical axis of the machine. If the characters are all from the same font, then the disc oscillates only within a small area—the area of one petal. This fact enhances the productivity of the machine.

The character arrangement into a petal to be used in the presently-described mode of operation is represented in FIG. 5B. This figure differs from FIG. 5A which represents a petal to be used in the "continuous" mode of operation, in that the most frequently used characters are grouped within a zone 94 located approximately at the center of the petal. The purpose of this arrangement is to further minimize the to-and-fro oscillations necessary for the selection of characters of a given row, and also to limit the swing-arm motion to a one-row step, in most cases, since, as mentioned earlier, the section 94 contains at least ninety percent of the characters to be found in normal text.

The petals or disc drive motor 4 (FIG. 9) is controlled by a circuit (not shown) to move the petal clockwise or counter-clockwise, depending on the location of the character to be flashed relative to the previously flashed character. The flash timing also is determined by counting the photoelectric pulses produced by the timing slits of row 83 (FIG. 3) as in the "continuous" mode. But in the present embodiment, the number of accumulated pulses appearing in the pulse counter which was triggered by the passage opposite detector 110 (FIGS. 6, 7 and 8) of the first timing slit of row 83 (when the selected petal is rotated into operating position) is increased or decreased, depending on the rotational direction of the petal as it oscillates to go from one character to the next.

It is well-known that the response time of a photoelectric device of the kind used in the flash timing circuits of photocomposing machines can affect the accuracy of the character placement on the film. If, for example, characters are flashed "feet first", that is, when their base-lines cut the optical axis, as they move, if the circuit is properly adjusted to obtain a good base alignment of characters at a given matrix speed, this alignment is lost if the matrix speed is suddenly increased or decreased.

With the use of ordinary photocells in the present embodiment, the variation of petal speed caused by the sudden deceleration of the disc at the time of flash would produce an unsatisfactory base line. In addition, a base-line shift would be created when one character is flashed with the petal moving clockwise, and another character is flashed with the petal moving counter-clockwise.

Figure 38:
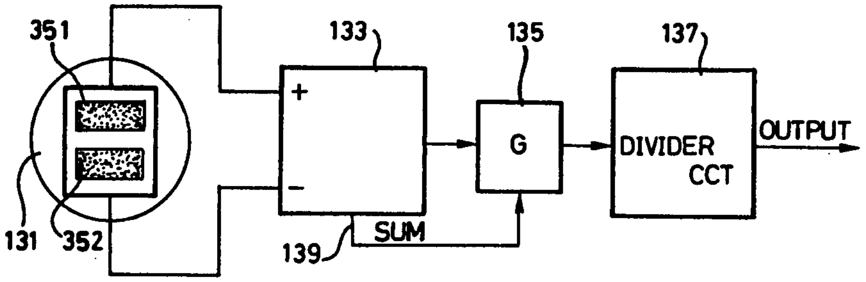
FIG. 38 is a block diagram of the differential photocell output circuit used in the invention for detecting character location errors, etc.
Figure 39:
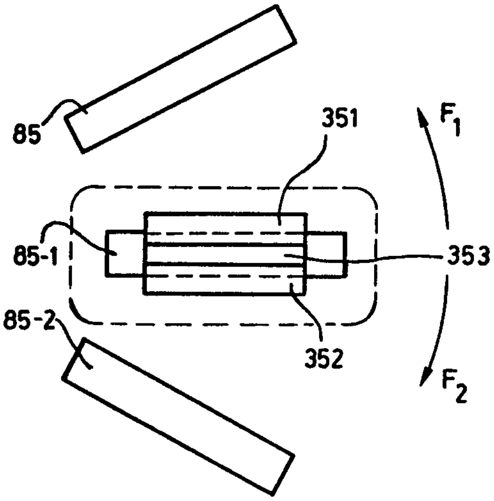
FIG. 39 illustrates in schematic form the use of the photocell of FIG. 38 as a slit detector for flash timing.

According to a feature of the invention, these base-line variations are avoided by the use of a differential photocell such as that shown in FIGS. 38 and 39. Differential photocells are well-known and are commercially available.

Referring to FIG. 39, three timing slits are shown at 84, 85-1 and 85-2. The width of the slits is greatly exaggerated in FIG. 39 for the sake of clarity. The differential photocell or photodetector 131 comprises two separate photosensitive areas 351 and 352 which are connected in a differential detection circuit as shown in FIG. 38. The circuit in FIG. 38 includes a differential amplifier 133 which provides an output signal on line 139 proportional to the difference between the currents in the two areas of the photocell, and another signal on line 141 proportional to the sum of those signals. A comparator circuit 135 produces an output signal when the signals on lines 139 and 141 are equal. A voltage divider 137 divides the output of unit 135 and sends a corresponding output signal to the flash unit (not shown) to create a flash. Thus, the circuit generates an output signal at the exact time the light impinging on each separate area 351, 352 is the same. This occurs when the light shining through the slit is exactly centered with respect to the junction 353 between the two photosensitive areas of the photocell 131.

Since the photocell 131 is symmetrical in the direction indicated by arrows $F_1$–$F_2$, it makes no difference in its operation which direction the disc or petal moves. Also, the relatively short response time of the photocell helps keep the timing of the flash substantially independent of the speed of the disc.

Figure 52:
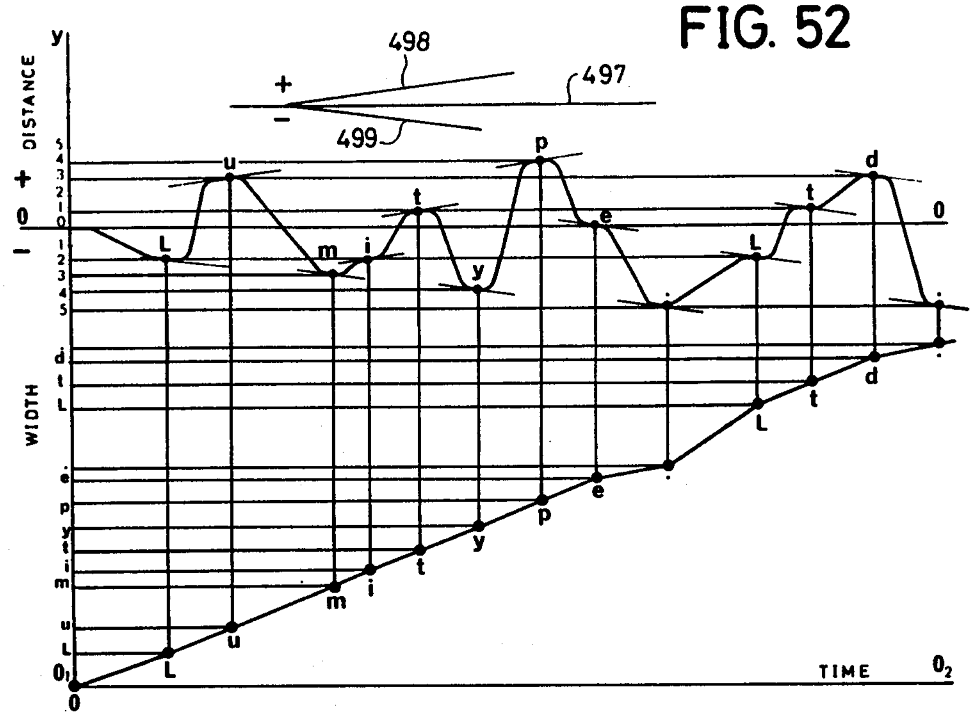
FIG. 52 is a graph illustrating the excursions of one character petal around a central position for the composition of a word in the modulated operation mode.

In a preferred operating mode of the system presently described, the oscillating speed of the petal is controlled by stored speed functions selected according to the distance the petal has to rotate and the width of the character projected or the next-to-be-projected. Referring now to FIG. 52, fixed speed values are represented by the slopes of lines 498 and 499 relative to a neutral (or zero speed) median line 497. The undulating upper curve of this figure illustrates the positive (clockwise) or negative (counter-clockwise) displacements of the petal, and the lower curve represents the displacements of the spacing carriage. The figure represents the movements of both petal and spacing carriage for the composition of the words "Lumitype. Ltd.".

In the upper curve, the median position of the petal, which has been selected to be the position assumed by the petal, when the letter "e" is on the optical axis ready for projection, is represented by line 0—0. The positive or negative numbers adjacent to the y axis represent the rank values (as defined earlier) of the characters to be projected. The time elapsed is represented along the x axis. If we assume that the petal is at position zero at the beginning of the composition of the line, it will move down two steps to be ready to flash letter "L", then up five steps to bring the next letter "U" in photographic position, etc. In a manner similar to the one described in relation to FIGS. 50B and 51B, the petal holder is moved in the pre-determined direction at a speed such that it can be slowed down to the pre-determined "flash speed" represented by the slope of line 498 or 499. The petal holder displacement and the carriage displacement can be synchronized in the manner explained above in relation to FIGS. 50A, 50B, 51A and 51B. It can be seen by observing the upper portion of the curves of FIG. 52 that the petal is moving at the same speed and in the same direction for the projection of characters L; m; y; e; period; L; t; d; and comma. It moves at the same speed but in the other direction for letters u; i; t; and p. In the case of repeated letters, the petal would be caused to oscillate so that the repeated letter would cross the optical axis several times at the same speed but in different directions.

The lower curve of FIG. 52 is a graphical representation of the displacement of the spacing carriage. Although the carriage can be operated in the start-stop mode, as mentioned before, it is represented in FIG. 32 as operating in the "speed modulated" mode. The maximum time allocated for the selection of a character by petal oscillation determines the maximum speed of the carriage. The figure shows that the carriage moves at a continuous and uniform speed until the last letter "e" of the word "Lumitype" because, up until this point, the petal was taking less time than the carriage to move from one character "notch" to the next. However, the petal motion between "e" and the "period" is relatively large while the spacing between the characters is relatively small and the petal would not yet be correctly positioned to flash the "period" at the time the carriage readies the point where this period should fall in its notch. So in this case, the speed of the carriage is reduced, as it is represented by the change in the slope of the curve following the period. The next character calls for a relatively large spacing (carriage motion). Since the petal has a relatively small distance to rotate, the carriage speed is increased, as shown, to finally return to a pre-determined average speed following the projection of letter "L".

AUTOMATIC ADJUSTMENT CONTROLS

The preferred complete embodiment of the invention provides automatic control, without human intervention, of the following functions:

Base line alignment of characters for different sizes.

Left (or right) margin alignment, also for different sizes.

Enlargement to the exact specified value.

Light output check and correction.

Focus check and correction.

Reference is made to U.S. Pat. No. 4,230,399 in which means are shown and described for accomplishing these functions. The following description relates to different means or structures for this purpose.

Figure 27:
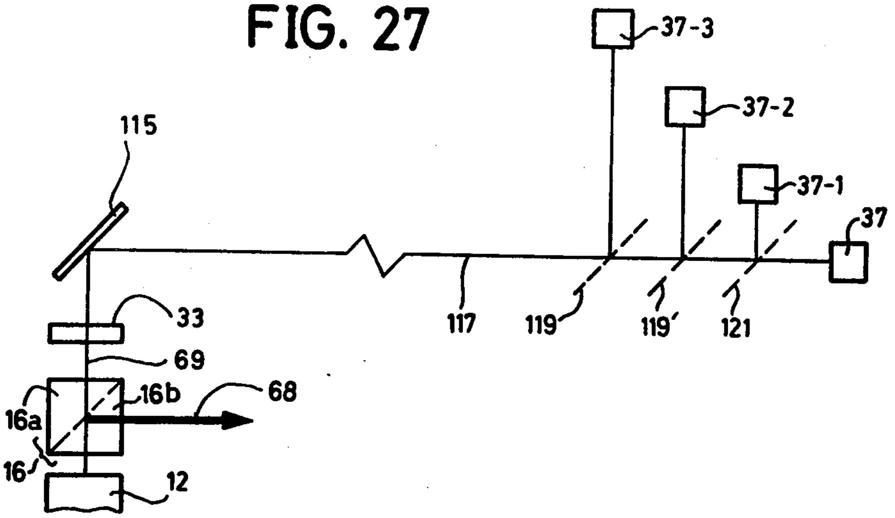
FIG. 27 and FIGS. 27A to 27D are schematic diagrams of an automatic adjustment control system used with the machine of the present invention.

FIG. 27 gives simplified schematic representation of the means used for controlling the above-mentioned functions. In FIG. 27, the same reference numbers as in FIG. 1 represent the zoom lens 12, the beam splitter 16 and the lens 33, which components are utilized for all the automatic correction circuits.

The light beams emerging from the zoom lens 12 are divided into two parts by the beam splitter 16. The major portion of the light beams is deviated to the right to follow path 68 and enter the traveling carriage lens 30 of FIG. 1. The other portion of the beam, shown at 69, enters lens 33 which makes an image of the projected character via mirror 115 on one or more photodetectors shown at 37, 37*a*, 37*b* and 37*c*. Beam splitting mirrors such as 119, 119′ and 121 are located on the path 117 of the image-carrying beams in order to produce images on the photodetectors.

In one mode of operation, for automatic checks and/or adjustments, the character spacing carriage is moved to an extreme position, at which it projects images beyond the effective light-sensitive area of the medium located on the drum 34, as shown at position 32-3 in FIG. 18, and in U.S. Pat. No. 4,230,399.

In another operating mode, when automatic checks and/or adjustments are desired, the carriage either stops anywhere along its tracks, or is moved to a "home" position. When a size change is called for, the selected filtered shape mentioned above in relation to FIG. 6 is brought into operative position on the optical axis, and the flash lamp is fired at a high repetitive rate in the "automatic ruling mode" described above. The filtered light is of such wavelengths (e.g., wavelengths for red light) that it will energize the photodetectors of FIG. 27 but will not expose the film or the photosensitive medium 39. The reason for this is that the photodetectors 37, 37*a*, etc. are sensitive to "red" radiation, but the photosensitive medium 39 is not.

Of course, the use of a filter is not applicable to the focus and intensity control adjustments. For this purpose, the beam splitter can be replaced by a collapsible mirror as described below. As an alternative, the beam splitter may be replaced by two prisms 16-*a* and 16-*b* (FIG. 27) whose hypotenuses normally are separated by an extremely small space of the order of one or a few microns. When any automatic check or adjustment is to be made, the two hypotenuses are brought into intimate contact by piezoelectric or other means against the action of small springs. In order to avoid the "sticking" of the hypotenuses due to air pressure, the prisms can be located in an evacuated container provided with one input and two output glass windows.

A. Base Line Adjustment

It is well known that commercial lenses in general and particularly commercially available zoom lenses often introduce a rotational image shift when they are re-focused. The image shift in the present machine results in a changed location of the character center relative to the optical axis in the Y or vertical and X or horizontal directions.

Figure 27D:
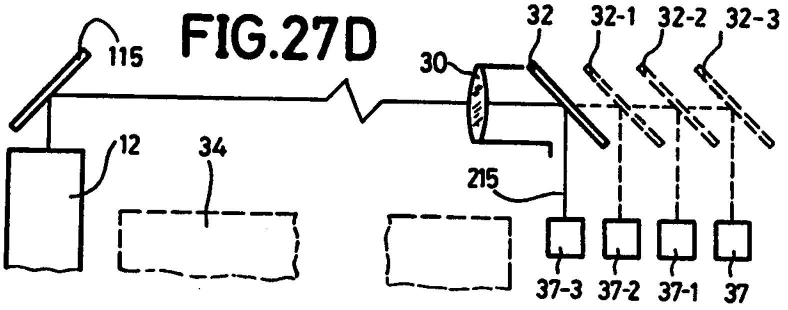
Figure 27C:
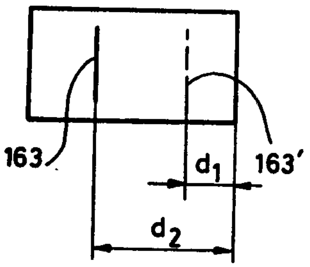
Figure 27B:
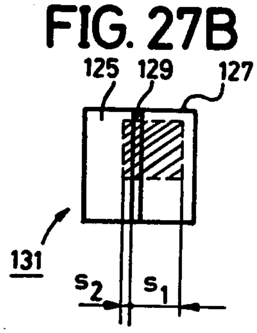
Figure 27A:
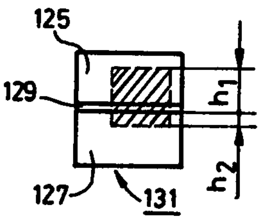

Whenever the enlargement ratio is changed by predetermined operation of the point-size control motor 14 (FIG. 1), any displacement of the lens optical axis affecting the base alignment of characters is checked and corrected as follows. As soon as the motor has stopped, a special character, for example in the shape of a square, is projected, either from the moving petal or from an aperturn of the rule and/or pi insertion mechanism. The image of that character is projected onto the active surface of a differential photocell 131 shown in FIG. 27A. The photocell 131 can comprise one of the detectors 37, 37*a*, 37*b*, etc. In FIG. 27A, the square image of the special character is represented by the shaded area astride the centerline 129 between the two active areas 125 and 127 of the photocell. If the image is not centered with respect to the centerline 129, (as is the case in FIG. 27A), the vertical imbalance signal (which is proportional to $h_1/h_2$) is detected by photoreceptor circuits 756 (FIG. 17), activated through a gate 755, and the actual deviation of the image from symmetry with respect to the centerline 129 is recognized by a unit 757 which transfers the deviation value to a comparison circuit 762 where it is compared to the previous deviation value which was stored in a storage unit 759 during the previous size change. The difference, positive or negative, between the new and the previous deviations is sent to the vertical correction table 761 where the necessary corrections are stored to activate a drive circuit 760 to move the leading mechanism (drum 34 of FIG. 1) by a predetermined value in one direction or the other in order to compensate for the changed position of the zoom optical axis. After the compensation is accomplished, gate 758 is opened to transfer the new deviation value to the storage unit 759.

B. Margin Adjustment

The operation of the zoom mechanism often will also result in a horizontal shift of the character image. The correction procedure is the same as the one described above, except that a different detector 37*a*, or 37*b*, etc., is used. The detector is shown in FIG. 27B. It comprises a differential photocell 131 rotated 90° with respect to the photocell in FIG. 27A. Referring again to FIG. 17, a signal proportional to the deviation of the square image from symmetry with respect to the vertical centerline 129 (proportional to $S_1/S_2$) is delivered to the horizontal deviation circuit 757' and is compared to the previous value stored in unit 759' by comparison circuit 762'. Table 761' gives the memory spacing carriage displacement value and the correction direction to compensate for the error introduced by the image shift. Gate 758' is energized at the end of said correction operation in order to transfer the "new" deviation to unit 759' where it becomes the "previous" deviation.

Tables 761 and 761' also are connected to the point size control circuit 57 (also see FIG. 2) to introduce an additional x and y correction solely for the magnification selected. The purpose of this correction is explained in U.S. Pat. No. 3,590,705, particularly in relation to FIG. 13 of that patent.

The differential photodetectors utilized to detect the X and Y deviations of the zoom optical axis can be replaced by arrays of small photodiodes as described in U.S. Pat. Nos. 4,119,977 and 4,230,399. In addition, the focal length of the lens 33 can be selected to give either a smaller or a larger image of the test character than when projected to the film through lens 30 of FIG. 1.

Alternatively to two separate photocells 131, a single four-quadrant differential photocell called a "spot detector" can be used to detect both vertical and horizontal assemtry of the test image and produce a correction, as it is disclosed in U.S. Pat. No. 4,230,399 and shown in FIG. 33 of the drawings of that application.

C. Enlargement Control

The desired point size or enlargement ratio of petal characters is obtained by operating the zoom lens by selective rotation of motor 14 (FIG. 1) with feedback information produced by an encoder attached to the zoom lens or motor. The position given by the encoder can be matched to the required position stored in a table, corresponding to the size required. But it is well known that for the same nominal position of the enlarging mechanism, the actual magnification varies from one zoom lens to another, partially because of mechanical tolerances. The exact adjustment for a given size (or enlargement value) of the particular zoom lens installed in a particular machine can be automatically determined as explained in relation to FIGS. 20 and 27C.

The photodetector used can be of the "LSC" or "SC" type of light position sensor manufactured by "United Technology, Inc.", Santa Monica, Calif. In the detector represented in FIG. 27C, the distance of a luminous spot or line such as 163 from a reference point of the detector is represented by a voltage. In the present example, two characters, each consisting of a single vertical line, are projected in succession. Each such "character line" is located as far from the character centerline to the right for one and as far to the left for the other as can be accepted by the optical system. The images of said lines are shown at 163 and 163' in FIG. 27C. Although these images are shown together, it should be understood that they will appear one at a time, within a relatively short time interval, for example of the order of one millisecond.

Assuming that the right edge of the photodetector is the reference point, the distance $d_2$ from that point to the line 163 will be detected and stored, and then the distance $d_1$ from the reference point also will be detected. The difference $d_2-d_1$ is stored in a register 771 of FIG. 20. It can be understood that the distance $d_2-d_1$ is a function of the exact enlargement ratio or point size to be obtained. That distance is translated into a real size (for example, expressed in points) in a look-up table 763 connected to unit 771. A comparison circuit 765 compares the real size thus received from unit 763 to the nominal size entered into unit 764 by the operator, through the input memory or by direct manipulation. If the comparison circuit shows no deviation, a pulse appears on the line 770 to call for the next operation. If there is a difference, a value proportional to the difference between the nominal and the actual enlargement is transferred over line 769 to the zoom lens control mechanism 766 which will make the necessary slight adjustment of the zoom in one way of the other until the equality signal appears on line 770. At this time the position of the zoom encoder is stored into memory 768 to be used for subsequent machine operation. In other words, each time a certain size is requested, the zoom will be located according to the stored value rather than according to the nominal value. It is of course not necessary to store the correction value for future use.

The system described also can be used without storage, by correctly positioning the zoom lens for each change using the method just described with automatic feedback from the comparison circuit to the driving mechanism of the zoom.

D. Intensity Control

The flash intensity can be adjusted by a potentiometer-controlled voltage, as described in co-pending application Ser. No. 92,465 and/or by switching capacitors. The amount of light required depends on the factors schematically represented in FIG. 21, where 777 represents the zoom lens mechanism operated by the point size control; 772 the manually-adjustable "base" power which depends on the photosensitiveity of the material used to output images; 773 represents a relatively small adjustment controlled by the characteristic of the type face used; and, finally, 774 represents the change introduced for the "ruling" function, which generally requires less light than for normal characters because of the overlapping effect of small line segments.

More important is the influence of the enlargement ratio on the light reaching the photosensitive media. Satisfactory results with most optical systems can be obtained by adjusting a diaphragm, as it is well known in the art. But this method requires more average energy for the flash lamp because the intensity equality on the film is achieved by "throwing away" extra light. This also would be true if one were to insert a variable-density filter in the optical system.

According to another feature of the invention, the flash intensity is adjusted to the optimum value by first selecting the minimum voltage and capacitor values for a given point size (enlargement), then automatically switching capacitors when the maximum voltage cannot give the required light output and slowing down the matrix in accordance to the capacity used in the flash circuit beyond a certain value either constantly or just at "flash time" by a pre-determined value to avoid an unacceptable "trailing edge" on the character images. The different voltage and capacitor values can be experimentally determined by a series of density tests for each medium likely to be used and for the most usual positions of the zoom lens. These values are stored in unit 883 (FIG. 21) in binary form. For example, seven digits may represent voltages ranging from 400 to 1200 volts by 10 volt increments, and three additional digits may represent capacitor values. For "slow media", and large sizes, the unit 883 can also control a "multi flash" circuit as described in U.S. Pat. No. 2,999,434. The memory 883 is connected to the flash control circuit, schematically shown at 775, which includes the voltage selection circuit 884 and the capacitor selection circuit 885. The unit 776 represents the matrix speed control device.

E. Automatic Focusing Control

The same special "slots character" as that described in U.S. Pat. No. 4,230,399, and its associated photodetector 37C can be used for automatic control of the focusing of the zoom lens 12. In order to illuminate the special character during its transit across the optical axis, the flash duration can be increased from approximately one microsecond to 100 microseconds. The same total energy is expanded over a longer period of time so as to avoid overloading the flash lamp.

The existing timing slits of the petals can also be utilized, rather than a special "Pi" character. For this purpose, the petals arm is pivoted clockwise (FIG. 6) in order to place the timing track on the optical axis. Continuous illumination during the focusing check can be obtained either from a small neon lamp located adjacent to the face of the flash lamp (of such shape and dimensions to operate as a cylindrical lens in order to increase the "width" of the flash light beam), or from an outside light source whose output is merged with the output of the flash lamp by the use of a beam splitting blade or a collapsible mirror.

It must be understood that the beam splitter 16 may be replaced by a plate-type beam splitter having (wavelength responsive) different transmitting and reflecting characteristics or by a pellicle beam splitter. The beam splitter can also be replaced by a collapsible mirror arrangement to direct all the light emerging from the zoom lens toward the photodetectors when said mirror is out of the way, and transmitting no light when the mirror is in the operated position where it directs all the zoom output rays toward the character spacing carriage lens.

The advantages of the system described reside in the fact that measurements may be made at any time and simultaneously.

The arrangement described in U.S. Pat. No. 4,230,399 has the advantage of directing toward the photodetectors the final imaging rays as they will impinge on the film. The same general configuration can be utilized in the present invention as shown in FIGS. 27D and 18 in which the same or similar components are designated by the same reference numerals as in FIG. 27. However, in FIG. 27D, reference numbers 32; 32-1; 32-2; 32-3 represent different positions of the spacing carriage mirror 32 rather than different mirrors. The maximum "active" printing area is represented by broken lines 34 which also represent the outline of the drum of FIG. 1.

For simultaneous energization of the photodetector the carriage may remain at (mirror) position 32, shown at 32-3 in FIG. 18. The outcoming beams 215 are divided by a group of mirrors 119, 119' and 121 similar to those described in relation with FIG. 27 (see FIG. 18).

LENS ATTACHMENT

The character images produced by the zoom lens can be further enlarged or reduced by an optical attachment which can be mounted on the spacing carriage, as described in relation to FIGS. 54A and 56D.

The character spacing carriage 18 of FIG. 1 is shown schematically in FIG. 54A. The carriage base, in the form of plate 503, supports imaging lens 30 and mirror 32. As it has been described above, the lens 30 receives collimated light rays from the zoom lens to converge them to its focal plane located on the light sensitive medium. A mirror (or prism) 32 deflects the emerging light beams by 90° . Character spacing along a line is obtained by selective displacements of plate 503 along the optical axis of the optical system, parallel to the image receiving surface. The travel of the light rays when no attachment is utilized is illustrated in FIG. 54B.

A removable enlarging attachment is schematically represented in FIG. 55A. It comprises a base-plate 508, to which the following optical components are attached: a first mirror 509, a negative lens 510, a second mirror 511 and a third mirror 512. FIG. 55A represents the assembly rotated 90° around line 513 for clarity's sake.

The path followed by a light ray entering the system is represented in FIG. 55B, where the same components as in FIG. 55A are identified by the same reference numbers.

FIG. 55C represents the auxiliary enlarging assembly of FIG. 55A mounted on the basic carriage base plate 503 in operating position. Although not shown in the figure, base plate 503 and the auxiliary plate assembly of FIG. 55A are removably positioned and locked in place.

The relative position of the optical components is more clearly shown in FIG. 55D where the entering beam 502, passing through the lens 30 of the base carriage, is deflected by mirror 509 toward the negative lens 510. The emerging beam is further deflected by mirrors 511 and 512 along path 504 toward the photosensitive surface located in a plane perpendicular to existing beam at the focal plane of the optical system.

The introduction of the negative lens in the output path of lens 30 results in an increased focal length as compared to the focal length of the lens 30 alone. In a preferred enlarging attachment, the focal length of lens 30 is effectively doubled, which results in doubling the size of the projected images. The different mirrors are so located in relation to the two lenses to obtain the desired enlargement ratio and a sharp image on the same plane as when the attachment is removed.

A size-reducing attachment is represented in FIG. 56A. This attachment is comprised of a plate 516 on which lenses 517 and 518 are mounted at a pre-determined location. There again, the attachment is shown rotated 90° around line 519 from its normal position to better show the components. Lens 517 is negative and lens 518 is positive.

The assembly of the attachment and spacing carriage is shown in FIG. 56C.

The light rays path is illustrated in FIG. 56D. The entering beam 502 first meets the lens 30 of the basic carriage and then goes through negative lens 517, is deflected by base carriage mirror 32 and finally goes through positive lens 518 which makes a reduced image of the character on the photosensitive surface at the same fixed location. This result is made possible by judicious selection of the lenses and their locations on the auxiliary plate. The effective focal length of the assembly may be reduced by 50% in a preferred embodiment which makes it possible to produce halfsize characters for a given enlargement ratio of the zoom lens.

The carriage base plate 503 can be provided with positioning and locking means, not shown, which can be used for either the enlarging or reducing attachment being described.

OUTPUT UNIT

The dual-purpose output unit referred to in relation to FIG. 1 of the preferred embodiment of the invention is represented schematically in FIGS. 57 through 60.

A. Using Photographic Film

FIG. 57 represents the unit after it has been prepared to handle film stored in the form of a roll 514. The input film cassette assembly is shown at 40, and the output cassette at 44. Both are removably secured to the bracket 515 attached to the base of the machine. The input film cassette assembly includes a film spool provided with a shaft 853 which is removably coupled by mechanical or electromechanical means to a torque motor (not shown). In normal operation, the torque motor tends to rotate the spool in the clockwise direction indicated by arrow $F_1$.

The output cassette, which can be held in position by magnetic latches for easy insertion and removal, is provided with a projection 44' acting as a light baffle and coupling means with output drive assembly 857. The assembly 857 contains two pinch rollers 855 and 856. Roller 844 can be rotated in the counter-clockwise direction by the torque motor, and roller 856 is an idler. Projection 42' of assembly 857 acts as a guide for the film.

The purpose of the mechanism just described is to keep the film partially wrapped around the drum under constant tension. The input cassette torque motor tends to pull the film in one direction and the torque motor at the output side tends to pull the film in the other direction, but no motion occurs until the drum is rotated because of the friction between film and drum obtained as described below. The film is forced to follow rotation of the drum in either direction.

To prepare the machine for the first mode of operation a certain length of film 586 is pulled out of the supply or input cassette 40 through an elongated light baffle 40'. The film can be manually wrapped around the periphery of drum 34 (also see FIG. 1) and introduced through elongated light baffle 42' into output cassette 44. The drum 34 acts as transport means for the film, as well as accurate film platen or support at the character projection area 549 which represents the center of the image-carrying light rays on their way to the photosensitive medium 586 on the drum. Pressure rollers such as 852 preferably are utilized to press the film against the drum. These rollers can be mechanically coupled to the drum mechanism so that they are positively rotated at the same circumferential speed as the drum. This insures positive traction of the film in either direction without detrimental slippage.

The section of the film located on the drum surface is held firmly against that surface by means of a vacuum, as it now will be explained. The drum preferably is fabricated from a light and rigid material. Its thickness is exaggerated in the drawing for the sake of clarity. The outside area of the drum is provided with longitudinal grooves 527 (also see FIG. 58). Twelve grooves are shown in the drawing. Each groove is provided with small holes such as 524 extending through the drum wall. The cylindrical body of the drum is attached to the centering flanges, one at each end. A flange is shown at 619 in FIG. 58. These flanges are provided with hubs 621 which rotate freely on a fixed tubular axle 622 which is secured by screws 626 to the frame of the machine.

The rotation of the drum for the film feeding (or leading) function is controlled by a motor 36 (FIG. 1), which drives a gear 559 (FIG. 58) attached to one of the end flanges 619 of the drum. The other end flange may be conveniently provided with an encoder in order to continuously detect and/or control the angular position of the drum during machine operation.

Referring to FIG. 57, inside the drum, mounted in fixed position in relation to the rotating drum assembly, and preferably secured to the inner tube 622 by welding, are partitions 612, 612' and 533 which divide the inner space of the drum into three sections as follows: the "west" half-moon-shaped section 545 located between the inner-side of the drum wall and partitions 612, 612'; the "northeast" section 547 located between the drum and partitions 612 and 533; and the "southeast" section 546 located between the drum and partitions 533 and 612'. The three sections also are adjacent to the outside wall of the central tubular shaft 622. The inner cylindrical space of the shaft 622 (sealed at the end not shown in the drawing by a plug) also is divided into three areas as follows: 548 limited by wall 531; the northeast area 562 and the southeast area 563, which areas are separated by a wall 532.

The purpose of the arrangement just described is to create a number of independent vacuum chambers inside the drum. The outside edges of partitions 533, 612 and 612' are provided with a gasket 613 made of soft material such as rubber to ensure a good seal when a vacuum is produced in the chambers and the drum is rotated. As shown in the drawing, the tubular shaft 622 has holes 623 to establish communication between the chambers and the inner tube areas mentioned above. A vacuum device (not shown), pulls air out of the inner areas of the drum through a pipe 561 (FIGS. 58 and 59) and a valve assembly shown at 560 and schematically shown in greater detail in FIG. 59.

Figure 60:
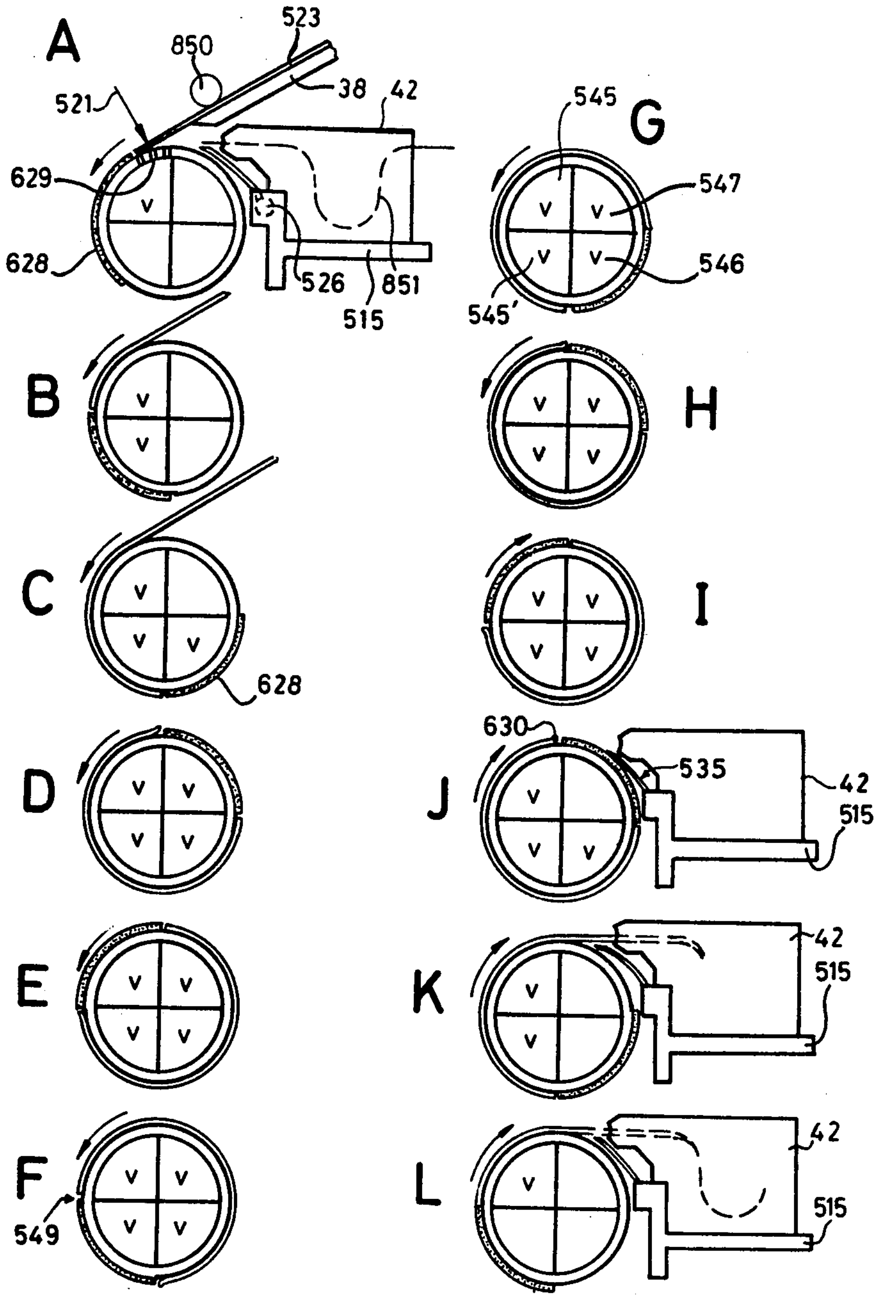
Figure 60:
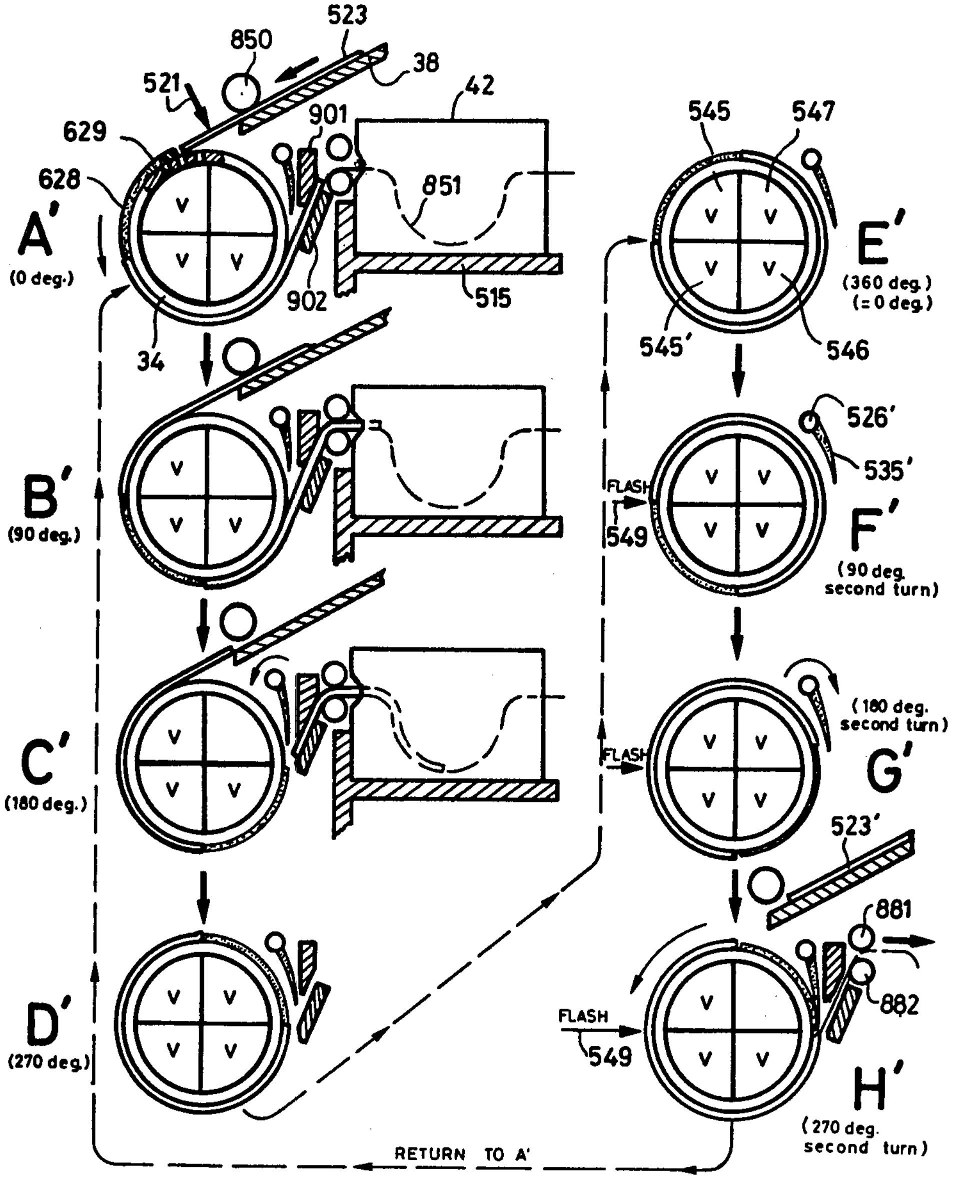

FIG. 59 shows schematically the structure of the valve assembly 560. Valve assembly 560 includes a vacuum chamber 633. The semi-cylindrical innerspace 548 of the tube 622 is permanently connected to chamber 633 by a pipe 583. The other two sections 562 and 563 of the tube are connected to the vacuum chamber 633 by pipes 584 and 585 and electrically-operated valves 564 and 565. Thus, the operation of the valve 564 causes the evacuation of chamber 546 and the operation of valve 565 evacuates chamber 547. The automatic operation of the valves is controlled by the drum operating circuits when the machine is used in the second operating mode which includes sheet feeding and electrophotography. It can be understood that, with chamber 633 evacuated via pipe 561, the direct connection of chamber 633 with inner drum chamber 545 will cause suction to be applied to the left half of the drum surface, but not to the right half. Although two electrically operated valves are shown in FIG. 59, it must be clear that as many individually operated valves can be utilized as is necessary for the control of the evacuated chambers. For example, the drum of FIG. 60 is divided into four chambers for easier handling of photo-material in sheet form such as zinc oxide offset plates.

In the normal or forward direction the film is pulled from the supply cassette roll 514 against the action of the torque motor acting on the roll, and the film leaving the evacuated half of the drum is forced into the output cassette 44 by the combined actions of the drum and the torque motor associated with assembly 857-1. The normal film feed operation is usually called "forward leading". In the "reverse leading" direction, the film is returned into the supply cassette under the combined action of the drum and the torque motor associated with the cassette and against the action of the output cassette assembly torque motor. (The torque motors are not shown in the drawings).

B. Using Electrophotographic Media

The other mode of operation of the output unit of the machine will be described in relation to FIGS. 60A to 60L and 60'A' to 60'H' where the drum of FIG. 57 is schematically represented in successive different rotational positions, approximately every one quarter of a turn, to better illustrate the sequence of operations in the electrophotographic modes of the invention. This mode relates to electrophotographic processing of such media as zinc oxide paper or plate material. The process is substantially the same as the one used in well-known electrophotographic office copiers, except that in the system described herein it may be necessary to reverse the process, for example by the use of a reversed toner that will produce black images on areas struck by the light rays to produce "positive" output copy.

In order to prepare the output unit for the second mode of operation, the following procedure is followed. The output and input cassettes are removed and a self-contained electrophotographic processing unit containing (preferably) a liquid toner is installed on the support 515 to replace the input film cassette as schematically shown in FIG. 60A. A paper sheet feeding mechanism may be installed, if desired, to replace hand feeding. Then the output control circuit is instructed by the operation of a switch to follow the programmed operation of the system for the electrophotographic operation as will be explained with reference to FIGS. 60A to 60L in relation with a zinc oxide sheet 523 having a maximum "printing" area length approximately equal to three-quarters of circumferential length of the drum.

The sequence of operation is as follows:

1. Move the drum to its "home" position, for example, as determined by position "zero" of the associated encoding device. The home position is shown in FIG. 60A. A cover 628 covers a portion of the drum between the ends of the sheet 523 so as to minimize the loss of suction at the holes 629 where the sheet 523 contacts the drum. The cover may be made of any flexible material suitable for blocking the flow of air into the holes 629, and can be a sheet of paper which is held onto the drum by suction.
2. Instruct the sheet-feeding mechanism 850 to move the first sheet 523 to the loading platform 38. The chamber 545 is evacuated, and the leading edge of the sheet 523 moves so as to cover holes 629 in the drum wall leading to the chamber 545. This causes the sheet to adhere to the outer surface of the drum.
3. At the same time (or soon thereafter) start the corona discharge (indicated by arrow 521 of FIG. 60A) to charge the photoconductive sheet 523.
4. The drum is now rotated counterclockwise at a constant speed. As it rotates, chambers 545, 545', 546 and 547 are successively evacuated. The evacuated chambers are identified by the letter "V" in the drawings. Thus, the sheet is gradually wrapped around the drum and held securely onto the drum surface while avoiding or reducing substantially the vacuum loss which otherwise might occur. This is accomplished by the selected opening of the vacuum valves.
FIG. 60B represents the drum after it has rotated 90° from its initial position, 60C after one half turn, and FIG. 60D after three quarters of a turn. At this point the sheet is securely held by suction against the outer surface of the drum and the corona unit is shut off.
Continuous rotation counterclockwise of the drum brings it successively to positions 60E (one full turn from the initial position) and finally to the "flash position" 60F. At this position, the first line of text can be flashed along the optical path schematically represented by arrow 549. At this point, the valves associated with the four chambers mentioned above have been opened and they will remain so until it is time to remove the sheet from the drum, as it will be explained below.
5. The decoder which had controlled the continuous rotation of the drum from its initial position causes it to stop and connects its control mechanism to receive the line spacing data transferred from the general circuit of the machine. From this point the drum steps in the "forward lead" direction following the composition of each line. But it can also be moved in the "reverse lead" direction (that is, clockwise in the drawing) for columnar composition.
6. During the composition of a full page, the drum rotates to occupy successively positions 60G, 60H and, finally, 60I at the completion of a full page.
7. The motion of the drum is now reversed to move clockwise in a continuous mode, the control circuit having switched the drum control from the leading command to the processing command at the appearance of an "end of page" signal or when the maximum amount of the sheet surface has been exposed.
8. When the drum has rotated to position 60J, the valve connected to chamber 547 (N-E chamber) is caused to close so that no vacuum is present in the area of the drum opposite that chamber when the sheet arrives above it.
9. The ejection blade 535 pivoted at 526 is rotated counterclockwise by a solenoid (not shown) to force the end 630 of the sheet out of engagement with the drum surface.
10. Continuous clockwise rotation of the drum forces the sheet into the processing unit 42 where the handling of the sheet is taken over by belts and/or rollers located inside the assembly.
11. One quarter of a turn later, the drum and sheet are in position 60K and chamber 546 (S-E chamber) is released of its vacuum.
12. At position 60L the only chamber still evacuated is chamber 545' (S-W) chamber).
13. Finally, one quarter turn later, the drum has returned to its initial position shown at 60A. The sheet just removed has been pulled away from the drum and is now fully engaged with the track of the processing unit (as shown at 851 in the figure) from which it will emerge completely processed.
14. The drum remains stationary until a new sheet is introduced and the same sequence of operations is repeated.

It is evident that the number of chambers located within the drum can be increased or decreased depending on the vacuum force, the thickness of the sheet, etc.

Also, as a variant, the drum can keep moving in the same direction between the projection of the last image of the page and the entrance into the processing unit, as schematically illustrated in the sequence of FIGS. 60'A' to 60'H'. This can be achieved by relocating blade 535 and its pivot point to position 535' in FIG. 60'H'. In this mode of operation, as shown, the vacuum has been removed from the chamber 547 (N-E chamber) in order to make it possible to peel off the plate from the drum. As this operation is initiated (with the drum as position 60'H') the machine may still be flashing characters at position 549, so that the drum is stepped by the mechanism at the same time as the plate is introduced into the rollers 881-882 to direct it toward the processing unit 42. Of course, if a "reverse leading" operation involving more than two-thirds of the length of the plate has to be performed, the solenoid actuating blade 535' is not energized at this time but only when the composition is complete.

The sequence of FIGS. 60'-A' to 60'-H' clearly shows that another quarter turn of the drum in the same direction will bring it back to the initial position 60'-A' where the loading of the next plate 523' is initiated at the same time as the exposed plate 523 is being processed. This is accomplished by keeping chambers 545, 545' and 546 evacuated at all times except when the first plate is introduced.

The advantage of the mode of operation just described is to reduce the number of drum-turns-per-page to two instead of three as previously described. This is accomplished by simultaneously charging the plate and loading the drum in one operation and, to a certain extent, overlapping the composing and plate removing functions and also the loading and processing functions.

Deflector plates 901 and 902 guide the material as it is removed from the drum by the action of blade 535' which moves to the "peel off" position between drum locations G' and H' until location C', at the latest.

It is clear from FIGS. 57, 58 and the group of FIGS. 60 that the same media-holding and handling drum can be utilized for outputting either sheet material requiring several passages at the same location for different functions, or for handling photographic material in roll form with the capability of unwinding or winding that material.

AUTOMATIC GRAPHIC INSERTION

When the machine is used to produce electrophotographic plates, it is very desirable to have a means to automatically insert graphic matter (pictures) at the right location within the page before electrophotographic processing. Therefore, in the preferred embodiment, the graphic material is directly projected onto the photosensitive area of the photoconductive material mounted on drum 34, as it will be explained in relation to FIGS. 30 to 30C and 61 and 62.

Figures 33A, 33B, 33C:
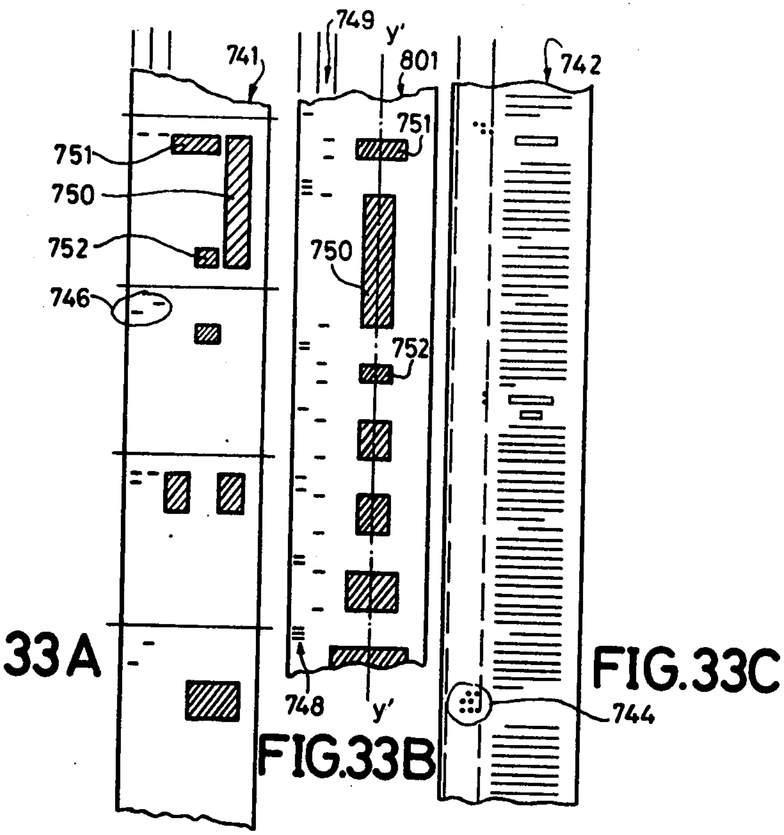
FIGS. 33A through 33C show diagrammatically graphic matter and text matter to be combined to form a complete page as in FIG. 32.
Figure 32:
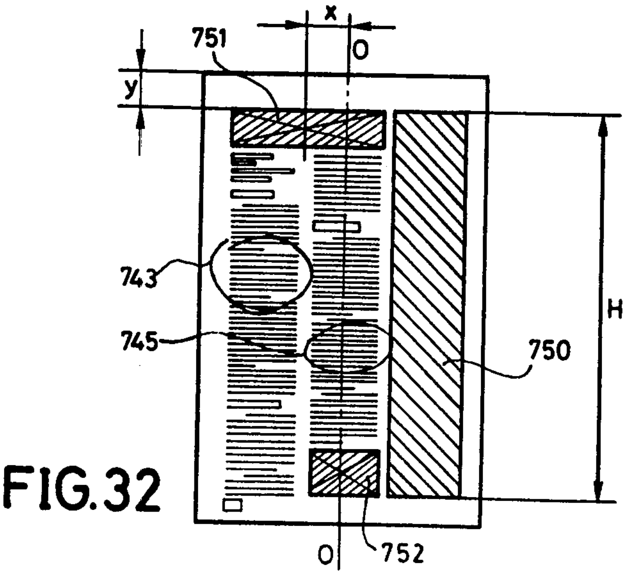
FIG. 32 represents a complete composite page composed by means of the systems shown in FIGS. 30 and 31.

A complete "made up" page is shown in FIG. 32. It is composed of two columns 743 and 745 of text, and three items of graphic matter 750, 751, and 752. The location of the graphic matter is known before the text is composed. In the simplest mode of operation, the graphic blocks are properly located on a page devoid of text material, as shown in FIG. 33A. This page can be of the same size as the original or, preferably of a smaller size, as it will be assumed in the example described below.

A. Graphic Insertion Mechanism

FIG. 61 represents the basic machine shown in FIG. 1 plus additional components: a graphic insert drum assembly 191 referred to as auxiliary input drum, and a projection lens carriage assembly 193, also referred to as auxiliary carriage.

Assembly 191 includes an auxiliary drum 611. Drum 611 is similar to the "main" drum 34 described in relation to FIGS. 57 and 58. It differs from drum 34 in that it carries previously-exposed and developed film or material 646, preferably in negative form. The latter material, which is referred to as "insert graphics" film or film strip, may consist of a roll of film containing pre-positioned graphics (or text material), as mentioned earlier. The film 646 is supported by a platform 643 provided with adjustable abutments 644 for axial location of the film, and is engaged by pins 731 which fit into corresponding holes in the insert strip for accurate radial positioning.

The auxiliary input drum 611 is rotatably supported by a spindle 649 (also see FIG. 62) and can be either independently driven by a motor-decoder assembly (not shown), or by a gear 666 (FIG. 62) which may be connected to drum 34 by a clutch (not shown) to drive both drums in synchronism. In FIG. 62, the auxiliary drum cross section shown at 648 may be provided with the same kind of holes and grooves as described above in order to maintain the insert film in position, or the film may be held in position against the drum by belts or rollers (not shown) as is well known in the art.

If the insert support is transparent, the drum 611 should be made out of transparent material so that the light produced by elongated lamp 652 (FIG. 62) located inside the auxiliary drum 611 can illuminate selected elongated transparent areas of the insert support. If the insert support is opaque material such as photographic paper, the illumination is produced by lamps 650 located outside the drum and provided with elongated reflectors, as shown in FIG. 62, extending axially along the useful length of the drum 611. In either case, the illuminated area at the surface of the drum is limited by a window 654 having a narrow aperture 742 extending lengthwise along the drum, its length being sufficient to cover the width of the auxiliary material to be merged with the product of the main drum 34.

The character spacing or main carriage is shown at 18 in FIG. 62. It can slide along rods 24 and 26 (FIG. 62) under the control of the character spacing mechanism. The carriage extension arm 28 is provided with a ball-bearing roller 686 which is urged downwardly against the rod 26 by a spring 687 attached to a flexible lever 689 provided with a friction pad 688. Carriage body 18 is provided with a grooved projection 656.

An auxiliary carriage 632 is provided. Carriage 632 can slide along a rail 634 in a direction parallel to the axes of drums 34 and 611, and to the rail 24 of the main carriage. A lens 636 is mounted in a holder 637 which is mounted on an extending arm 641 of carriage 632 as shown. Two mirrors 638 and 642 are also mounted on carriage 632 to deflect the light rays emerging from the auxiliary drum, as it will be explained later.

The auxiliary carriage 632 also is provided with an extension 640 in the form of a relatively narrow tongue that can engage snugly the recess or groove of projection 656 of the main carriage (also see FIG. 61). When the auxiliary carriage 632 is not in use, the tongue 640 is positioned as shown at 640' against a stop 657 so that the main carriage can move freely along its rail without having to carry the auxiliary carriage with it. In order to move the auxiliary carriage into operative position, the solenoid 690 is energized to rotate a long bail 662 around a pivot 655 to move from its dashed-line position 662' to its solid-line position against the action of a spring 664 which normally maintains the auxiliary carriage out of engagement with the main carriage through the action of a bracket 660 located at 660' when the solenoid is released. The spring 664 urges the auxiliary carriage 632 to rotate around rail 634 to keep the carriage 632 against stop 657 when solenoid 690 is released, which is the case when text matter is projected onto the main drum 34. When said solenoid is energized, it forces the edge of bail 662 against a ball-bearing roller 663 attached to the carriage 632 to prevent it from rotating around its rail 634 during its longitudinal displacements, or when it is locked by the main carriage at a pre-determined fixed position for the projection of graphic matter.

The purpose of the lens 636 is to form on the main drum 34 an image of the illuminated auxiliary drum area located beyond the aperture 742. FIG. 62 shows the path of ray 655 emerging radially from the auxiliary drum 611 to the projection point 778 of those rays onto the surface of the main drum 34. The extension of that ray would intersect the center of the main drum 34. Therefore, the ray is perpendicular to the illuminated strip area on the auxiliary drum, as well as to the image receiving area 778 of the main drum. The image area is separated from the image area 779 of characters produced by the main carriage, by an angle 780 in order to avoid any mechanical interference between the projection mechanisms. In the example of FIG. 62, the position and focal length of lens 636 is such that the images projected by that lens at 778 after deflection by mirrors 638 and 642, will be twice the size of the object, that is, the illuminated section of the graphic material 646 on the auxiliary drum.

The gearing 666, 667, 668 in FIG. 62 moves the auxiliary drum at twice the speed of the main drum so that when both drums are continuously rotated in the direction shown by the arrows (counter-clockwise) at the same time as slit 742 is illuminated, a double-size image of the graphic material located on the auxiliary drum will be gradually projected onto the light-sensitive medium located on the main drum, if the graphic material has been pre-positioned at half full scale on the strip 646 in negative form. The auxiliary carriage 632 is moved by the main carriage along its rail 634 to the center of the strip 646 (that is the lens 636 is positioned at the center of the strip 646) and the carriage 632 is locked into this position until the graphic material to be transferred to the sheet 675 located on the main drum has been completely projected.

As it was mentioned above, each drum has its own decoder in order to energize the clutch connecting the drums at the appropriate moment to obtain the desired vertical position of the graphics within the length of the page.

Completely automatic insertion means can also be achieved because the double drum and sliding carriage arrangements described above make it possible to move any, graphic material anywhere within a page by selective rotation of the drums for the "Y" positioning, and selective positioning of the auxiliary carriage momentarily attached to the character spacing carriage 18, for the "X" positioning.

Figure 30:
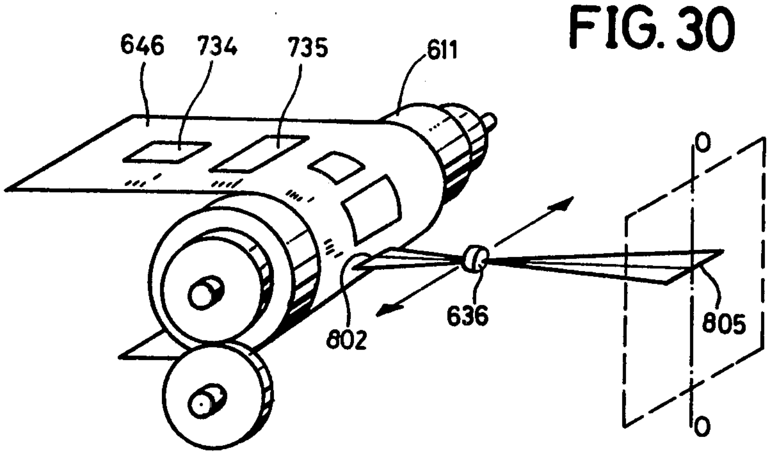
FIG. 30 is a schematic perspective view of one embodiment of the graphic insertion feature of the present invention.

The positioning of graphics located seriatum on a graphics film strip is clearly illustrated in FIG. 30, where the film strip is shown at 646, with graphic blocks 734 and 735. The film 646 is partially located on, and driven by, the auxiliary drum 611. The graphics projection lens 636 mounted on the auxiliary carriage can move in one direction or the other, as indicated by the arrows, to position any graphic block at the desired axial location on the main drum located in the image plane of lens 636.

In a preferred embodiment of the automatic insertion of graphics to produce completely "made up" pages, the graphics are photographed preferably at a reduced scale, one after the other at the center of a film strip 80, as shown in FIG. 33B. After processing, a negative is obtained, that is, the film is opaque except where the graphic material is located. At the same time as images are projected, special identification code marks are produced in the margin of the film strip 801, as shown at 748 and 749 in FIG. 33B. One or more code marks is associated with each graphic block such as 750. These codes may represent the starting point of a block, its length, its width and its identity, the latter being represented by a unique code on the film strip. Although the image areas are shaded and code marks are black in the figure, it should be understood that the only totally opaque areas, after film processing, appear as white areas in the drawing.

An optical code detector system 782 (FIG. 61) detects the beginning of a block by the passage of a code mark such as one of the lines 749 under a photodetector assembly.

B. Graphic Insertion Control Circuit

FIG. 63 is a schematic diagram of the control circuit used to operate the automatic insertion mechanism described above. It is now assumed that a page such as the page illustrated in FIG. 32 already has received the text information shown in columns 743 and 745. The graphic blocks shown at 750, 751 and 752 in FIG. 32 are also shown in FIG. 33B, which represents the film strip ready to be inserted into the machine, around the auxiliary drum 611.

In FIG. 63, the main electronic control circuitry of the basic photocomposing machine is shown at 500 (also see FIG. 2). The equipment 500 includes data processing equipment for character spacing, line spacing, style and size selections, etc., as well as for storing and retrieving information to instruct the photographic output unit and the character spacing carriage to leave blank spaces where graphic material is to be inserted. This is the case of the page of FIG. 32 in which characters have been flashed—exclusively—in non-graphic areas as shown. When graphics have to be inserted in a page under the control of the unit 500, the information as to "what" graphic matter has to be inserted "where" is transferred from unit 500 to unit 783 representing the graphic insert circuits. A check on the identity of the graphic blocks is performed by an identity checking unit 788.

Figure 30A:
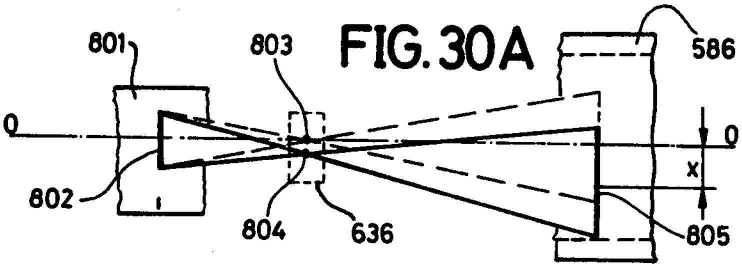
FIG. 30A is a schematic diagram illustrating the operation of the device of FIG. 30B.

The unit 783 includes graphic code identification circuits 784. Unit 783 receives and outputs the X and Y locations of the graphic blocks such as 750, 751 and 752. The X value represents, as shown in FIGS. 30A and 32, the distance, positive or negative, of the vertical central axis of the block to the vertical central axis 0—0 of the page, as pre-determined during the composing operation done prior to the data transfer to the photo-unit. The Y value represents the distance from the top of a block to the upper (or lower) limit of the page as shown in FIG. 32. The block height H also is transferred from the controller 500. These values appear, as shown in FIG. 63, in registers 785, 786 and 787, respectively. The X value is preferably expressed in spacing carriage displacement units, and the Y and H values in leading or line-spacing units.

At the beginning of an "insert" operation the main carriage is at its central position on the vertical axis, which is also the home position of the auxiliary carriage. The signal (appearing in register X) causes a clutch 793 (represented by the solenoid 690 in FIG. 62) to be energized so that both carriages 792 and 794 will travel in synchronism. Now the circuit moves the carriages from the central location of the pages (it is assumed that the vertical center of the film strip on which the graphic blocks are centered is aligned with the center of the master drum page) to the right or to the left for the X correction to position the auxiliary carriage at the required location to project the first block of graphic matter.

The carriage displacement just described is illustrated by the schematic representation of FIG. 30A, where the graphic film strip is shown at 801, the central or page vertical axis is line 0—0, the top edge of the graphic block is represented by line 802, the receiving surface of the main carriage by 586 and the projected image of the top edge 802 by line 805. When the auxiliary carriage is at the center (or zero) position its lens is at 803. In order to make the X correction, as shown in FIG. 30A, the lens is moved to position 804 under the control of the main carriage and its associated decoder. The distance to be traveled by the carriage, which is the distance separating point 803 from point 804, depends on the enlargement ratio between the "object" (graphics) and the "image" projected to the main drum. If the enlargement ratio is E, the distance to be traveled by the carriage (or lens) is equal to $X/(E+1)$. Thus, in the example of FIG. 30A where it is assumed that the graphics of strip 801 are half-size, the lens travel will be one-third of the correction X.

Now referring to FIG. 63, while the auxiliary carriage 792 is moved, as explained above, to position the graphic block image at the pre-selected location across the width of the page, the "Y" circuit of the unit 786, after energizing clutch 790, causes the rotation of the main drum to bring the auxiliary drum to its home position as determined by the positioning controls of unit 789. Also, if at this time the main drum is not at its home position, the clutch 790 is de-energized and the main drum controls of unit 791 cause that drum to move to its home (or zero position). Now, with both drums at zero, the clutch 790 is again energized and, assuming that the carriages are now properly located, gates 796, 797 and 798 will give a "ready" signal to gate 799 which will operate a lamp 795 to project the image of the graphics at the same time as the drums are caused to rotate. That rotation causes pulses to be sent to unit 787 in which may have been pre-set a number of pulses proportional to the height of the graphic block being projected. When the drums have moved a number of units equal to the height of the block, the operation is stopped by the H unit (unit 787), which feeds back to unit 784, the lamp 795 is turned off, and the drums and carriages may be returned to zero to be ready for the projection of the next graphic block in the same page.

It must be understood that the graphics film strip can be positioned on the auxiliary drum with the emulsion side in or out, and with the top of graphic blocks up or down, as desired.

C. Mixing Blocks of Text and Graphic Matter

Figure 31:
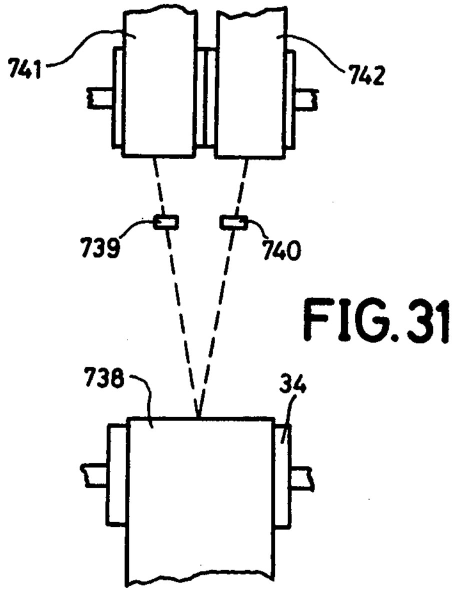
FIG. 31 is a schematic representation of an optical page make-up system constructed in accordance with the invention.

It is also within the purview of the invention to utilize the system described above for mixing on the photosensitive surface of the main drum pre-developed text material as shown in FIG. 33C. Such text matter also is provided with special codes 744 indicative of the locations of the text sections within the page. Such a page can be made up, in the manner indicated schematically in FIG. 31, by simultaneous or successive projections, through lenses 739 and 740, onto the film or plate 738 mounted on the master drum 34. The projections are made from text strips 742 and graphic strips with prepositioned "picture" blocks shown at 741 or such blocks arranged as shown in FIG. 33B.

D. Producing Half-Tones

The production of "half-tones" on the photosensitive medium located on the main drum can be done as shown schematically in FIG. 62. A "half tone" screen is shown at 676, supplied by a small roll 677. The screen is installed in the machine by pulling a certain length through supporting members 681. When a screening operation is called for, a roller 678 is rotated counterclockwise just long enough to push a portion of the screen under a roller 680 which is then moved to its dashed position against the photosensitive material 675 by rotating supporting arm 682 around pivot 683. Thus, the pressure of the roller 680 will not only maintain the screen against the outside surface of photosensitive material 675 but also will cause the roller 680 to roll on the drum surface as it rotates.

The light emerging from the picture to be projected is directed to the elongated exposing area 778 through a clear strip of optical glass 670. Said glass is sealed on an enlongated funnel-shaped housing 672 into which compressed air is forced through a pipe 673 in order to create intimate contact between the screen and the surface 675 without interfering with the transmission of the images,

E. Laser Device for Graphics Insertion

An alternative graphics insertion attachment to the basic machine is shown in FIGS. 65 and 66. Although the arrangement now to be described is, at the present time, more costly and complex than the direct imaging system described above, it has a number of advantages based on the fact that small slices of the projected graphic image are converted in an analog-to-digital conversion process which makes it possible to use known digital techniques to modify the appearance, contrast and size of the final image from the same graphic original. In particular, this arrangement does not necessitate a negative graphic strip to produce positive images. This is done by the addition of an inverting system in the circuit connecting the controls of the auxiliary drum to those of the main drum.

Referring now to FIG. 65, it can be seen that said figure is similar to FIG. 62 of the previously described embodiment. The components which are identical in both figures are not given reference numerals in FIG. 65. The auxiliary carriage 645 of FIG. 65 is provided with two extensions 714 and 715. Extension 714 houses a lens 712, preferably of relatively short focal length, to produce an enlarged image of the illuminated area of auxiliary drum 614 within an acceptable track length. The light emerging from lens 712 is bent by mirrors 638 and 642 to reach a mask 717 located within extension 715. The mask 717 is attached to an adjustable ring 719 provided with a photodiode array 718 (also see FIG. 64) accurately located in the image plane of the lens 712.

Mask 717 is provided with a narrow slit of substantially the same size as the diode array. In the example shown in FIG. 65A, the slit width is approximately 0.1 millimeter and its height, which can accommodate twelve diodes of the array, is approximately 0.3 millimeter. It is understood that each photodiode behaves independently of each adjacent diode. The use of a commercially-available array makes it possible to locate a relatively large number of diodes in a small space.

At a given time a portion of the graphic material having a dimension, in the example mentioned, equal to $0.1 \times 0.3$ millimeters times the enlargement ratio, is projected onto the array 718. The array will recognize the tone value of each dot corresponding to a photodiode of said array. For the projection of line drawings for example, the diodes may be totally illuminated, or partially illuminated or not illuminated at all.

The photodetector circuit associated with the array discriminates between partially-illuminated diodes so that, dependenting on the percentage of light each borderline diode receives, it will generate either a "one" signal (meaning illuminated area) or "zero" signal (meaning black area). The resolution of the system depends on the enlargement ratio for a given diode array. As the auxiliary carriage traverses the graphic area, elementary portions of the graphic area are scanned and the photoelectric output of the diode array is transmitted via a line 721 (FIG. 66) to a circuit 722 which, as the carriage is moving, produces digital signals transmitted to an inverter-auxiliary circuit 723 which generates, at each instant, a number of signals equal to the number of diodes. Each such signal controls the generation of a separate fixed-frequency signal by an oscillator 724 for the purpose of creating, simultaneously, independent laser beams, one for each photodiode from a laser source 726, its associates optics 727 and acousto-optic transducer cell 728 which operate as described in U.S. Pat. No. 4,000,493.

The system operates on the well-known frequency-dependent diffraction produced by ultrasonic waves within an acousto-optic cell. The undiffracted ray is blocked by a mask 729. The energizing diffracted rays, each one corresponding to the elementary area of the graphics projected to one of the photodiodes, are projected to the master drum, on the same surface as the text characters, via mirrors 730, 733 and 732. Mirror 732 is pivoted around hinge 736 so as to be out of the way during the projection of the text matter and via the character-spacing carriage which drives the auxiliary carriage through the engagement of the finger 640, as explained above.

The carriages move in synchronization with one another during the projection of graphic matter. The drums can move in synchronism in steps or in a continuous fashion. The rotation of the auxiliary drum must conform to the enlargement ratio of lens 712. For example, for an enlargement ratio of two, the rotational speed of the auxiliary drum will be one half the speed of the master drum. By independent control of the drums and the carriages, it is possible to squeeze or expand in one direction or another, or enlarge or reduce the final image by pre-selected amounts. For example, if the main carriage moves faster than the auxiliary carriage, image widths will be increased and vice versa. If, taking into account the enlargement effect of the lens, the master drum has a higher rotational speed than the auxiliary drum, the image height will be increased, and vice versa.

F. Semi Automatic Insertion of Graphics

A method for the semi-automatic insertion of graphics now will be described in relation to FIGS. 68 to 72. This method relates more specifically, but not exclusively, to the production of printing plates by electrophotographic means as described above.

The first step is to produce all the pages containing text and graphics for a given job on the plates. These plates are exposed and processed as described above. "Windows" or blank spaces are left for the introduction of graphics as described above in relation to FIGS. 32 and 33A. The graphic material, preferably in positive form, is prepared on a separate camera so that each picture is properly cropped and sized (and screened if required). It is assumed the graphic material is "right reading" on film. It also is assumed that each plate or sheet 861 is provided with accurate locating holes to engage positioning pins as shown at 862 and 863 in FIGS. 68 and 69. In order to pre-position the graphics with great accuracy, each plate is first positioned on a base 867 (FIG. 69) provided with such pins to engage such holes.

Then a sheet of transparent plastic 866, wider and longer than the text-bearing plate and also provided with two locating holes, is positioned on top of the plate as shown in FIG. 69. Light marks (for example pencil marks), such as 864 and 865 are made on the plastic sheet to indicate the location of the "windows" of the plate.

Then the plastic sheet is turned over and the graphics are secured by cement or any other mean at their respective locations, using the locating marks, with the emulsion side up, as shown in FIGS. 70 and 71 at 750, 751 and 752.

The purpose of the above procedure is to ensure the correct placement of the graphics (or other additional material such as trademark symbols) and also to obtain an "emulsion against emulsion" contact in the ensuing automatic contact printing operation which now will be described in relation to FIG. 72.

FIG. 72 is similar to FIG. 62 and the same or similar components are represented by the same reference numbers. A stack of plates (previously processed and containing the text material) is represented schematically at 874, sitting on a special holder 38 provided with a feed roller 850. A similar assembly containing a stack of graphics-on-plastic sheets 875' supported by holder 38' and fed by roller 850' is shown above the plate material holder. Drum 34 is the same as the drum described in relation to FIGS. 57, 58 and 60 and operates as described in relation to FIGS. 60A to 60L.

An elongated funnel-shaped housing 672 receives compressed air through pipe 673, as also shown in FIG. 62. The housing 672 is sealed around an elongated cylindrical lens 868 serving as a condenser for an elongated lamp 869 provided with a reflector 870 which acts also as a light baffle. As explained in relation to FIG. 62, a pressure roller 680 can rotate freely at the end of a swing-arm schematically represented at 682, pivoted at 683. The arm 682 can be moved clockwise to bring the roller 680 to position 680' in contact with drum 34 upon the actuation of a rotary solenoid (not shown) provided with a spring which maintains lever 682 against stop 878 when the solenoid is not operated.

The transfer of graphics from a plastic sheet such as 866 to the once-processed plate occurs as follows:

With the drum at its initial position, the first plate of stack 874 is moved toward the drum surface as explained in relation to FIG. 60A. On its way to the drum or just as it is attached to the drum surface by suction, the corona discharge device is actuated and the sequence of operations is as shown in FIGS. 60A to 60E, at which point the drum, having rotated one turn to wrap the plate around it, is back to its initial (or home) position and the corona is shut off.

Now the drum continues its rotation until the edge of the plate attached to it reaches a point opposite lug 871 and stops. The accurate position of the drum at this time is determined by its decoder or by a photoelectric device (not shown) which stops the drum motion as soon as the plate has reached this pre-determined position.

Next, the feed roller 850' moves the plastic sheet containing the pre-positioned graphics to be added to the plate presently on the drum, to position 872, which is shown in dashed lines, so that the edge of the plastic sheet abuts on lug 871. The plastic sheet is supported by plate 873 during this operation.

At this point, the plastic sheet and the plate are at such positions that, if they were brought into contact with one another, the graphics would register exactly in their windows. This is achieved by properly guiding both sheet and plate sideways during the above-described operation, and by properly locating the graphics lengthwise in relation to their edges.

Next, the lever 682 is moved clockwise to force the pressure roller 680 against the drum. The motion of the roller disengages the edge of those plastic sheets from the retaining lug 871 to bring the sheet into contact with the edge of the plate material.

Next, the lever 682 is moved clockwise to force the pressure roller 680 against the drum. The motion of the roller disengages the edge of the plastic sheet from the retaining lug 871 to bring the sheet into contact with the edge of the plate material.

Now the lamp 869 is turned on and the continuous rotation of the drum is resumed. The compressed air located inside the cavity 672' presses the graphics against the plate in intimate-contact, emulsion against emulsion, and both the plate and the film move in unison in front of the lens 868 at the proper speed and with the proper light output from lamp 869 to expose the charged plate as it moves past the end of the funnel-shaped housing 672. A curved retaining plate 879 channels the "used" graphics plastic holder to discharge point 880 from which it falls into a receptacle (not shown) while the plate 675' with the added latent graphics image is transferred to the developing unit.

It can be understood that the greatest advantage of the semi-automatic insertion of graphics just described resides in its simplicity and, more specifically, in the fact that it is not necessary to add an auxiliary drum with associated optics. However, when making a choice between this method and the others described above, it should be realized that this method requires more hand manipulation for the visual preparation of graphic-bearing sheets, and each plate requires two passages through the electrophotographic mechanism.

XVII. ZOOM LENS UNIT

The zoom lens unit 12 shown in FIG. 1 is shown in detail in FIG. 67, which shows the unit 12 with its upper half in cross-section and phantom and its lower half in solid lines. The unit 12 includes a lens barrel 692 with four groups of lens elements mounted in the barrel.

The zoom lens unit 12 is of the type which is used on video cameras. It includes an exit lens element group 694, an inlet lens element group 700, and two intermediate lens element groups 696 and 698. The gear 13 is attached to a ring 693 which is rotated to vary the spacing of the element groups 696 and 698 to change the zoom setting. Normally, the group 700 is moved in order to focus on an object which is from about 1.8 meters to infinity away. The image is focused on a photosensitive surface at 74.

In accordance with the present invention, the zoom lens unit 12 is reversed from its normal orientation when used with a video camera. The matrix petal 74 is located where the photosensitive surface would be in the camera, and the lens system 700 is permanently focused at infinity so as to produce collimated light at the output of the lens group 700. Rotation of the ring 693 causes a change in the enlargement of the images received from the petal 74 without changing the focus of the output.

Normally, the zoom lens 12 has a focus control and iris control, neither of which may be needed in this embodiment. The element groups 694 and 700 are stationary. The elements 694 are located at a distance FD from the matrix 74 so as to produce collimated light at the output of lens group 700.

The zoom lens unit 12 shown in FIG. 72 is available commercially. For example, a suitable unit is the Model V6Z1818 zoom lens unit sold by Chugai International Corp., Plainview, N.Y. It is a 6×(18 mm–108 mm) F 1.8 lens unit. It has thirteen lens elements in nine groups. The output lens group 694 is of substantially smaller diameter than the input group 700.

The advantages of the above-described unorthodox use of a standard zoom lens are several. First, the unit is considerably faster to use in changing the magnification of the characters. The ring 693 need move only a relatively small distance compared to corresponding distances in prior machines. Also, because the zoom units have the above qualities and are manufactured in substantial quantities for other purposes, they are lower in cost.

The above description of the invention is intended to be illustrative and not limiting. Various changes or modifications in the embodiments described may occur to those skilled in the art and these can be made without departing from the spirit or scope of the invention.

We claim:

1. In or for a photocomposing machine, output means for moving a flexible photosensitive record medium past an exposure station at which images are projected onto said medium, said output means comprising a hollow drum with holes in its walls, means for dividing the hollow interior of said drum into sections, drive means for rotating said drum, and holding means for partially evacuating at least one selected section of said drum to hold said medium onto the surface of said drum.

2. A device as in claim 1, said holding means including means for dividing the hollow interior of said drum into a plurality of separate sections, said holding means being adapted to partially evacuate only the sections around which said record medium is wrapped.

3. A device as in claim 1 in which said record medium is in roll form, said medium being wrapped more than one-fourth of the distance around said drum, a supply cassette for dispensing said medium, and a take-up cassette for receiving the exposed medium.

4. A device as in claim 1 in which said record medium is in sheet form, said holding means including means for dividing the hollow interior of said drum into a plurality of separate sections, said holding means being adapted to partially evacuate only the sections around which said record medium is wrapped, and a gas-impervious cover over the portion of said drum not covered by said sheet.

5. A device as in claim 4 including a selectively actuatable deflector device for selectively moving to a position closely adjacent said drum surface so as to deflect and remove said sheet from said drum.

6. A device as in claim 1 in which said record medium is capable of being printed on by electrophotographic means, and including corona charging means for charging said medium before reaching said exposure station, and developing means for receiving the exposed medium and applying toner thereto to develop the latent images on said medium.

7. A device as in claim 6 in which said medium is in discrete sheet form, means for rotating said drum past said corona charging means continuously in one pass to charge said sheet, and leading means for rotating said drum in discrete steps to space lines of characters from one another during composition.

8. In a photocomposing method, the steps of utilizing a hollow drum to hold a photosensitive medium during the photographic exposure of said medium, separating the hollow interior of said drum into chambers whose locations are stationary, partially evacuating selected ones of said chambers so as to hold said medium on said drum while not evacuating the ones of said chambers which are not at least partially covered by said medium.

9. A photocomposing method utilizing electrophotography, said method comprising moving a first sheet record medium past a corona charging, device to completely charge said medium, simultaneously adhering said sheet to a rotary drum, moving said medium past an exposure station in discrete steps to allow the forming of lines of characters between steps, gradually removing said sheet from said drum to clear successive areas of the surface of said drum and simultaneously charging and gradually adhering a second sheet onto said cleared areas and developing the latent electrostatic images on said first sheet.

* * * * *